US012650657B2

(12) United States Patent
Tabata et al.

(10) Patent No.: US 12,650,657 B2
(45) Date of Patent: Jun. 9, 2026

(54) TONER AND TONER PRODUCING METHOD, TONER STORING UNIT, IMAGE FORMING APPARATUS, AND IMAGE FORMING METHOD

(71) Applicants: Kazumasa Tabata, Shizuoka (JP); Akio Takei, Shizuoka (JP); Hiroshi Yamada, Shizuoka (JP); Toma Takebayashi, Shizuoka (JP); Ryuuta Yoshida, Shizuoka (JP)

(72) Inventors: Kazumasa Tabata, Shizuoka (JP); Akio Takei, Shizuoka (JP); Hiroshi Yamada, Shizuoka (JP); Toma Takebayashi, Shizuoka (JP); Ryuuta Yoshida, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 890 days.

(21) Appl. No.: 17/955,620

(22) Filed: Sep. 29, 2022

(65) Prior Publication Data

US 2023/0109578 A1 Apr. 6, 2023

(30) Foreign Application Priority Data

Oct. 1, 2021 (JP) ................................ 2021-162656
Aug. 23, 2022 (JP) ................................ 2022-132634

(51) Int. Cl.
*G03G 9/08* (2006.01)
*G03G 9/087* (2006.01)
*G03G 9/093* (2006.01)

(52) U.S. Cl.
CPC ....... *G03G 9/0825* (2013.01); *G03G 9/08711* (2013.01); *G03G 9/08726* (2013.01); *G03G 9/08755* (2013.01); *G03G 9/09321* (2013.01)

(58) Field of Classification Search
CPC ............ G03G 9/0825; G03G 9/08711; G03G 9/08726; G03G 9/08755; G03G 9/09321
See application file for complete search history.

(56) References Cited

U.S. PATENT DOCUMENTS 5,906,704 A 5/1999 Matsuura et al.
2003/0027074 A1 2/2003 Emoto et al.
(Continued)

FOREIGN PATENT DOCUMENTS

JP H09-101630 A 4/1997
JP 2002-284881 10/2002
(Continued)

OTHER PUBLICATIONS

English machine translation of the description of JP-2019143128-A (Year: 2019).*
(Continued)

*Primary Examiner* — Mark F. Huff
*Assistant Examiner* — Boone Alexander Evans
(74) *Attorney, Agent, or Firm* — XSENSUS LLP

(57) ABSTRACT

A toner includes toner base particles each containing a binder resin and a release agent, and resin particles on a surface of each of the toner base particles. A ratio (Iw/Ir) is 0.10 or more and 0.30 or less, where Ir is a peak height of the binder resin and Iw is a peak height of the release agent, as measured through attenuated total reflection (ATR). A standard deviation σ (nm) of distances L (nm) between the resin particles that are adjacent to each other on the surface of each of the toner base particles is 150 nm or more and 500 nm or less.

20 Claims, 3 Drawing Sheets

(56) References Cited

U.S. PATENT DOCUMENTS

| | | | |
|---|---|---|---|
| 2003/0096185 | A1 | 5/2003 | Yamashita et al. |
| 2003/0125479 | A1 | 7/2003 | Kinsho et al. |
| 2003/0134220 | A1 | 7/2003 | Emoto et al. |
| 2003/0138717 | A1 | 7/2003 | Yagi et al. |
| 2003/0152859 | A1 | 8/2003 | Emoto et al. |
| 2003/0162112 | A1 | 8/2003 | Yamashita et al. |
| 2003/0180644 | A1 | 9/2003 | Nanya et al. |
| 2004/0131961 | A1 | 7/2004 | Watanabe et al. |
| 2004/0157146 | A1 | 8/2004 | Tomita et al. |
| 2005/0112488 | A1 | 5/2005 | Yamada et al. |
| 2005/0164114 | A1 | 7/2005 | Yagi et al. |
| 2005/0180786 | A1 | 8/2005 | Yamada et al. |
| 2005/0186498 | A1 | 8/2005 | Honda et al. |
| 2006/0024097 | A1 | 2/2006 | Yamada et al. |
| 2006/0204883 | A1 | 9/2006 | Nakayama et al. |
| 2006/0240349 | A1 | 10/2006 | Watanabe et al. |
| 2007/0031752 | A1 | 2/2007 | Watanabe et al. |
| 2007/0184370 | A1 | 8/2007 | Yamashita et al. |
| 2008/0090165 | A1 | 4/2008 | Yamada et al. |
| 2008/0227000 | A1 | 9/2008 | Honda et al. |
| 2008/0233498 | A1 | 9/2008 | Yamada et al. |
| 2008/0268366 | A1 | 10/2008 | Nakayama et al. |
| 2008/0280218 | A1 | 11/2008 | Sabu et al. |
| 2008/0280219 | A1 | 11/2008 | Nakayama et al. |
| 2009/0010687 | A1 | 1/2009 | Yamada et al. |
| 2009/0075195 | A1 * | 3/2009 | Shu .................... G03G 9/08797 399/130 |
| 2009/0117480 | A1 | 5/2009 | Yamada et al. |
| 2009/0226836 | A1 | 9/2009 | Uchinokura et al. |
| 2010/0285402 | A1 | 11/2010 | Saitoh et al. |
| 2011/0033796 | A1 | 2/2011 | Yamada et al. |
| 2011/0177440 | A1 | 7/2011 | Yamada et al. |
| 2013/0022371 | A1 | 1/2013 | Kusahara et al. |
| 2013/0130174 | A1 | 5/2013 | Yamada |
| 2013/0196260 | A1 | 8/2013 | Yoshida et al. |
| 2013/0316280 | A1 | 11/2013 | Yoshida et al. |
| 2014/0242514 | A1 | 8/2014 | Inque et al. |
| 2014/0272695 | A1 | 9/2014 | Moritani et al. |
| 2014/0322643 | A1 | 10/2014 | Watanabe et al. |
| 2014/0342283 | A1 | 11/2014 | Yamamoto et al. |
| 2015/0220009 | A1 | 8/2015 | Sato et al. |
| 2015/0248070 | A1 | 9/2015 | Chiba et al. |
| 2015/0253687 | A1 | 9/2015 | Chiba et al. |
| 2015/0261113 | A1 | 9/2015 | Takeyama et al. |
| 2016/0259257 | A1 | 9/2016 | Sugimoto et al. |
| 2016/0259259 | A1 | 9/2016 | Ueda et al. |
| 2016/0370720 | A1 | 12/2016 | Yamashita et al. |
| 2017/0010550 | A1 | 1/2017 | Nagata et al. |
| 2017/0017175 | A1 | 1/2017 | Yamada et al. |
| 2017/0108791 | A1 | 4/2017 | Hashida et al. |
| 2017/0363980 | A1 | 12/2017 | Nagata et al. |
| 2017/0371257 | A1 | 12/2017 | Santo et al. |
| 2018/0024452 | A1 | 1/2018 | Sugimoto et al. |
| 2018/0052403 | A1 | 2/2018 | Inoue et al. |
| 2018/0224763 | A1 | 8/2018 | Tanaka et al. |
| 2018/0253022 | A1 | 9/2018 | Takeda et al. |
| 2018/0364600 | A1 | 12/2018 | Fuwa et al. |
| 2019/0171122 | A1 | 6/2019 | Ukigaya et al. |
| 2019/0227449 | A1 | 7/2019 | Nemoto et al. |
| 2019/0243291 | A1 | 8/2019 | Matsuda et al. |
| 2020/0012206 | A1 | 1/2020 | Takebayashi et al. |
| 2020/0292954 | A1 | 9/2020 | Aoyama et al. |
| 2020/0301348 | A1 | 9/2020 | Nakayama et al. |
| 2021/0063916 | A1 | 3/2021 | Takei et al. |
| 2021/0116830 | A1 | 4/2021 | Takei et al. |
| 2021/0356877 | A1 | 11/2021 | Kamada et al. |
| 2021/0389686 | A1 | 12/2021 | Kakinuma et al. |
| 2022/0050395 | A1 | 2/2022 | Yamada et al. |
| 2022/0057725 | A1 | 2/2022 | Inoue et al. |
| 2022/0137525 | A1 | 5/2022 | Yoshida et al. |
| 2022/0291802 | A1 | 9/2022 | Kamada et al. |

FOREIGN PATENT DOCUMENTS

| | | | | | |
|---|---|---|---|---|---|
| JP | 2006-317749 | | | 11/2006 | |
| JP | 2014-056143 | | | 3/2014 | |
| JP | 2015-059949 | | | 3/2015 | |
| JP | 2015-148724 | | | 8/2015 | |
| JP | 6233332 | | | 11/2017 | |
| JP | 2019-012092 | A | | 1/2019 | |
| JP | 2019-099809 | | | 6/2019 | |
| JP | 2019099809 | A | * | 6/2019 | |
| JP | 2019-143128 | | | 8/2019 | |
| JP | 2019143128 | A | * | 8/2019 | ........... G03G 9/0802 |
| JP | 2021-047217 | | | 3/2021 | |

OTHER PUBLICATIONS

English machine translation of the description of JP-2019099809-A (Year: 2019).*
U.S. Appl. No. 17/811,054, filed Jul. 6, 2022.
U.S. Appl. No. 17/659,576, filed Apr. 18, 2022.
U.S. Appl. No. 17/743,449, filed May 13, 2022.
Office Action issued Apr. 14, 2026 in Japanese Patent Application No. 2022-132634, 9 pages.

* cited by examiner

TONER AND TONER PRODUCING METHOD, TONER STORING UNIT, IMAGE FORMING APPARATUS, AND IMAGE FORMING METHOD

CROSS-REFERENCE TO RELATED APPLICATIONS

The present application claims priority under 35 U.S.C. § 119 to Japanese Patent Application No. 2021-162656, filed Oct. 1, 2021 and Japanese Patent Application No. 2022-132634, filed Aug. 23, 2022. The contents of which are incorporated herein by reference in their entirety.

BACKGROUND OF THE INVENTION

1. Field of the Invention

The disclosures herein generally relate to a toner and a toner producing method, a toner storing unit, an image forming apparatus, and an image forming method.

2. Description of the Related Art

An image forming method based on an electrophotographic technique using a toner includes forming an electrostatic latent image on a surface of a photoconductor, developing the electrostatic latent image to form a toner image, transferring the toner image to a medium, and fixing the toner image on the medium.

In recent years, the toner desirably has a smaller particle diameter and hot-offset resistance for outputting images of higher quality, low-temperature fixability for energy savings, and enough heat-resistant storage stability to endure high-temperature, high-humidity conditions during storage and transportation after the production thereof. Of these, improvement of the toner in low-temperature fixability is particularly desired because the power consumed at the time of fixation accounts for much of the power consumed in the image forming process.

In order to improve the low-temperature fixability of the toner, a low-melting-point material is used in the toner. However, the toner produced using the low-melting-point material has poor heat-resistant storage stability. There is a trade-off relationship between low-temperature fixability and heat-resistant storage stability.

Under such circumstances, in order for a toner to have both low-temperature fixability and heat-resistant storage stability and to exhibit excellent heat-resistant storage stability and excellent low filming properties, proposed is a toner including a crystalline polyester, a release agent, and a non-crystalline polyester, where the crystalline polyester is on a surface of the toner at a specific surface coverage, the release agent is in the toner in a specific amount, and the toner has a specific intensity ratio between the release agent and the non-crystalline polyester in the surface of the toner (see, for example, Japanese Unexamined Patent Application Publication No. 2021-047217).

Other related art proposes, for example, methods of producing composite resin particles, including forming composite resin particles including resin particles attached on surfaces of resin particles where the resin particles each include two different resins as components thereof, and then removing part or all of the resin of the resin particles (see, for example, Japanese Unexamined Patent Application Publication Nos. 2019-099809, 2019-143128, and 2015-148724). In these proposals, while the resin particles are selectively dissolved in an aqueous alkaline solution by controlling the acid value of the resin of the resin particles, the composite resin particles are successfully formed. In addition, by controlling viscoelasticity of the resin, the composite resin particles are readily formed. The proposed composite resin particles are excellent in low-temperature fixability and heat-resistant storage stability.

Still other related art proposes, for example, toner particles each including a hybrid resin where crystalline polyester units and non-crystalline resin units are chemically bonded together, in order to achieve both low-temperature fixability and heat-resistant storage stability (see, for example, Japanese Patent No. 6233332). The hybrid resin can more uniformly disperse crystalline polyesters in the toners.

Still other related art proposes, for example, toner particles each including a core layer and a shell that coats the core layer, where the core layer includes a styrene acrylic-modified polyester resin and the shell is spherical particles coated with a styrene acrylic resin component, in order to achieve high heat-resistance storage stability and prevent toner aggregation during long-term use (see, for example, Japanese Unexamined Patent Application Publication No. 2002-284881). With this configuration, electrostatic aggregation does not occur even during long-term continuous use, which makes it possible to prevent failure related to spots on the resulting image.

An object of the present disclosure is to provide a toner that can achieve high levels of low-temperature fixability, heat-resistant storage stability, and image gloss, and that has good cleanability.

SUMMARY OF THE INVENTION

In one embodiment, a toner of the present disclosure includes toner base particles each containing a binder resin and a release agent, and resin particles on a surface of each of the toner base particles. A ratio (Iw/Ir) is 0.10 or more and 0.30 or less, where Ir is a peak height of the binder resin and Iw is a peak height of the release agent, as measured through attenuated total reflection (ATR). A standard deviation σ (nm) of distances L (nm) between the resin particles that are adjacent to each other on the surface of each of the toner base particles is 150 nm or more and 500 nm or less.

The present disclosure can provide a toner that can achieve high levels of low-temperature fixability, heat-resistant storage stability, and image gloss, and that has good cleanability.

DESCRIPTION OF THE PREFERRED EMBODIMENTS

Figure 1:
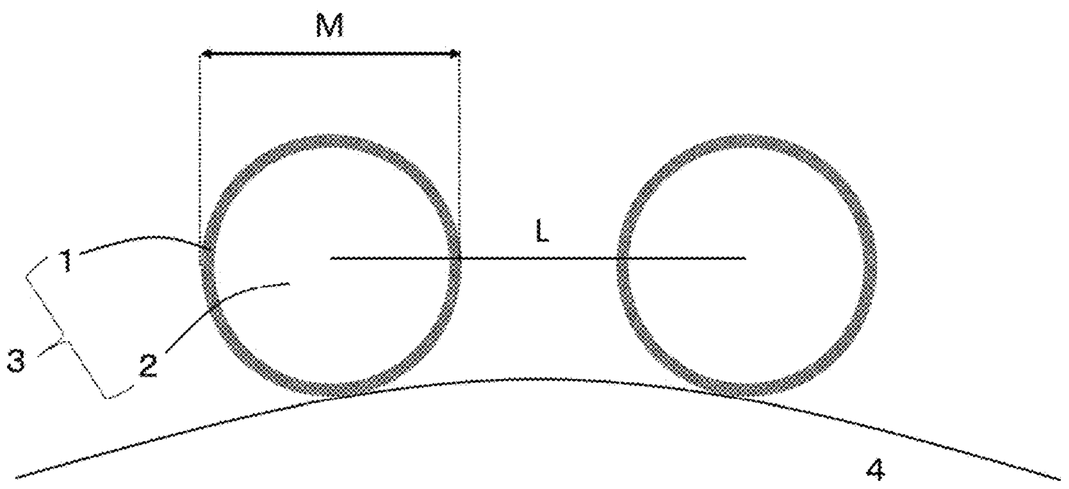
FIG. 1 is a schematic view illustrating a particle diameter M of a resin particle and a distance L between resin particles (a straight line from the center of one of the resin particles to the center of the other resin particle) as defined in the present disclosure.

In the following, embodiments of the present invention will be described with reference to the accompanying drawings.

(Toner)

A toner of the present disclosure includes toner base particles each containing a binder resin and a release agent, and resin particles on a surface of each of the toner base particles. If necessary, the toner may further include other materials.

In the toner of the present disclosure, a ratio (Iw/Ir) is 0.10 or more and 0.30 or less, and preferably 0.13 or more and 0.22 or less, where Ir is a peak height of the binder resin and Iw is a peak height of the release agent, as measured through attenuated total reflection (ATR).

Also, in the toner of the present disclosure, a standard deviation σ (nm) of distances L (nm) between the resin particles that are adjacent to each other on the surface of each of the toner base particles is 150 nm or more and 500 nm or less, and preferably 150 nm or more and 400 nm or less.

Here, the ratio (Iw/Ir) is described in more detail, where Ir is a peak height of the binder resin and Iw is a peak height of the release agent, as measured through attenuated total reflection (ATR).

Measurement through attenuated total reflection (ATR) in the present disclosure is performed in the following manner.

[Measurement Method of Peak Height Ir of the Binder Resin and Peak Height Iw of the Release Agent Through Attenuated Total Reflection (ATR), and Calculation Method of Ratio (Iw/Ir)]

First, 3 g of the toner is weighed, and is pressed with a pelletizer (obtained from Maekawa Testing Machine MFG. Co., LTD., device name: Type M No. 50 BRP-E) at a load of 6 t for one minute, to prepare a pellet having a diameter of 40 mm (thickness: about 2 mm).

The prepared pellet is measured under the following measurement conditions with a microscopic FT-IR device (obtained from PERKIN ELMER Co., Ltd., Spectrum One including a MultiScope FTIR unit installed therein, micro-ATR of a germanium (Ge) crystal having a diameter of 100 μm). As the FT-IR device, a Fourier transform infrared spectrometer (device name: Avatar370, obtained from Thermo Fisher Scientific Inc.) may be used instead.

—Measurement Conditions—

Incidence angle of infrared rays: 41.5°

Resolution: 4 $cm^{-1}$

Cumulative number: 20 times

Next, in an IR spectrum of the toner obtained by the measurement, the height of a peak unique to the binder resin only is read as the peak height Ir of the binder resin. The peak unique to the binder resin only is determined based on a peak position of 828 $cm^{-1}$ attributed to an amorphous polyester resin.

Similarly, the height of a peak unique to the release agent (wax resin) only in an IR spectrum of the toner obtained by the measurement is read as the peak height Iw of the release agent. The peak unique to the release agent (wax resin) only is determined based on a peak position of 2580 $cm^{-1}$.

The obtained values, Ir and Iw, are used to calculate the ratio (Iw/Ir).

The above measurement is performed a total of four times according to the same procedure at different measurement sites in the same sample, and an average value of the ratios (Iw/Ir) is calculated.

The intensity ratio (Iw/Ir) of the obtained intensity (Iw) at the peak (2850 $cm^{-1}$) attributed to the release agent to the obtained intensity (Ir) at the peak (828 $cm^{-1}$) attributed to the binder resin (amorphous polyester resin) is defined as the relative release agent amount near the surface of the toner particle.

The peak (2850 $cm^{-1}$) attributed to the release agent is absorption based on symmetric stretching of the C—H of a methylene group. The peak (828 $cm^{-1}$) attributed to the binder resin (amorphous polyester resin) is absorption based on out-of-plane bending of the C—H of a benzene structure.

In relation to the ratio (Iw/Ir) measured by the above method, the depth for analysis is about 0.3 μm determined based on the measurement principle of FTIR-ATR (attenuated total reflection). Accordingly, the ratio (Iw/Ir) measured by the above method has the same meaning as representing the relative release agent amount in a region 0.3 μm in depth from the toner surface. Therefore, the ratio (Iw/Ir) represents the relative amount of the release agent present in the toner surface.

The related art cannot completely overcome degradation of heat-resistant storage stability of the toner due to the crystalline polyester disposed on the surface of the toner. The toner of the related art may be insufficient for achieving both low-temperature fixability and heat-resistant storage stability, both of which are in strong demand nowadays.

Also, in the related art, the shell layer inhibits conduction of heat from a fixing roller, and occasionally, the toner of the related art cannot have sufficient low-temperature fixability.

In a region where the total amount of the release agent is small, the amount of the release agent near the surface of the toner particle, indicated by the value of the ratio (Iw/Ir), is constantly 0. Once the total amount of the release agent exceeds a certain value, an increase in the value of the ratio (Iw/Ir) can be found.

This finding supports that the release agent in the toner particle is not selectively dispersed near the surface, but is uniformly dispersed in an inner region from the uppermost surface of the toner particle.

The release agent in the region 0.3 μm in depth from the surface of the toner particle analyzed through FTIR-ATR readily exudes to the toner surface, and thus effectively imparts release properties to the toner particle.

When allowed to bleed out (ooze out) to the image surface at the time of fixation, the release agent develops effects of release from a fixing member.

By virtue of such properties of the release agent, the obtained toner exhibits good release properties. When the intensity attributed to the release agent to the toner surface is high, however, the adhesive force of the toner to a fixing member becomes lower.

In view thereof, the present inventors have found that it is possible to achieve good fixing and release properties by controlling the intensity of the release agent in the toner surface (the ratio (Iw/Ir)) such that the intensity is 0.10 or more and 0.30 or less, as in the present disclosure.

As described above, in order to prevent the crystalline polyester resin from being exposed to the toner surface and to dispose the release agent near the toner surface in a certain amount or more, it is appropriate to properly adjust affinity to the crystalline polyester resin and to the binder resin other than the crystalline polyester resin of the release agent. In the present disclosure, the toner contains a material that has higher affinity to the crystalline polyester resin and that has lower affinity to the release agent than to the crystalline polyester resin. Specifically, for example, a hybrid resin, which is obtained by melt-kneading the crystalline polyester resin and the amorphous polyester resin, is introduced into the toner.

Although complete elucidation of the underlying principle has not been made, one possible mechanism envisaged by the present inventors is as follows. Specifically, a trans-esterification product produced by melt-kneading the crystalline polyester resin and the amorphous polyester resin increases affinity between the crystalline polyester resin and the amorphous polyester resin, and the crystalline polyester resin is encapsulated. Meanwhile, the amorphous polyester resin has lower affinity to the release agent than to the crystalline polyester resin, and the release agent is pushed out to the surface of the toner particle by the crystalline polyester resin.

The ratio (Iw/Ir) can be controlled by changing the amount of the non-crystalline hybrid resin to be charged.

Also, when the distances between the resin particles that are adjacent to each other on the surface of the toner base particle are denoted by L (nm), a standard deviation σ (nm) of the distances L (nm) is 150 nm or more and 500 nm or less.

In the present disclosure, the distances between the resin particles that are adjacent to each other each refer, in two resin particles that are adjacent to each other, to the shortest distance from the center of one of the resin particles to the center of the other resin particle. The center of the resin particle refers to the center of gravity of a shape of the resin particle identified in an image obtained by observing the toner base particle under a scanning electron microscope. The center of the resin particle is defined as an intersection point between the shorter diameter and the longer diameter of the resin particle that is assumed to be generally spherical. In this case, the shorter diameter and the longer diameter may or may not intersect each other perpendicularly.

The surface of the toner base particle is not flat but is slightly rounded (curved). Therefore, the distance between the resin particles that are adjacent to each other is not a measurement of the distance between the resin particles on the surface of the toner base particle, but is the shortest distance between the resin particles on an image obtained by capturing the resin particles on the surface of the toner base particle under a SEM.

In the toner of the present disclosure, the standard deviation σ (nm) of the distances L (nm) is 150 nm or more and 500 nm or less; i.e., the resin particles are spaced and uniformly arranged on the surface of the toner base particle. With this arrangement, it is possible to prevent exposure of materials such as the crystalline polyester without inhibiting conduction of heat to the toner at the time of fixation, leading to improved heat-resistant storage stability.

Also, when the standard deviation σ (nm) of the distances L (nm) is 150 nm or more and 500 nm or less, it is possible to optimize the adhesion strength of externally added inorganic particles, such as silica and titanium, to the surface of the toner base particle. This results in liberation of a certain amount of the inorganic particles from the toner base particle at the time of cleaning. The liberated inorganic particles are deposited on the contact surface between the cleaning blade and the photoconductor, leading to good cleanability. This is a finding obtained by the present inventors.

Moreover, when the standard deviation a (nm) of the distances L (nm) is 150 nm or more and 500 nm or less, it is possible to reduce the liberation amount of the inorganic particles to an appropriate amount, leading to prevention of filming.

<Toner Base Particles>

The toner base particles (hereinafter may be referred to as "toner bases" or "base particles") each include a binder resin, a colorant, wax. If necessary, the toner base particles may each further include other components.

<<Binder Resin>>

The binder resin is not particularly limited and may be appropriately selected in accordance with the intended purpose. Examples of the binder resin include a polyester resin, a styrene-acrylic resin, a polyol resin, vinyl resins, a polyurethane resin, an epoxy resin, a polyamide resin, a polyimide resin, silicon resins, a phenol resin, a melamine resin, a urea resin, an aniline resin, an ionomer resin, and a polycarbonate resin. These may be used alone or in combination. Of these, a polyester resin is preferable because it can impart flexibility to the resulting toner.

<<<Polyester Resin>>>

The polyester resin is not particularly limited and may be appropriately selected in accordance with the intended purpose. Examples of the polyester resin include a crystalline polyester resin, a non-crystalline polyester resin, a modified polyester resin, and a non-crystalline hybrid resin. These may be used alone or in combination.

—Non-Crystalline Polyester Resin—

The non-crystalline polyester resin (hereinafter may be referred to as "non-crystalline polyester", "amorphous polyester", "amorphous polyester resin", "unmodified polyester resin", or "polyester resin component A") is not particularly limited and may be appropriately selected in accordance with the intended purpose. Examples of the non-crystalline polyester resin include a non-crystalline polyester resin obtained through reaction between polyol and polycarboxylic acid.

In the present disclosure, the non-crystalline polyester resin refers to a product obtained through reaction between polyol and polycarboxylic acid, as described above. Any product obtained by modifying the polyester resin, such as the below-described prepolymer, or a modified polyester resin obtained through crosslinking and/or elongation reaction of the prepolymer is not included in the non-crystalline polyester resin, but is treated as a modified polyester resin in the present disclosure.

The unmodified polyester resin refers to a polyester resin obtained through reaction between multivalent alcohol and multivalent carboxylic acid (e.g., multivalent carboxylic acid itself, multivalent carboxylic anhydride, and multivalent carboxylic acid ester) or derivatives thereof, where the polyester resin is not modified with, for example, an isocyanate compound.

The non-crystalline polyester is a polyester resin component soluble in tetrahydrofuran (THF).

The non-crystalline polyester (the polyester resin component A) is preferably a linear polyester resin.

Examples of the polyol include diol.

Examples of the diol include: (C2-C3) alkylene oxides adducts of bisphenol A (the average number by mole of the alkylene oxides added: from 1 through 10), such as polyoxypropylene(2.2)-2,2-bis(4-hydroxyphenyl)propane and polyoxyethylene(2.2)-2,2-bis(4-hydroxyphenyl)propane; ethylene glycol and propylene glycol; hydrogenated bisphenol A; and (C2-C3) alkylene oxides adducts of hydrogenated bisphenol A (the average number by mole of the alkylene oxides added: from 1 through 10).

These may be used alone or in combination.

In particular, the polyol preferably includes alkylene glycol in an amount of 40 mol % or more.

Examples of the polycarboxylic acid include dicarboxylic acid.

Examples of the dicarboxylic acid include adipic acid, phthalic acid, isophthalic acid, terephthalic acid, fumaric acid, maleic acid, and C1-C20 alkyl group or C2-C20 alkenyl group-substituted succinic acid (e.g., dodecenyl succinic acid and octyl succinic acid).

These may be used alone or in combination.

In particular, the polycarboxylic acid preferably includes terephthalic acid in an amount of 50 mol % or more.

The non-crystalline polyester resin may include, for example, trivalent or higher carboxylic acid and/or trivalent or higher alcohol, or a trivalent or higher epoxy compound at terminals of the resin chain thereof, to adjust the acid value and the hydroxyl value of the non-crystalline polyester resin.

In particular, the non-crystalline polyester resin preferably includes trivalent or higher aliphatic alcohol because sufficient gloss and image density can be obtained and unevenness is unlikely to occur.

Examples of the trivalent or higher carboxylic acid include trimellitic acid, pyromellitic acid, and anhydrides thereof.

Examples of the trivalent or higher alcohol include glycerin, pentaerythritol, and trimethylolpropane.

Also, the non-crystalline polyester resin component preferably includes a crosslinking component.

The crosslinking component used in the non-crystalline polyester resin component can be, for example, trivalent or higher carboxylic acid or an epoxy compound. More preferably, however, the non-crystalline polyester resin component includes trivalent or higher aliphatic alcohol as the crosslinking component because sufficient gloss and image density can be obtained and unevenness is unlikely to occur.

As the crosslinking component, trivalent or higher aliphatic alcohol is preferably included. From the viewpoints of the gloss and image density of the fixed image, trivalent or tetravalent aliphatic alcohol is more preferably included. The trivalent or tetravalent aliphatic alcohol is preferably a trivalent or tetravalent aliphatic multivalent alcohol component having from 3 through 10 carbon atoms. The crosslinking component may be the trivalent or higher aliphatic alcohol alone.

The trivalent or higher aliphatic alcohol may be appropriately selected in accordance with the intended purpose. Examples of the trivalent or higher aliphatic alcohol include glycerin, trimethylolethane, trimethylolpropane, pentaerythritol, sorbitol, and dipentaerythritol. These trivalent or higher aliphatic alcohols may be used alone or in combination.

The molecular weight of the non-crystalline polyester resin is not particularly limited and may be appropriately selected in accordance with the intended purpose. The molecular weight of the non-crystalline polyester resin is preferably within one of the following ranges.

The weight average molecular weight (Mw) of the non-crystalline polyester resin is preferably 3,000 or higher and 10,000 or lower and more preferably 4,000 or higher and 7,000 or lower.

The number average molecular weight (Mn) of the non-crystalline polyester resin is preferably 1,000 or higher and 4,000 or lower and more preferably 1,500 or higher and 3,000 or lower.

A ratio (Mw/Mn) of the molecular weights of the non-crystalline polyester resin is preferably 1.0 or higher and 4.0 or lower and more preferably 1.0 or higher and 3.5 or lower.

The molecular weights can be measured through gel permeation chromatography (GPC).

The above-described ranges of the molecular weights are preferable for the following reasons. Specifically, when the molecular weights are too low, heat-resistant storage stability of the resulting toner and durability thereof against stress, such as stirring inside a developing device, may be impaired. When the molecular weights are too high, viscoelasticity of the resulting toner when it is melted may become higher and therefore low-temperature fixability may be impaired. When the amount of a component having a molecular weight of 600 or lower is too large, heat-resistant storage stability of the resulting toner and durability thereof against stress, such as stirring inside a developing device, may be impaired. When the amount of a component having a molecular weight of 600 or lower is too small, low-temperature fixability of the resulting toner may be impaired.

The amount of a THF-soluble component having a molecular weight of 600 or lower is preferably by mass or more and 10% by mass or less.

Examples of a method for adjusting the amount of the THF-soluble component having a molecular weight of 600 or lower include a method of extracting the non-crystalline polyester resin with methanol to remove the component having a molecular weight of 600 or lower for purification.

The acid value of the non-crystalline polyester resin is not particularly limited and may be appropriately selected in accordance with the intended purpose. The acid value of the non-crystalline polyester resin is preferably 1 mgKOH/g or higher and 50 mgKOH/g or lower and more preferably 5 mgKOH/g or higher and 30 mgKOH/g or lower. When the acid value of the non-crystalline polyester resin is 1 mgKOH/g or higher, the resulting toner tends to be negatively chargeable, and also has good affinity to paper at the time of fixation on the paper, leading to improved low-temperature fixability. When the acid value of the non-crystalline polyester resin is 50 mgKOH/g or lower, a disadvantageous phenomenon associated with charging stability, in particular, reduction in charging stability due to changes in the ambient environment, can be prevented.

The hydroxyl value of the non-crystalline polyester resin is not particularly limited and may be appropriately selected in accordance with the intended purpose. The hydroxyl value of the non-crystalline polyester resin is preferably 5 mgKOH/g or higher.

The glass transition temperature (Tg) of the non-crystalline polyester resin is preferably 40° C. or higher and 65° C. or lower, more preferably 45° C. or higher and 65° C. or lower, and still more preferably 50° C. or higher and 60° C. or lower. When the Tg of the non-crystalline polyester resin is 40° C. or higher, heat-resistant storage stability of the resulting toner and durability thereof against stress, such as stirring inside a developing device, are improved, and anti-filming properties thereof are also improved. When the Tg of the non-crystalline polyester resin is 65° C. or lower, the resulting toner desirably deforms upon application of heat and pressure at the time of fixation, and therefore low-temperature fixability thereof is improved.

The amount of the non-crystalline polyester resin is preferably 80 parts by mass or more and 90 parts by mass or less relative to 100 parts by mass of the toner.

—Crystalline Polyester Resin—

The crystalline polyester resin (hereinafter may be referred to as "crystalline polyester" or "polyester resin component D") is not particularly limited and may be appropriately selected in accordance with the intended purpose. Examples of the crystalline polyester resin include a crystalline polyester resin obtained through reaction between polyol and polycarboxylic acid.

The crystalline polyester resin has high crystallinity, and therefore exhibits such thermofusion properties that viscosity thereof drastically decreases at a temperature around the fixing onset temperature.

Because the crystalline polyester resin having such properties is used together with the non-crystalline polyester resin, good heat-resistant storage stability is obtained until the melt onset temperature owing to the crystallinity thereof, drastic reduction in viscosity (sharp melt) is caused at the melt onset temperature thereof owing to fusion of the crystalline polyester resin to be compatible to the non-crystalline polyester resin, and the rapid reduction in the viscosity makes the resulting toner to be fixed. Therefore, the toner having both good heat-resistant storage stability and good low-temperature fixability can be obtained. Moreover, a good releasable temperature width (a difference between the minimum fixable temperature and a hot-offset onset temperature) is also obtained. The crystalline polyester resin is obtained through reaction between multivalent alcohol (polyol) and multivalent carboxylic acid (e.g., multivalent carboxylic acid itself, multivalent carboxylic anhydride, and multivalent carboxylic acid ester) or derivatives thereof.

As described above, the crystalline polyester resin in the present disclosure refers to a product obtained through reaction between polyol and polycarboxylic acid. A product obtained by modifying the polyester resin, such as the below-described prepolymer, or a resin obtained through crosslinking and/or elongation reaction of the prepolymer is not included in the crystalline polyester resin.

——Multivalent Alcohol (Polyol)——

The multivalent alcohol (polyol) is not particularly limited and may be appropriately selected in accordance with the intended purpose. Examples of the multivalent alcohol (polyol) include diol and trivalent or higher alcohol.

Examples of the diol include saturated aliphatic diol.

Examples of the saturated aliphatic diol include straight-chain saturated aliphatic diol and branched saturated aliphatic diol. These may be used alone or in combination. In particular, straight-chain saturated aliphatic diol is preferable, and straight-chain saturated aliphatic diol having 2 or more and 12 or less carbon atoms is more preferable because use thereof can improve crystallinity and prevent a drop in the melting point thereof.

When the saturated aliphatic diol is branched, crystallinity of the crystalline polyester resin may decrease to cause a drop in the melting point thereof. When the number of carbon atoms in the saturated aliphatic diol exceeds 12, it may be difficult to produce such a material for practical use. The number of carbon atoms therein is more preferably 12 or less.

Examples of the saturated aliphatic diol include ethylene glycol, 1,3-propanediol, 1,4-butanediol, 1,5-pentanediol, 1,6-hexanediol, 1,7-heptanediol, 1,8-undecanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanediol.

Of these, ethylene glycol, 1,4-butanediol, 1,6-hexanediol, 1,8-octanediol, 1,10-decanediol, and 1,12-dodecanediol are preferable because the resulting crystalline polyester resin has high crystallinity and excellent sharp melting properties.

Examples of the trivalent or higher alcohol include glycerin, trimethylolethane, trimethylolpropane, and pentaerythritol.

——Multivalent Carboxylic Acid (Polycarboxylic Acid)——

The multivalent carboxylic acid (polycarboxylic acid) is not particularly limited and may be appropriately selected in accordance with the intended purpose. Examples of the multivalent carboxylic acid (polycarboxylic acid) include divalent carboxylic acid and trivalent or higher carboxylic acid.

Examples of the divalent carboxylic acid include: saturated aliphatic dicarboxylic acid, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acid, such as dibasic acid (e.g., phthalic acid, isophthalic acid, terephthalic acid, and naphthalene-2,6-dicarboxylic acid, malonic acid, and mesaconic acid); anhydrides thereof; and lower (C1-C3) alkyl esters thereof.

Examples of the trivalent or higher carboxylic acid include 1,2,4-benzenetricarboxylic acid, 1,2,5-benzenetricarboxylic acid, 1,2,4-naphthalenetricarboxylic acid, anhydrides thereof, and lower (C1-C3) alkyl esters thereof.

In addition to the saturated aliphatic dicarboxylic acid or the aromatic dicarboxylic acid, dicarboxylic acid having a sulfonic acid group may be included as the polycarboxylic acid. In addition to the saturated aliphatic dicarboxylic acid or the aromatic dicarboxylic acid, furthermore, dicarboxylic acid having a double bond may be included. These may be used alone or in combination.

The crystalline polyester resin is preferably formed from straight-chain saturated aliphatic dicarboxylic acid having 4 or more and 12 or less carbon atoms and straight-chain saturated aliphatic diol having 2 or more and 12 or less carbon atoms. In other words, the crystalline polyester resin preferably includes a structural unit derived from the saturated aliphatic dicarboxylic acid having 4 or more and 12 or less carbon atoms and a structural unit derived from the saturated aliphatic diol having 2 or more and 12 or less carbon atoms. The crystalline polyester resin formed therefrom is preferable because it has high crystallinity and excellent sharp melting properties, and thus can exhibit excellent low-temperature fixability.

In the present disclosure, the presence or absence of crystallinity of the crystalline polyester resin can be confirmed with a crystallography X-ray diffractometer (e.g., X'Pert Pro MRD, obtained from Philips). A measurement method therewith is described below.

First, a sample of interest is ground with a pestle and a mortar to prepare a powdered sample. The powdered sample obtained is uniformly applied in a sample holder. After that, the sample holder is set in the diffractometer, followed by measurement, to produce a diffraction spectrum.

When the peak half value width of the peak having the maximum peak intensity among the diffraction peaks obtained in the range of $20° < 2\theta < 25°$ is 2.0 or less, it is determined that the sample has crystallinity.

Differing from the crystalline polyester resin, a polyester resin that does not present the above peak pattern is referred to as a non-crystalline polyester resin in the present disclosure. Measuring conditions of the X-ray diffraction spectroscopy are described below.

[Measuring Conditions]

Tension kV: 45 kV
Current: 40 mA
MPSS
Upper
Gonio
Scanmode: continuous
Start angle: 3°
End angle: 35°

Angle Step: 0.02°
Lucident beam optics
Divergence slit: Div slit ½
Deflection beam optics
Anti scatter slit: As Fixed ½
Receiving slit: Prog rec slit The melting point of the crystalline polyester resin is not particularly limited and may be appropriately selected in accordance with the intended purpose. The melting point of the crystalline polyester resin is preferably 60° C. or higher and 80° C. or lower. When the melting point of the crystalline polyester resin is 60° C. or higher, it is possible to prevent degradation of the heat-resistant storage stability of the resulting toner, which would otherwise occur, due to the crystalline polyester resin that readily melts at low temperatures. When the melting point of the crystalline polyester resin is 80° C. or lower, it is possible to prevent degradation of the low-temperature fixability of the resulting toner, which would otherwise occur, due to the crystalline polyester resin that is insufficiently melted by application of heat at the time of fixation.

The molecular weight of the crystalline polyester resin is not particularly limited and may be appropriately selected in accordance with the intended purpose.

The weight average molecular weight (Mw) of the ortho-dichlorobenzene-soluble component of the crystalline polyester resin as measured through GPC is preferably from 3,000 through 30,000 and more preferably from 5,000 through 15,000.

The number average molecular weight (Mn) of the ortho-dichlorobenzene-soluble component of the crystalline polyester resin as measured through GPC is preferably from 1,000 through 10,000 and more preferably from 2,000 through 10,000.

A ratio (Mw)/(Mn) of the molecular weights of the crystalline polyester resin is preferably from 1.0 through 10 and more preferably from 1.0 through 5.0.

The above range of the ratio (Mw)/(Mn) is preferable because the crystalline polyester resin having a sharp molecular weight distribution and a low molecular weight has excellent low-temperature fixability, and heat-resistant storage stability is degraded when the crystalline polyester resin has a large quantity of the component having a low molecular weight.

The acid value of the crystalline polyester resin is not particularly limited and may be appropriately selected in accordance with the intended purpose. In order to achieve desired low-temperature fixability, the acid value of the crystalline polyester resin is preferably 5 mgKOH/g or higher and more preferably 10 mgKOH/g or higher, in terms of affinity between paper and resin. In order to improve hot-offset resistance, conversely, the acid value of the crystalline polyester resin is preferably 45 mgKOH/g or lower.

The hydroxyl value of the crystalline polyester resin is not particularly limited and may be appropriately selected in accordance with the intended purpose. In order to achieve desired low-temperature fixability and good chargeability, the hydroxyl value of the crystalline polyester resin is preferably from 0 mgKOH/g through 50 mgKOH/g and more preferably from 5 mgKOH/g through 50 mgKOH/g.

The molecular structure of the crystalline polyester resin can be confirmed through solution or solid NMR spectroscopy, X-ray diffraction spectroscopy, GC/MS, LC/MS, or IR spectroscopy. One simple method for confirming the molecule structure thereof is a method of detecting, as the crystalline polyester resin, a compound having absorption, which is based on δCH (out-of-plane bending vibration) of olefin, at 965±10 $cm^{-1}$ or 990±10 $cm^{-1}$ in an infrared absorption spectrum thereof.

The amount of the crystalline polyester resin is not particularly limited and may be appropriately selected in accordance with the intended purpose. The amount of the crystalline polyester resin is preferably 3 parts by mass or more and 20 parts by mass or less and more preferably 5 parts by mass or more and 15 parts by mass or less relative to 100 parts by mass of the toner. When the amount of the crystalline polyester resin is 3 parts by mass or more, it is possible to prevent degradation of the low-temperature fixability, which would otherwise occur, due to insufficient sharp melting of the crystalline polyester resin. When the amount of the crystalline polyester resin is 20 parts by mass or less, it is possible to prevent degradation of the heat-resistant storage stability and easy occurrence of image fogging, which would otherwise occur.

—Non-Crystalline Hybrid Resin—

The non-crystalline hybrid resin includes one or more resins selected from the group consisting of composite resins each containing a polycondensation resin and a styrene resin. In the non-crystalline hybrid resin, two polymer resin components having different reaction paths are partially chemically bonded, and at least one of the polymer resin components is formed of the same polymer resin component as the polymer resin component of a polyester resin. In the present disclosure, the non-crystalline hybrid resin may be simply referred to as a hybrid resin.

By including the non-crystalline hybrid resin in the toner, dispersibility of the crystalline polyester resin can be improved.

The non-crystalline hybrid resin controls exposure of the crystalline polyester to the toner surface and uniformly disperses the crystalline polyester inside the toner particle. Thereby, the non-crystalline hybrid resin can contribute to achieving both low-temperature fixability and heat-resistant storage stability.

The non-crystalline hybrid resin is preferably a resin obtained by mixing a mixture of monomers for the two polymer resins having different reaction paths with a monomer reactive with both of the monomers for the two polymer resins (bi-reactive monomer).

The bi-reactive monomer is preferably a monomer having, in a molecule thereof, at least one functional group selected from the group consisting of a hydroxyl group, a carboxyl group, an epoxy group, a primary amino group, and a secondary amino group; and an ethylenically unsaturated bond. The bi-reactive monomer can improve dispersibility of the resin as a disperse phase.

Specific examples of the bi-reactive monomer include acrylic acid, fumaric acid, methacrylic acid, citraconic acid, and maleic acid. Of these, acrylic acid, methacrylic acid, and fumaric acid are preferable.

The amount of the bi-reactive monomer is preferably 0.1 parts by mass or more and 10 parts by mass or less relative to 100 parts by mass of the monomers for the polycondensation resin. In the present disclosure, from the specificity of its properties, the bi-reactive monomer is treated as a monomer different from a monomer for a polycondensation resin and a monomer for an addition polymerization resin.

In the present disclosure, when the non-crystalline hybrid resin is obtained through two different polymerization reactions using the monomer mixture and the bi-reactive monomer as described above, the polymerization reactions may or may not progress and terminate at the same time. Depending on the respective reaction mechanisms, the reaction temperature and time can be appropriately selected to make the reaction progress and terminate.

An exemplary preferable method for producing the non-crystalline hybrid resin is as follows. Specifically, the monomer for the polycondensation resin, the monomer for the addition polymerization resin, the bi-reactive monomer, and a catalyst such as a polymerization initiator are mixed together, to first produce an addition polymerization resin component having a functional group capable of polycondensation reaction through, mainly, radical polymerization reaction at from 50° C. through 180° C. Next, the reaction temperature is increased to a temperature of from 190° C. through 270° C., to form a polycondensation resin component through, mainly, polycondensation reaction.

The softening point of the non-crystalline hybrid resin is preferably 80° C. or higher and 170° C. or lower, more preferably 90° C. or higher and 160° C. or lower, and still more preferably 95° C. or higher and 155° C. or lower.

A ratio by weight between the crystalline polyester resin and the non-crystalline hybrid resin is not particularly limited and may be appropriately selected in accordance with the intended purpose. For example, the ratio of the crystalline polyester resin: the non-crystalline hybrid resin is preferably from 50/100 through 200/100.

As the monomer for the polycondensation resin, a carboxylic acid component used is preferably a succinic acid derivative.

As the monomer for the styrene resin, a styrene derivative, such as styrene itself, α-methylstyrene, or vinyltoluene, is used.

The amount of the styrene derivative is preferably 50% by weight or more, more preferably 70% by weight or more, and still more preferably 80% by weight or more in the monomers for the styrene resin.

Examples of usable monomers for the styrene resin other than the styrene derivative include: (meth)acrylic acid alkyl ester; ethylenically unsaturated monoolefins such as ethylene and propylene; diolefins such as butadiene; halovinyls such as vinyl chloride; vinyl esters such as vinyl acetate and vinyl propionate; esters of ethylenic monocarboxylic acid, such as dimethylaminoethyl (meth)acrylate; vinyl ethers such as vinyl methyl ether; vinylidene halides such as vinylidene chloride; and N-vinyl compounds such as N-vinylpyrrolidone.

Of these, (meth)acrylic acid alkyl ester is preferable from the viewpoint of improving low-temperature fixability and charging stability of the resulting toner.

The number of carbon atoms in the alkyl group of the (meth)acrylic acid alkyl ester is, from the above point of view, preferably from 1 through 22 and more preferably from 8 through 18.

The number of carbon atoms of the alkyl ester refers to the number of carbon atoms derived from an alcohol component forming the ester. Specific examples of the (meth)acrylic acid alkyl ester include methyl (meth)acrylate, ethyl (meth) acrylate, (iso)propyl (meth)acrylate, 2-hydroxyethyl (meth) acrylate, (iso or tertiary)-butyl (meth)acrylate, 2-ethylhexyl (meth)acrylate, (iso)octyl (meth)acrylate, (iso)decyl (meth) acrylate, and (iso)stearyl (meth)acrylate.

The amount of the (meth)acrylic acid alkyl ester is, from the viewpoint of improving low-temperature fixability, heat-resistant storage stability, and charging stability of the resulting toner, preferably 50% by weight or less, more preferably 30% by weight or less, and still more preferably 20% by weight or less in the monomers for the styrene resin.

The amount of the hybrid resin is not particularly limited and may be appropriately selected in accordance with the intended purpose. The amount of the hybrid resin is preferably 15% by weight or more relative to the amount of the crystalline polyester. When the amount of the hybrid resin is less than 15% by weight, an obtainable effect of dispersing the crystalline polyester in the toner particle is low, and an excessive amount of the crystalline polyester may be disposed on the surface of the toner particle.

—Modified Polyester Resin—

The modified polyester resin (hereinafter may be referred to as "modified polyester" or "polyester resin component C") is not particularly limited and may be appropriately selected in accordance with the intended purpose. Examples of the modified polyester resin include a reaction product between an active hydrogen group-containing compound and a polyester resin having a site reactive with the active hydrogen group-containing compound (which may be referred to as "prepolymer" or "polyester prepolymer" in the present specification). The modified polyester is a polyester resin insoluble in tetrahydrofuran (THF). The polyester resin component insoluble in tetrahydrofuran (THF) reduces the Tg or melt viscosity of the resulting toner to ensure the low-temperature fixability thereof. The polyester resin component insoluble in tetrahydrofuran (THF) has a branched structure in a molecular skeleton thereof, and molecular chains thereof form a three-dimensional network structure. The resulting toner has such rubber-like properties that it deforms at low temperatures but does not flow.

The modified polyester resin has a structure represented by one of the following General Formulae 1) to 3), and in the structure, $R_2$ denoting polyester or a modified polyester moiety is bound via a urethane or urea bond to $R_1$ denoting a branched structure:

$R_1$—$(NHCONH—R_2)_n$—; Structural Formula 1)

$R_1$—$(NHCOO—R_2)_n$—; and Structural Formula 2)

$R_1$—$(OCONH—R_2)_n$—, Structural Formula 3)

where, in the above formulae, n is 3, $R_1$ is an isocyanurate skeleton, and $R_2$ is a group derived from a resin that is polyester containing polycarboxylic acid and polyol or is modified polyester obtained by modifying the polyester with isocyanate.

Because the modified polyester resin includes a urethane bond or a urea bond, or both in the branched structure, the urethane or the urea bond act as a pseudo-crosslink point to enhance rubber-like properties of the modified polyester resin. As a result, a toner excellent in heat-resistant storage stability and hot-offset resistance can be produced.

The modified polyester resin includes a diol component as a constituting component thereof, and further preferably includes a dicarboxylic acid component as a constituting component thereof.

The modified polyester resin is not particularly limited and may be appropriately selected in accordance with the intended purpose, as long as which denotes polyester or a modified polyester moiety, is bound to $R_1$, which denotes a branched structure, via a urethane or urea bond.

How to bind the $R_1$ and the $R_2$ to each other is not particularly limited but includes the following methods, for example:

a) a method of allowing a diol component and a dicarboxylic acid component to undergo esterification reaction to prepare polyester polyol ($R_2$) having a hydroxy group at the terminal thereof, and reacting the prepared polyester polyol with isocyanurate ($R_1$) and b) a method of allowing a diol component and a dicarboxylic acid component to undergo esterification reaction to prepare polyester polyol ($R_2$) having a hydroxy group at the terminal thereof, reacting the prepared polyester polyol with divalent polyisocyanate to prepare isocyanate-modified polyester ($R_2$), and reacting the isocyanate-modified polyester with isocyanurate ($R_1$) in the presence of pure water.

Alternatively, the hydroxyl group remaining in the polyol obtained by one of the above methods a) and b) may be further reacted with divalent or higher polyisocyanate to prepare a polyester prepolymer, which is then reacted with a curing agent for use in a toner production process.

During the toner production process, the reaction thereof with the curing agent produces a urea or urethane bond that exhibits behaviors like a strong crosslink point, to enhance rubber-like properties of the modified polyester. The resulting toner is further excellent in heat-resistant storage stability and hot-offset resistance. This is why it is more preferable to use a resin of isocyanate-modified polyester as the $R_2$ moiety.

In order to reduce the Tg of the modified polyester resin so that the modified polyester resin readily provides the resulting toner with properties deforming at low temperatures, the modified polyester contains a diol component in constituting components thereof. The diol component preferably contains aliphatic diol having 3 or more and 12 or less carbon atoms and more preferably contains aliphatic diol having 4 or more and 12 or less carbon atoms.

The modified polyester resin contains the aliphatic diol having 3 or more and 12 or less carbon atoms preferably in an amount of 50 mol % or more, more preferably 80 mol % or more, or still more preferably 90 mol % or more.

Examples of the aliphatic diol having 3 or more and 12 or less carbon atoms include 1,3-propanediol, 1,4-butanediol, 2-methyl-1,3-propanediol, 1,5-pentanediol, 3-methyl-1,5-pentanediol, 1,6-hexanediol, 1,8-octanediol, 1,10-decanediol, and 1,12-dodecanediol.

A particularly preferable modified polyester resin is a modified polyester resin where the diol component is aliphatic diol having 4 or more and 12 or less carbon atoms, the number of carbon atoms to form a main chain of the diol component is an odd number, and the diol component has an alkyl group in a side chain thereof.

The aliphatic diol having 4 or more and 12 or less carbon atoms where the number of carbon atoms to form the main chain is an odd number and the aliphatic diol has an alkyl group in a side chain thereof is, for example, aliphatic diol represented by General Formula (1) below.

$$HO—(CR_1R_2)_n—OH \qquad \text{General Formula (1)}$$

In the General Formula (1), $R_1$ and $R_2$ each independently represent a hydrogen atom or an alkyl group having from 1 through 3 carbon atoms.

n is an odd number in the range of from 3 through 9.

In the unit repeated n times, $R_1$s may be identical or different and $R_2$s may be identical or different.

In order to reduce the Tg of the modified polyester resin so that the modified polyester resin readily provides the resulting toner with properties deforming at low temperatures, the non-crystalline polyester resin C preferably contains an aliphatic diol having 3 or more and 12 or less carbon atoms in an amount of 50 mol % or more in all of the alcohol components.

In order to reduce the Tg of the modified polyester resin so that the modified polyester resin readily provides the resulting toner with properties deforming at low temperatures, preferably, the non-crystalline polyester resin C contains a dicarboxylic acid component in constituting components thereof and the dicarboxylic acid component contains aliphatic dicarboxylic acid having 4 or more and 12 or less carbon atoms.

The polyester resin preferably contains the aliphatic dicarboxylic acid having 4 or more and 12 or less carbon atoms in an amount of 30 mol % or more.

Examples of the aliphatic dicarboxylic acid having 4 or more and 12 or less carbon atoms include succinic acid, glutaric acid, adipic acid, pimelic acid, suberic acid, azelaic acid, sebacic acid, and dodecanedioic acid.

—Diol Component—

The diol component is not particularly limited and may be appropriately selected in accordance with the intended purpose. Examples of the diol component include aliphatic diol such as ethylene glycol, 1,2-propylene glycol, 1,3-propylene glycol, 1,4-butanediol, 2-methyl-1,3-propanediol, 1,5-pentanediol, 3-methyl-1,5-pentanediol, 1,6-hexanediol, 1,8-octanediol, 1,10-decanediol, and 1,12-dodecanediol; diol having an oxyalkylene group, such as diethylene glycol, triethylene glycol, dipropylene glycol, polyethylene glycol, polypropylene glycol, and polytetramethylene glycol; alicyclic diol such as 1,4-cyclohexanedimethanol and hydrogenated bisphenol A; adducts obtained by adding alkylene oxides (e.g., ethylene oxide, propylene oxide, and butylene oxide) to alicyclic diol; bisphenol such as bisphenol A, bisphenol F, and bisphenol S; and alkylene oxide adducts of bisphenol, such as adducts obtained by adding alkylene oxides (e.g., ethylene oxide, propylene oxide, and butylene oxide) to bisphenol.

In particular, the aliphatic diol having 4 or more and 12 or less carbon atoms is preferable.

These may be used alone or in combination.

—Dicarboxylic Acid Component—

The dicarboxylic acid component is not particularly limited and may be appropriately selected in accordance with the intended purpose. Examples of the dicarboxylic acid component include aliphatic dicarboxylic acid and aromatic dicarboxylic acid.

Also, anhydrides thereof, lower (C1-C3) alkyl esters thereof, and halides thereof may be used.

The aliphatic dicarboxylic acid is not particularly limited and may be appropriately selected in accordance with the intended purpose. Examples of the aliphatic dicarboxylic acid include succinic acid, adipic acid, sebacic acid, dodecanedioic acid, maleic acid, and fumaric acid.

The aromatic dicarboxylic acid is not particularly limited and may be appropriately selected in accordance with the intended purpose. The aromatic dicarboxylic acid is preferably aromatic dicarboxylic acid having 8 or more and 20 or less carbon atoms.

The aromatic dicarboxylic acid having 8 or more and 20 or less carbon atoms is not particularly limited and may be appropriately selected in accordance with the intended purpose. Examples of the aromatic dicarboxylic acid having 8 or more and 20 or less carbon atoms include phthalic acid, isophthalic acid, terephthalic acid, and naphthalene dicarboxylic acid.

In particular, the aliphatic dicarboxylic acid having 4 or more and 12 or less carbon atoms is preferable.

These may be used alone or in combination.

—Trivalent or Higher Alcohol—

The trivalent or higher alcohol is not particularly limited and may be appropriately selected in accordance with the intended purpose. Examples of the trivalent or higher alcohol include trivalent or higher aliphatic alcohol, trivalent or higher polyphenol, and an alkylene oxide adduct of trivalent or higher polyphenol.

Examples of the trivalent or higher aliphatic alcohol include glycerin, trimethylolethane, trimethylolpropane, pentaerythritol, and sorbitol. Examples of the trivalent or higher polyphenol include trisphenol PA, phenol novolac, and cresol novolac.

Examples of the alkylene oxide adduct of trivalent or higher polyphenol include alkylene oxide (e.g., ethylene oxide, propylene oxide, and butylene oxide) adducts of trivalent or higher polyols.

—Polyisocyanate—

The polyisocyante is not particularly limited and may be appropriately selected in accordance with the intended purpose. Examples of the polyisocyante include diisocyanate and trivalent or higher isocyanate.

Examples of the diisocyanate include aliphatic diisocyanate, alicyclic diisocyanate, aromatic diisocyanate, aromatic aliphatic diisocyanate, isocyanurate, and products obtained by blocking these with a phenol derivative, oxime, or caprolactam.

Examples of the trivalent or higher isocyanate include lysine triisocyanate, products obtained by reacting trivalent or higher alcohol with diisocyanate, and products obtained by reacting polyisocyanate so as to have an isocyanurate skeleton.

Of these, polyisocyanate having an isocyanurate skeleton is preferably used because it produces stronger crosslinking points and the resulting toner is excellent in heat-resistant storage stability and hot-offset resistance.

The trivalent isocyanate component is preferably 0.2 mol % or more and 1.0 mol % or less relative to the resin component in the THF-insoluble components of the toner.

When a crosslinked structure is formed by the trivalent isocyanate component, an aggregation force of molecular chains through pseudo crosslinking by urethan or urea bonds at the crosslinking points increases. Thereby, the resulting toner can have heat-resistant storage stability enhanced even at a lower crosslinking density and low-temperature fixability achieved at a high level.

The trivalent isocyanate component less than 0.2 mol % leads to insufficient formation of a branched structure. When sites where the network structure becomes ununiform are start points, the resulting toner may be degraded in heat-resistant storage stability and low-temperature fixability.

The trivalent isocyanate component more than 1.0 mol % may form a densely crosslinked structure to degrade the low-temperature fixability of the resulting toner.

The aliphatic diisocyanate is not particularly limited and may be appropriately selected in accordance with the intended purpose. Examples of the aliphatic diisocyanate include tetramethylene diisocyanate, hexamethylene diisocyanate, methyl 2,6-diisocyanatocaproate, octamethylene diisocyanate, decamethylene diisocyanate, dodecamethylene diisocyanate, tetradecamethylene diisocyanate, trimethylhexane diisocyanate, and tetramethylhexane diisocyanate.

The alicyclic diisocyanate is not particularly limited and may be appropriately selected in accordance with the intended purpose. Examples of the alicyclic diisocyanate include isophorone diisocyanate and cyclohexylmethane diisocyanate.

The aromatic diisocyanate is not particularly limited and may be appropriately selected in accordance with the intended purpose. Examples of the aromatic diisocyanate include tolylene diisocyanate, diisocyanatodiphenyl methane, 1,5-naphthylenediisocyanate, 4,4'-diisocyanatodiphenyl, 4,4'-diisocyanato-3,3'-dimethyldiphenyl, 4,4'-diisocyanato-3-methyldiphenylmethane, and 4,4'-diisocyanatodiphenyl ether.

The aromatic aliphatic diisocyanate is not particularly limited and may be appropriately selected in accordance with the intended purpose. Examples of the aromatic aliphatic diisocyanate include α,α,α',α'-tetramethylxylylene diisocyanate.

The isocyanurate is not particularly limited and may be appropriately selected in accordance with the intended purpose. Examples of the isocyanurate include tris(isocyanatoalkyl) isocyanurate and tris(isocyanatocycloalkyl) isocyanurate.

These may be used alone or in combination.

The glass transition temperature (Tg1st) of the toner of the present disclosure as determined at the first heating in differential scanning calorimetry (DSC) is preferably from 40° C. through 65° C. The glass transition temperature (Tg1st) of a tetrahydrofuran (THF)-insoluble component of the toner of the present disclosure as determined at the first heating in DSC is preferably from −45° C. through 5° C. The glass transition temperature (Tg2nd) of a THF-soluble component of the toner of the present disclosure as determined at the second heating in DSC is preferably from 20° C. through 65° C.

——Curing Agent——

The curing agent is not particularly limited and may be appropriately selected in accordance with the intended purpose, as long as it reacts with a polyester prepolymer (which refers to a reaction product between the above polyester moiety $R_2$ and the polyisocyanate; i.e., a reaction precursor to be reacted with the curing agent) to be able to produce the polyester resin. Examples of the curing agent include an active hydrogen group-containing compound.

—Active Hydrogen Group-Containing Compound—

The active hydrogen group in the active hydrogen group-containing compound is not particularly limited and may be appropriately selected in accordance with the intended purpose. Examples of the active hydrogen group include a hydroxyl group (an alcoholic hydroxyl group and a phenolic hydroxyl group), an amino group, a carboxyl group, and a mercapto group. These may be used alone or in combination.

The active hydrogen group-containing compound is not particularly limited and may be appropriately selected in accordance with the intended purpose. The active hydrogen group-containing compound is preferably an amine because the amine can form a urea bond.

The amine is not particularly limited and may be appropriately selected in accordance with the intended purpose. Examples of the amine include diamine, trivalent or higher amine, amino alcohol, aminomercaptan, amino acid, and these amines in which the amino groups are blocked.

These may be used alone or in combination.

In particular, diamine, and a mixture of diamine and a small amount of trivalent or higher amine are preferable.

The diamine is not particularly limited and may be appropriately selected in accordance with the intended purpose. Examples of the diamine include aromatic diamine, alicyclic diamine, and aliphatic diamine.

The aromatic diamine is not particularly limited and may be appropriately selected in accordance with the intended purpose. Examples of the aromatic diamine include phenylene diamine, diethyltoluene diamine, and 4,4'-diaminodiphenylmethane.

The alicyclic diamine is not particularly limited and may be appropriately selected in accordance with the intended purpose. Examples of the alicyclic diamine include 4,4'- diamino-3,3'-dimethyldicyclohexylmethane, diaminocyclohexane, and isophorone diamine.

The aliphatic diamine is not particularly limited and may be appropriately selected in accordance with the intended purpose. Examples of the aliphatic diamine include ethylene diamine, tetramethylene diamine, and hexamethylene diamine.

The trivalent or higher amine is not particularly limited and may be appropriately selected in accordance with the intended purpose. Examples of the trivalent or higher amine include diethylene triamine and triethylene tetramine.

The amino alcohol is not particularly limited and may be appropriately selected in accordance with the intended purpose. Examples of the amino alcohol include ethanolamine and hydroxyethylaniline.

The aminomercaptan is not particularly limited and may be appropriately selected in accordance with the intended purpose. Examples of the aminomercaptan include aminoethyl mercaptan and aminopropyl mercaptan.

The amino acid is not particularly limited and may be appropriately selected in accordance with the intended purpose. Examples of the amino acid include amino propionic acid and amino caproic acid.

The amine in which the amino group is blocked is not particularly limited and may be appropriately selected in accordance with the intended purpose. Examples of the amine include ketimine compounds and oxazoline compounds obtained by blocking an amino group with any of ketones, such as acetone, methyl ethyl ketone, and methyl isobutyl ketone.

The glass transition temperature of the modified polyester resin is preferably −60° C. or higher and 0° C. or lower and more preferably −40° C. or higher and −20° C. or lower.

When the glass transition temperature of the modified polyester resin is lower than −60° C., the resulting toner cannot be prevented from flowing at low temperatures and consequently may have degraded heat-resistant storage stability and degraded anti-filming properties.

When the glass transition temperature of the modified polyester resin is higher than 0° C., the resulting toner cannot be sufficiently deformed by application of heat and pressure during fixation and consequently may have insufficient low-temperature fixability.

As to the modified polyester, the $R_1$ in the above Structural Formula 1) to 3) preferably has an isocyanurate skeleton because the resulting toner is excellent in heat-resistant storage stability and hot-offset resistance.

As to the non-crystalline polyester resin C, the n in the above Structural Formula 1) to 3) is more preferably 3. This is because a three-dimensional network structure of the molecule is a state suitable to achieve high levels of low-temperature fixability, image gloss, heat-resistant storage stability, and offset resistance.

The weight average molecular weight of the modified polyester is not particularly limited and may be appropriately selected in accordance with the intended purpose. The weight average molecular weight of the modified polyester is preferably 20,000 or higher and 1,000,000 or lower as measured through gel permeation chromatography (GPC).

The weight average molecular weight of the modified polyester refers to a molecular weight of a reaction product obtained through reaction between the reaction precursor and the curing agent.

When the weight average molecular weight thereof is lower than 20,000, the resulting toner readily flows at low temperatures and consequently may have degraded heat-resistant storage stability.

Also, the resulting toner exhibits lower viscosity at the time of melting and consequently may have degraded hot-offset resistance.

The amount of the modified polyester is not particularly limited and may be appropriately selected in accordance with the intended purpose. The amount of the modified polyester is preferably 1 part by mass or more and 15 parts by mass or less and more preferably 5 parts by mass or more and 10 parts by mass relative to 100 parts by mass of the toner.

<<Release Agent>>

The release agent (wax) is not particularly limited and may be appropriately selected from publicly known release agents. Examples of the release agent include natural wax and synthetic wax. These may be used alone or in combination.

Examples of the natural wax include: vegetable wax, such as carnauba wax, cotton wax, and Japanese wax; animal wax, such as bees wax and lanolin wax; mineral wax, such as ozocerite and ceresin; and petroleum wax, such as paraffin wax, microcrystalline wax, and petrolatum wax.

Examples of the synthetic wax include: synthetic hydrocarbon wax, such as Fischer-Tropsch wax, polyethylene wax, and polypropylene wax; fatty acid amide compounds, such as ester, ketone, ether, 12-hydroxystearic acid amide, stearic acid amide, phthalimide anhydride, and chlorinated hydrocarbon; homopolymers or copolymers of polyacrylate, such as poly-n-stearyl methacrylate and poly-n-lauryl methacrylate that are low-molecular-weight crystalline polymeric resins (examples of the copolymers including a n-stearyl acrylate-ethyl methacrylate copolymer); and a crystalline polymer having a long alkyl chain in a side chain thereof.

Of these, hydrocarbon wax, such as paraffin wax, microcrystalline wax, Fischer-Tropsch wax, polyethylene wax, and polypropylene wax, is preferable.

The melting point of the release agent is not particularly limited and may be appropriately selected in accordance with the intended purpose. The melting point of the release agent is preferably 60° C. or higher and 80° C. or lower. When the melting point of the release agent is 60° C. or higher, the release agent readily melts at low temperatures to be able to prevent degradation of the heat-resistant storage stability of the resulting toner. When the melting point of the release agent is 80° C. or lower, it is possible to prevent a deficiency in an image, which would otherwise occur, due to fixation offset caused through insufficient melting of the release agent even when the resin is melted and the temperature is in the fixable temperature range.

The amount of the release agent is not particularly limited and may be appropriately selected in accordance with the intended purpose. The amount of the release agent is preferably 2 parts by mass or more and 10 parts by mass or less and more preferably 3 parts by mass or more and 8 parts by mass or less relative to 100 parts by mass of the toner. When the amount of the release agent is 2 parts by mass or higher, it is possible to prevent degradation of hot-offset resistance at the time of fixation and low-temperature fixability, which would otherwise occur. When the amount of the release agent is 10 parts by mass or less, it is possible to prevent, for example, degradation of heat-resistant storage stability and easy occurrence of image fogging of image fogging, which would otherwise occur.

<Other Components>

The toner of the present disclosure may include other components such as a colorant, a charge controlling agent, an external additive, a flowability improving agent, a cleanability improving agent, and a magnetic material.

<<Colorant>>

The colorant is not particularly limited and may be appropriately selected in accordance with the intended purpose. Examples of the colorant include carbon black, a nigrosine dye, iron black, naphthol yellow S, Hansa yellow (10G, 5G, G), cadmium yellow, yellow iron oxide, yellow ocher, yellow lead, titanium yellow, polyazo yellow, oil yellow, Hansa yellow (GR, A, RN, R), pigment yellow L, benzidine yellow (G, GR), permanent yellow (NCG), Vulcan fast yellow (5G, R), tartrazine lake, quinoline yellow lake, anthrasan yellow BGL, isoindolinon yellow, red iron oxide, red lead, lead vermilion, cadmium red, cadmium mercury red, antimony vermilion, permanent red 4R, parared, fiser red, parachloroorthonitro aniline red, lithol fast scarlet G, brilliant fast scarlet, brilliant carmine BS, permanent red (F2R, F4R, FRL, FRLL, F4RH), fast scarlet VD, vulcan fast rubin B, brilliant scarlet G, lithol rubin GX, permanent red F5R, brilliant carmine 6B, pigment scarlet 3B, Bordeaux 5B, toluidine Maroon, permanent Bordeaux F2K, Helio Bordeaux BL, Bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, Victoria blue lake, metal-free phthalocyanine blue, phthalocyanine blue, fast sky blue, indanthrene blue (RS, BC), indigo, ultramarine, iron blue, anthraquinone blue, fast violet B, methyl violet lake, cobalt purple, manganese violet, dioxane violet, anthraquinone violet, chrome green, zinc green, chromium oxide, viridian, emerald green, pigment green B, naphthol green B, green gold, acid green lake, malachite green lake, phthalocyanine green, anthraquinone green, titanium oxide, zinc flower, and lithopone.

The amount of the colorant is not particularly limited and may be appropriately selected in accordance with the intended purpose. The amount of the colorant is preferably 1 part by mass or more and 15 parts by mass or less and more preferably 3 parts by mass or more and 10 parts by mass or less relative to 100 parts by mass of the toner.

The colorant may be used also as a masterbatch in which the colorant forms a composite with a resin. Examples of the resin used for production of the masterbatch or kneaded together with the masterbatch include, in addition to the above polyester resins: polymers of styrene or substituted styrene, such as polystyrene, poly(p-chlorostyrene), and polyvinyl toluene; styrene copolymers, such as a styrene-p-chlorostyrene copolymer, a styrene-propylene copolymer, a styrene-vinyltoluene copolymer, a styrene-vinylnaphthalene copolymer, a styrene-methyl acrylate copolymer, a styrene-ethyl acrylate copolymer, d styrene-butyl acrylate copolymer, a styrene-octyl acrylate copolymer, a styrene-methyl methacrylate copolymer, a styrene-ethyl methacrylate copolymer, a styrene-butyl methacrylate copolymer, a styrene-methyl α-chloromethacrylate copolymer, a styrene-acrylonitrile copolymer, a styrene-methyl vinyl ketone copolymer, a styrene-butadiene copolymer, a styrene-isoprene copolymer, a styrene-acrylonitrile-indene copolymer, a styrene-maleic acid copolymer, and a styrene-maleic acid ester copolymer; polymethyl methacrylate, polybutyl methacrylate, polyvinyl chloride, polyvinyl acetate, polyethylene, polypropylene, polyester, an epoxy resin, an epoxy-polyol resin, polyurethane, polyamide, polyvinyl butyral, a polyacrylic resin, rosin, modified rosin, a terpene resin, an aliphatic or alicyclic hydrocarbon resin, an aromatic petroleum resin, chlorinated paraffin, and paraffin wax. These may be used alone or in combination.

The masterbatch can be obtained by applying a high shear force to a resin for a masterbatch and a colorant, to mix and knead the mixture. In order to enhance interaction between the colorant and the resin, an organic solvent may be used. Moreover, what is known as a flashing method is preferably used, because a wet cake of the colorant can be directly used without being dried. The flashing method is a method in which an aqueous paste containing a colorant is mixed and kneaded with a resin and an organic solvent, and then the colorant is transferred to the resin to remove the moisture and the organic solvent. A high-shearing disperser (e.g., a three-roll mill) is preferably used for the mixing and kneading.

The toner base particle may contain other components that are appropriately selected depending on the purpose without any limitation, as long as the other components are components that are used for typical toner base particles.

The amount of the other components is not particularly limited and may be appropriately selected in accordance with the intended purpose, as long as the other components do not degrade the properties of the toner.

<<Charge Controlling Agent>>

The charge controlling agent is not particularly limited and may be appropriately selected in accordance with the intended purpose. Examples of the charge controlling agent include a nigrosine dye, a triphenylmethane dye, a chrome-containing metal complex dye, a molybdic acid chelate pigment, a rhodamine dye, an alkoxy amine, a quaternary ammonium salt (including a fluorine-modified quaternary ammonium salt), alkylamide, phosphorus or a compound thereof, tungsten or a compound thereof, a fluorine-containing active agent, a metal salt of salicylic acid, and a metal salt of a salicylic acid derivative.

Examples of commercial products of the charge controlling agent include: nigrosine dye BONTRON 03, quaternary ammonium salt BONTRON P-51, metal-containing azo dye BONTRON S-34, oxynaphthoic acid metal complex E-82, salicylic acid metal complex E-84, and phenol condensate E-89 (all of which are obtained from ORIENT CHEMICAL INDUSTRIES CO., LTD), quaternary ammonium salt molybdenum complexes TP-302 and TP-415 (both of which are obtained from Hodogaya Chemical Co., Ltd.), LRA-901, and boron complex LR-147 (obtained from Japan Carlit Co., Ltd.).

The amount of the charge controlling agent is not determined unconditionally because the amount of the charge controlling agent depends on the binder resin for use, the presence of optionally used additives, and a toner producing method including a dispersion method. However, the amount of the charge controlling agent is preferably from 0.1 parts by mass through 10 parts by mass and more preferably from 0.2 parts by mass through 5 parts by mass relative to 100 parts by mass of the binder resin. When the amount of the charge controlling agent is more than 10 parts by mass, the effect of the charge controlling agent is not effectively exhibited due to too high chargeability of the resulting toner. As a result, the electrostatically attractive force with a developing roller increases and consequently may cause a drop in the flowability of a developer and a drop in the image density. The charge controlling agent may be melt-kneaded with a masterbatch or a resin, followed by dissolving or dispersing. Alternatively, the charge controlling agent may be directly added when toner materials are dissolved or dispersed in an organic solvent. Still alternatively, the charge controlling agent may be fixed on surfaces of toner particles after production of the toner particles.

<<External Additive>>

The external additive is not particularly limited and may be appropriately selected in accordance with the intended purpose. Examples of the external additive include silica particles, hydrophobic silica, fatty acid metal salts (e.g., zinc stearate and aluminum stearate), metal oxides (e.g., titania, alumina, tin oxide, and antimony oxide), and a fluoropolymer. These may be used alone or in combination. In particular, hydrophobicity-imparted inorganic particles are preferable.

Examples of the silica particles include R972, R974, RX200, RY200, R202, R805, and R812 (all of which are obtained from NIPPON AEROSIL CO., LTD.).

Examples of the titania particles include: P-25 (obtained from NIPPON AEROSIL CO., LTD.); STT-30 and STT-65C-S (both of which are obtained from Titan Kogyo, Ltd.); TAF-140 (obtained from Fuji Titanium Industry Co., Ltd.); and MT-150W, MT-500B, MT-600B, and MT-150A (all of which are obtained from TAYCA CORPORATION).

Examples of the hydrophobicity-imparted titanium oxide particles include: T-805 (obtained from NIPPON AEROSIL CO., LTD.); STT-30A and STT-65S-S (both of which are obtained from Titan Kogyo, Ltd.); TAF-500T and TAF-1500T (both of which are obtained from Fuji Titanium Industry Co., Ltd.); MT-100S and MT-100T (both of which are obtained from TAYCA CORPORATION); and IT-S (obtained from ISHIHARA SANGYO KAISHA, LTD.).

The hydrophobicity-imparted oxide particles, hydrophobicity-imparted silica particles, hydrophobicity-imparted titania particles, and hydrophobicity-imparted alumina particles can be obtained by, for example, treating hydrophilic particles with a silane coupling agent, such as methyltrimethoxysilane, methyltriethoxysilane, or octyltrimethoxysilane. Moreover, silicone oil-treated oxide particles or silicone oil-treated inorganic particles obtained by treating inorganic particles with silicone oil optionally by application of heat are also suitable.

Examples of the silicone oil include dimethylsilicone oil, methylphenylsilicone oil, chlorophenylsilicone oil, methylhydrogen silicone oil, alkyl-modified silicone oil, fluorine-modified silicone oil, polyether-modified silicone oil, alcohol-modified silicone oil, amino-modified silicone oil, epoxy-modified silicone oil, epoxy/polyether-modified silicone oil, phenol-modified silicone oil, carboxyl-modified silicone oil, mercapto-modified silicone oil, methacrylic-modified silicone oil, and α-methylstyrene-modified silicone oil.

The average particle diameter of primary particles of the external additive is not particularly limited and may be appropriately selected in accordance with the intended purpose. The average particle diameter of the primary particles of the external additive is preferably 100 nm or less, more preferably from 1 nm through 100 nm, still more preferably from 3 nm through 70 nm, and particularly preferably from 5 nm through 70 nm. When the average particle diameter of the primary particles of the external additive is within one of the above ranges, it is possible to prevent inorganic particles from being embedded in the toner particle not to effectively obtain the functions of the inorganic particles. In addition, it is also possible to prevent the inorganic particles from unevenly scratching the surface of a photoconductor.

The external additive preferably includes at least one group of hydrophobicity-imparted inorganic particles having an average particle diameter of primary particles of 20 nm or less and at least one group of hydrophobicity-imparted inorganic particles having an average particle diameter of primary particles of 30 nm or more.

The BET specific surface area of the external additive is from 20 $m^2/g$ through 500 $m^2/g$.

The amount of the external additive is not particularly limited and may be appropriately selected in accordance with the intended purpose. The amount of the external additive is preferably from 0.1 parts by mass through 5 parts by mass and more preferably from 0.3 parts by mass through 3 parts by mass relative to 100 parts by mass of the toner.

<<Flowability Improving Agent>>

The flowability improving agent is not particularly limited and may be appropriately selected in accordance with the intended purpose, as long as the flowability improving agent is an agent used for a surface treatment to be able to increase hydrophobicity to prevent degradation of flowability and charging properties even in high-humidity environment. Examples of the flowability improving agent include a silane coupling agent, a silylating agent, a fluoroalkyl group-containing silane coupling agent, an organic titanate coupling agent, an aluminum coupling agent, silicone oil, and modified silicone oil.

Particularly preferably, the silica and the titanium oxide are subjected to a surface treatment with any of the above flowability improving agents, and are used as hydrophobic silica and hydrophobic titanium oxide.

<<Cleanability Improving Agent>>

The cleanability improving agent is not particularly limited and may be appropriately selected in accordance with the intended purpose, as long as the cleanability improving agent is an agent added to the toner in order for the developer remaining after transfer to be removed from a photoconductor or a primary transfer medium. The cleanability improving agent may be appropriately selected in accordance with the intended purpose. Examples of the cleanability improving agent include: fatty acid (e.g., stearic acid) metal salts, such as zinc stearate and calcium stearate; and polymer particles produced through soap-free emulsion polymerization, such as polymethyl methacrylate particles and polystyrene particles.

The polymer particles preferably have a relatively narrow particle size distribution, and suitably have a volume average particle diameter of from 0.01 μm through 1 μm.

<<Magnetic Material>>

The magnetic material is not particularly limited and may be appropriately selected in accordance with the intended purpose. Examples of the magnetic material include iron powder, magnetite, and ferrite. Of these, white magnetic materials are preferable from the viewpoint of color tone.

The glass transition temperature (Tg1st) of the toner as determined at the first heating in differential scanning calorimetry (DSC) is preferably from 40° C. through 65° C.

The glass transition temperature (Tg1st) of the tetrahydrofuran (THF)-insoluble component of the toner as determined at the first heating in DSC is preferably from −45° C. through 5° C.

The glass transition temperature (Tg2nd) of the THF-soluble component of the toner as determined at the second heating in DSC is preferably from 20° C. through 65° C.

Preferably, the glass transition temperature (Tg1st) of the toner as determined at the first heating in differential scanning calorimetry (DSC) and the glass transition temperature (Tg2nd) of the toner as determined at the second heating in DSC satisfy Tg1st-Tg2nd≥10[° C.]. This is because the toner has improved low-temperature fixability and improved heat-resistant storage stability.

The glass transition temperature of the toner can be measured with, for example, a differential scanning calorimeter (DSC-60, obtained from Shimadzu Corporation).

An exemplary possible way to measure the glass transition temperature of the toner is as follows. Specifically, DSC curves are measured with the differential scanning calorimeter. The DSC curve at the first heating is selected from the obtained DSC curves using an analysis program. The glass transition temperature Tg1st at the first heating is determined using an endothermic shoulder temperature in the analysis program. Similarly, the DSC curve at the second heating is selected, and the glass transition temperature Tg2nd at the second heating is determined using the endothermic shoulder temperature.

In the toner of the present disclosure, the surface coverage (%) of the crystalline polyester on the toner surface is preferably 10% or higher and 20% or lower.

The surface coverage (%) of the crystalline polyester on the toner surface can be measured in the following manner.

[Method for Measuring the Coverage (%) of the Crystalline Polyester Resin on the Toner Particle Surface]

An exemplary method for measuring the coverage (%) of the crystalline polyester resin on the toner particle surface is a method by observation and analyzation using a transmission electron microscope (TEM). Specifically, the coverage of the crystalline polyester resin on the toner particle surface is calculated from a TEM image of a cross-sectional surface of the toner particle.

The above measuring method can be performed according to the following procedure, for example.

[Preparation of Sample]

(1) Toner particles are sufficiently dispersed in an epoxy resin that is curable at normal temperature. Then, the resulting dispersion is left to stand for one day or longer to allow the epoxy resin to undergo curing reaction, to produce a cured product in which the toner particles are embedded.

(2) The cured product, in which the toner particles are embedded, is cut into a thin-film section under the following cutting conditions. The obtained thin-film section is stained with ruthenium tetroxide.

—Cutting Conditions—

Cutting thickness: 75 nm

Cutting speed: from 0.05 through 0.2 mm/sec

Diamond knife used (Ultra Sonic 35°)

A transmission electron microscope (TEM) is used to capture an image of the cross-sectional surfaces of the toner particles so as to cover one toner particle in as large a state as possible in the field of view.

Because ruthenium tetroxide stains toner particle's components having different crystallinities at different contrasts, it is possible to identify domains of the crystalline resin contained in the toner particles. In the cross-sectional surface of the toner particle observed, the component stained in bars or lines to have a lamella structure derived from crystallinity can be regarded as the crystalline polyester resin.

Figure 4:
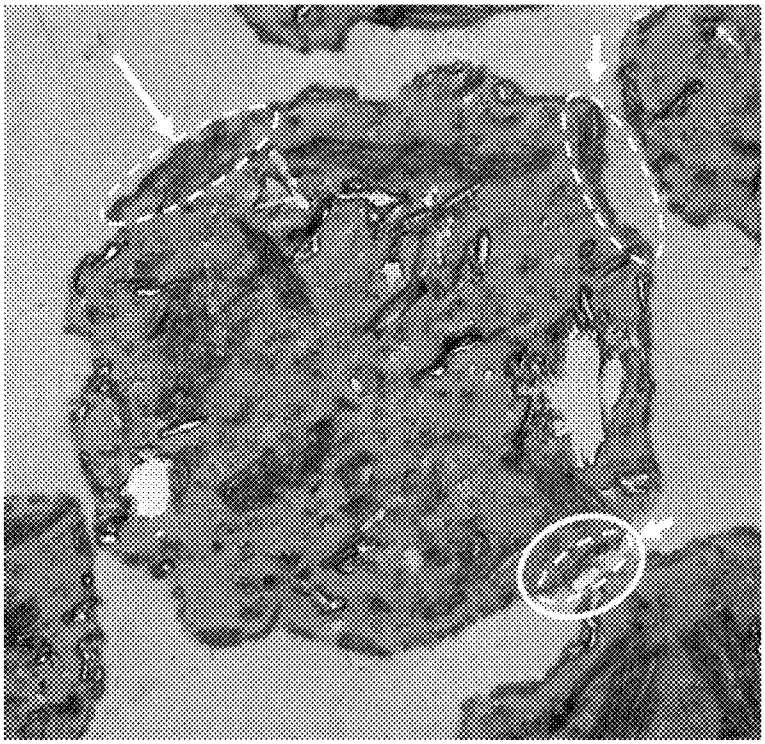
FIG. 4 is a view illustrating one example of an image obtained by observing toner particles of Example 1 under a transmission electron microscope after the toner particles are cut into a section followed by staining with a 0.5% aqueous solution of ruthenium tetroxide.

FIG. 4 is a view illustrating one example of an image obtained by observing toner particles under a transmission electron microscope after the toner particles are cut into a section followed by staining with a 0.5% aqueous solution of ruthenium tetroxide.

As illustrated in FIG. 4, in the image observed under a transmission electron microscope (TEM), for example, linear or lamella-structured objects scattered in the toner particle (crystals, dot-line enclosed portions in FIG. 4) are determined as the crystalline polyester resin. In FIG. 4, the release agent is the object in the form of a white mass observed near the center of the region enclosed by a solid line and a dot line.

First, a captured image is binarized to measure the length $L_T$ of the outline of the uppermost surface of an individual particle (the length of the outer periphery of the toner particle in the cross-sectional surface thereof).

Then, a length $L_{Open}$ is measured, which is a length of the total of the regions determined as the crystalline polyester resin in the binarized image relative to the uppermost surface of the toner particle.

The measured lengths, $L_T$ and $L_{Open}$, are used to calculate a ratio of ($L_{Open}/L_T$).

An average value of the ratios for 10 toner particles or an average value of the ratios for 10 different cross-sectional images is calculated and defined as "coverage of the crystalline polyester resin on the toner particle surface" in the present disclosure.

When it is difficult to distinguish the crystalline polyester resin and the release agent from each other, the following treatment (3) may be performed between the above (1) and the above (2). Extraction of the release agent from the toner particles makes it possible to more clearly observe the crystalline polyester resin.

(3) A microtome with a diamond cutter is used to expose the cross-sectional surface of the cured product. The cured product having the exposed cross-sectional surface is immersed, for 3 hours, in an organic solvent (hexane) in which only the release agent dissolves, to dissolve only the domains of the release agent.

Observation under a transmission electron microscope can be performed under the following conditions, for example.

[Conditions for Observation]

Device used: transmission electron microscope JEM-2100F, obtained from JEOL Ltd.

Acceleration voltage: 200 kV

Observation of forms: bright field observation

Set conditions: spot size: 3, CLAP: 1, OLAP: 3, Alpha: 3

The coverage of the crystalline polyester resin is measured based on the above TEM image. Specifically, the cross-sectional surfaces of 50 toner particles are observed. The toner particles to be observed for the cross-sectional surfaces thereof are toner particles each having a cross-sectional surface with a longer diameter within ±20% of the number average particle diameter of the toner particles. The number average particle diameter of the toner particles is measured with a particle size distribution analyzer (MULTISIZER III, obtained from Beckman Coulter, Inc.).

<Resin Particles>

The resin particles are present on the surface of the toner base particle.

The resin particles satisfy the following conditions.

A standard deviation σ (nm) of distances L (nm) between the resin particles that are adjacent to each other on the surface of the toner base particle is 150 nm or more and 500 nm or less.

In the present disclosure, the distances between the resin particles that are adjacent to each other each refer, in two resin particles that are adjacent to each other, to the shortest distance from the center of one of the resin particles to the center of the other resin particle.

The center of the resin particle refers to the center of gravity of a shape of the resin particle identified in an image obtained by observing the toner base particle under a scanning electron microscope. The center of the resin particle is defined as an intersection point between the shorter diameter and the longer diameter of the resin particle that is assumed to be generally spherical. In this case, the shorter diameter and the longer diameter may or may not intersect each other perpendicularly.

The surface of the toner base particle is not flat but is slightly rounded (curved). Therefore, the distance between the resin particles that are adjacent to each other is not a measurement of the distance between the resin particles on the surface of the toner base particle, but is the shortest distance between the resin particles on an image obtained by capturing the resin particles on the surface of the toner base particle under a SEM.

In the toner of the present disclosure, the standard deviation σ (nm) of the distances L (nm) is 150 nm or more and 500 nm or less; i.e., the resin particles are spaced and uniformly arranged on the surface of the toner base particle. With this arrangement, it is possible to prevent exposure of materials such as the crystalline polyester without inhibiting conduction of heat to the toner at the time of fixation, leading to improved heat-resistant storage stability.

Also, when the standard deviation σ (nm) of the distances L (nm) is 150 nm or more and 500 nm or less, it is possible to optimize the adhesion strength of externally added inorganic particles, such as silica and titanium, to the surface of the toner base particle. This results in liberation of a certain amount of the inorganic particles from the toner base particle at the time of cleaning. The liberated inorganic particles are deposited on the contact surface between the cleaning blade and the photoconductor, leading to good cleanability. This is a finding obtained by the present inventors.

Moreover, when the standard deviation σ (nm) of the distances L (nm) is 150 nm or more and 500 nm or less, it is possible to reduce the liberation amount of the inorganic particles to an appropriate amount, leading to prevention of filming.

In the toner of the present disclosure, M denotes a volume average primary particle diameter of the resin particles.

The M and L preferably satisfy the relationship: M<L. If the M<L is true, the toner can have improved low-temperature fixability.

The L is not particularly limited and may be appropriately selected in accordance with the intended purpose. The L−M is preferably smaller than 30 nm. When the difference of the L−M is smaller than 30 nm, the toner can be prevented from degradation of the heat and humidity-resistant storage stability.

In the toner of the present disclosure, a ratio of the M to L [M (nm)/L (nm)] is 0.40 or more and less than 0.90, preferably 0.50 or more and less than 0.80, and more preferably 0.60 or more and less than 0.70. When the ratio [M (nm)/L (nm)] is less than 0.40, the toner may be degraded in heat-resistant storage stability and cleanability. When the ratio [M (nm)/L (nm)] is 0.90 or more, the toner may be degraded in heat-resistant storage stability.

The volume average primary particle diameter M of the resin particles is preferably more than 5 nm and equal to or less than 60 nm and more preferably more than 10 nm and equal to or less than 50 nm. When the volume average primary particle diameter of the resin particles is more than 5 nm, the resin particles can prevent degradation of the heat-resistant storage stability of the toner. When the volume average primary particle diameter of the resin particles is 60 nm or less, the resin particles can improve the low-temperature fixability of the toner.

The volume average primary particle diameter M can be measured using an image obtained with a scanning electron microscope (SEM) as described below.

The relationship between M and L in the present disclosure is described in more detail with reference to the drawing. FIG. 1 is a schematic view illustrating a state of the toner surface. As illustrated in FIG. 1, resin particles 3 are on a toner base particle 4. Each of the resin particles 3 is formed of a core resin (b2) 2 and a shell resin (b1) 1, which are described below. The M denotes a volume average primary particle diameter of the resin particles 3. The L denotes the distance between the resin particles 3 that are adjacent to each other.

The M and L are measured through observation under a scanning electron microscope (SEM) after the external additive is removed as much as possible with a liberation treatment using ultrasonic waves to make the toner particle as close as the state of the toner base particle in the following manner.

—Method for Liberating External Additive—

[1] A 100 mL screw vial is charged with 50 mL of a 5% by mass aqueous surfactant solution (product name: NOIGEN ET-165, obtained from DKS Co., Ltd.). The solution in the vial is mixed with 3 g of the toner. The vial is gently moved in up-to-down and left-to-right motions. After that, the resulting mixture is stirred in a ball mill for 30 min to uniformly disperse the toner in the dispersion liquid.

[2] Then, ultrasonic energy is applied to the resulting mixture for 60 minutes with an ultrasonic homogenizer (product name: homogenizer, model: VCX750, CV33, obtained from SONICS & MATERIALS, Inc.) with the output being set to 40 W.

—Conditions of Ultrasonic Waves—

Vibration duration: continuous 60 minutes
Amplitude: 40 W
Vibration onset temperature: 23±1.5° C.
Temperature during vibration: 23±1.5° C.

[3]

(1) The dispersion liquid is subjected to vacuum filtration with filter paper (product name: Qualitative filter paper (No. 2, 110 mm), obtained from Advantec Toyo Kaisha, Ltd.). The resulting product is washed twice with ion-exchanged water, followed by filtration. The additive that has been liberated is removed, followed by drying, to produce the toner particles.

(2) An image of the toner obtained in the above (1) is captured using a scanning electron microscope (SEM) and observed. First, a backscattered electron image is observed to detect the external additive and filler containing Si.

(3) The image obtained in the above (2) is binarized using image processing software (ImageJ), to eliminate the external additive and filler.

Next, the toner at the same position as in the above (2) is observed to produce a secondary electron image. The resin particles are not observed in the backscattered electron image, but are observed only in the secondary electron image. In comparison to the image obtained in the above (3), therefore, the particles present in the region other than the residual external additive and filler (i.e., the other region than the region excluded in the above (3)) are determined as the resin particles. The above image processing software is used to measure a volume average primary particle diameter of the resin particles and the distance between the resin particles (i.e., the distance from the center of one particle to the center of another particle adjacent to the one particle).

[Image Capturing Conditions]

Scanning electron microscope: SU-8230 (obtained from Hitachi High-Tech Corporation)
Image capturing magnification: ×35,000

Captured image: secondary electron (SE(L)) image, back-scattered electron (BSE) image Acceleration voltage: 2.0 kV Acceleration current: 1.0 μA Probe current: Normal Focus mode: UHR WD: 8.0 mm The above measurement is performed on 100 binarized images (one toner particle per image). The average value of the measurements is determined as a measurement result.

A standard deviation of the distances between the resin particles is calculated from the following mathematical formula, with x denoting the distances between the resin particles.

$$\sqrt{\frac{l}{n-l}\sum_{k=l}^{n}}\ (x_i-\bar{x})$$

Each of the resin particles (hereinafter may be referred to as "resin particles (B)") preferably includes a core resin (a core) and a shell resin (a shell) covering at least part of the surface of the core resin. More preferably, the resin particle is formed of a core resin (hereinafter may be referred to as "resin (b2)") and a shell resin (hereinafter may be referred to as "resin (b1)"). Still more preferably, the shell resin (b1) and the core resin (b2) include vinyl units.

The vinyl units in the shell resin (b1) and the core resin (b2) are preferably polymers obtained by homopolymerizing or copolymerizing vinyl monomers.

Examples of the vinyl monomers include the following (1) to (10).

(1) Vinyl Hydrocarbon

Examples of the vinyl hydrocarbon include (1-1) aliphatic vinyl hydrocarbon, (1-2) alicyclic vinyl hydrocarbon, and (1-3) aromatic vinyl hydrocarbon.

(1-1) Aliphatic Vinyl Hydrocarbon

Examples of the aliphatic vinyl hydrocarbon include alkene and alkadiene.

Specific examples of the alkene include ethylene, propylene, and α-olefin.

Specific examples of the alkadiene include butadiene, isoprene, 1,4-pentadiene, 1,6-hexadiene, and 1,7-octadiene.

(1-2) Alicyclic Vinyl Hydrocarbon

Examples of the alicyclic vinyl hydrocarbon include monocycloalkene, dicycloalkene, and alkadiene. Specific examples of the alicyclic vinyl hydrocarbon include (di) cyclopentadiene and terpene.

(1-3) Aromatic Vinyl Hydrocarbon

Examples of the aromatic vinyl hydrocarbon include styrene, and hydrocarbyl (alkyl, cycloalkyl, aralkyl, and/or alkenyl)-substituted styrene. Specific examples of the aromatic vinyl hydrocarbon include α-methylstyrene, 2,4-dimethylstyrene, and vinyl naphthalene.

(2) Carboxyl Group-Containing Vinyl Monomer and Salts Thereof

Examples of the carboxyl group-containing vinyl monomer and salts thereof include C3-C30 unsaturated monocarboxylic acid (salt), unsaturated dicarboxylic acid (salt), anhydrides (salts) thereof, and monoalkyl (C1-C24) esters thereof or salts thereof.

Specific examples of the carboxyl group-containing vinyl monomer and salts thereof include: carboxyl group-containing vinyl monomers, such as (meth)acrylic acid, maleic (anhydride), maleic acid monoalkyl ester, fumaric acid, fumaric acid monoalkyl ester, crotonic acid, itaconic acid, itaconic acid monoalkyl ester, itaconic acid glycol monoether, citraconic acid monoalkyl ester, and cinnamic acid; and metal salts thereof.

In the present disclosure, the term "acid (salt)" means acid or a salt of the acid.

For example, the C3-C30 unsaturated monocarboxylic acid (salt) means an unsaturated monocarboxylic acid or a salt of the unsaturated monocarboxylic acid.

In the present disclosure, the term "(meth)acryl" means methacrylic acid or acrylic acid.

In the present disclosure, the term "(meth)acryloyl" means methacryloyl or acryloyl.

In the present disclosure, the term "(meth)acrylate" means methacrylate or acrylate.

(3) Sulfonic Acid Group-Containing Vinyl Monomer, Vinyl Sulfuric Acid Monoester Compound, and Salts Thereof Examples of the sulfonic acid group-containing vinyl monomer, vinyl sulfuric acid monoester compound, and salts thereof include C2-C14 alkene sulfonic acid (salt), C2-C24 alkyl sulfonic acid (salt), sulfo(hydroxy)alkyl-(meth)acrylate (salt), sulfo(hydroxy)alkyl-(meth)acrylamide (salt), and alkylallylsulfosuccinic acid (salt).

Specific examples of the C2-C14 alkene sulfonic acid include vinyl sulfonic acid (salt). Specific examples of the C2-C24 alkyl sulfonic acid (salt) include α-methylstyrene-sulfonic acid (salt). Specific examples of the sulfo(hydroxy) alkyl-(meth)acrylate (salt) or the sulfo(hydroxy)alkyl-(meth)acrylamide (salt) include sulfopropyl(meth)acrylate (salt), sulfuric acid ester (salt), and a sulfonic acid group-containing vinyl monomer (salt).

(4) Phosphoric Acid Group-Containing Vinyl Monomer and Salts Thereof

Examples of the phosphoric acid group-containing vinyl monomer and salts thereof include (meth)acryloyloxyalkyl (C1-C24) phosphoric acid monoester (salt) and (meth)acryloyloxyalkyl (C1-C24) phosphonic acid (salt).

Specific examples of the (meth)acryloyloxyalkyl (C1-C24) phosphoric acid monoester (salt) include 2-hydroxyethyl(meth)acryloyl phosphate (salt) and phenyl-2-acryloyloxyethyl phosphate (salt).

Specific examples of the (meth)acryloyloxyalkyl (C1-C24) phosphonic acid (salt) include 2-acryloyloxyethylphosphonic acid (salt).

Examples of salts of the above (2) to (4) include alkali metal salts (e.g., sodium salt and potassium salt), alkaline earth metal salts (e.g., calcium salt and magnesium salt), ammonium salts, amine salts, and quaternary ammonium salts.

(5) Hydroxyl Group-Containing Vinyl Monomer

Examples of the hydroxyl group-containing vinyl monomer include hydroxystyrene, N-methylol (meth)acrylamide, hydroxyethyl (meth)acrylate, hydroxypropyl (meth)acrylate, polyethylene glycol mono(meth)acrylate, (meth)allyl alcohol, crotyl alcohol, isocrotyl alcohol, 1-buten-3-ol, 2-buten-1-ol, 2-butane-1,4-diol, propargylalcohol, 2-hydroxyethylpropenyl ether, and sucrose allyl ether.

(6) Nitrogen-Containing Vinyl Monomer

Examples of the nitrogen-containing vinyl monomer include (6-1) an amino group-containing vinyl monomer, (6-2) an amide group-containing vinyl monomer, (6-3) a nitrile group-containing vinyl monomer, (6-4) a quaternary ammonium cation group-containing vinyl monomer, and (6-5) a nitro group-containing vinyl monomer.

Examples of the (6-1) amino group-containing vinyl monomer include aminoethyl (meth)acrylate.

Examples of the (6-2) amide group-containing vinyl monomer include (meth)acrylamide and N-methyl (meth) acrylamide.

Examples of the (6-3) nitrile group-containing vinyl monomer include (meth)acrylonitrile, cyanostyrene, and cyanoacrylate.

Examples of the (6-4) quaternary ammonium cation group-containing vinyl monomer include a quaternized compound (quaternized using a quaternizing agent, such as methyl chloride, dimethyl sulfate, benzyl chloride, and dimethyl carbonate) of a tertiary amine group-containing vinyl monomer (e.g., dimethylaminoethyl (meth)acrylate, diethylaminoethyl (meth)acrylate, dimethylaminoethyl (meth)acrylamide, diethylaminoethyl (meth)acrylamide, and diallylamine).

Examples of the (6-5) nitro group-containing vinyl monomer include nitrostyrene.

(7) Epoxy Group-Containing Vinyl Monomer

Examples of the epoxy group-containing vinyl monomer include glycidyl (meth)acrylate, tetrahydrofurfuryl (meth) acrylate, and p-vinylphenylphenyloxide.

(8) Halogen Element-Containing Vinyl Monomer

Examples of the halogen element-containing vinyl monomer include vinyl chloride, vinyl bromide, vinylidene chloride, allyl chloride, chlorostyrene, bromostyrene, dichlorostyrene, chloromethylstyrene, tetrafluorostyrene, and chloroprene.

(9) Vinyl Ester, Vinyl (Thio)Ether, Vinyl Ketone

Examples of the vinyl ester include vinyl acetate, vinyl butyrate, vinyl propionate, vinyl butyrate, diallyl phthalate, diallyl adipate, isopropenyl acetate, vinyl methacrylate, methyl 4-vinylbenzoate, cyclohexyl methacrylate, benzyl methacrylate, phenyl (meth)acrylate, vinyl methoxy acetate, vinyl benzoate, ethyl α-ethoxyacrylate, C1-C50 alkyl group-containing alkyl(meth)acrylate [e.g., methyl (meth)acrylate, ethyl (meth)acrylate, propyl (meth)acrylate, butyl (meth) acrylate, 2-ethylhexyl (meth)acrylate, dodecyl (meth)acrylate, hexadecyl (meth)acrylate, heptadecyl (meth)acrylate, octadecyl (meth)acrylate, eicosyl (meth)acrylate, and behenyl (meth)acrylate)], dialkyl fumarate (where two alkyl groups are each a C2-C8 straight-chain or branched-chain alicyclic group), dialkyl maleate (where two alkyl groups are each a C2-C8 straight-chain, branched-chain, or alicyclic group), poly(meth)allyloxy alkane [e.g., diallyloxy ethane, triallyloxy ethane, tetraallyloxy ethane, tetraallyloxy propane, tetraallyloxy butane, and tetrametha-allyloxy ethane], a polyalkylene glycol chain-containing vinyl monomer [e.g., polyethylene glycol (molecular weight: 300) mono(meth) acrylate, polypropylene glycol (molecular weight: 500) monoacrylate, (meth)acrylate of a methyl alcohol ethylene oxide (10 mol) adduct, and (meth)acrylate of a lauryl alcohol ethylene oxide (30 mol) adduct], and poly(meth)acrylate [e.g., poly(meth)acrylate of multivalent alcohol:ethylene glycol di(meth)acrylate, propylene glycol di(meth)acrylate, neopentyl glycol di(meth)acrylate, trimethylolpropane tri (meth)acrylate, and polyethylene glycol di(meth)acrylate].

Examples of the vinyl (thio)ether include vinyl methyl ether.

Examples of the vinyl ketone include methyl vinyl ketone.

(10) Other Vinyl Monomers

Examples of the other vinyl monomers include tetrafluoroethylene, fluoroacrylate, isocyanatoethyl (meth)acrylate, and m-isopropenyl-α,α-dimethylbenzyl isocyanate.

For synthesis of the shell resin (b1), the above vinyl monomers (1) to (10) may be used alone or in combination.

From the viewpoint of improving low-temperature fixability of the resulting toner, the shell resin (b1) is preferably a styrene-(meth)acrylic acid ester copolymer or a (meth) acrylic acid ester copolymer, with a styrene-(meth)acrylic acid ester copolymer being more preferable.

When the shell resin (b1) includes carboxylic acid, an acid value is given to the resin, and a toner particle including resin particles on the surface thereof is readily formed.

Examples of the vinyl monomer used for the core resin (b2) include similar vinyl monomers used for the shell resin (b1).

For synthesis of the core resin (b2), the above vinyl monomers (1) to (10) exemplified for the shell resin (b1) may be used alone or in combination.

From the viewpoint of improving low-temperature fixability of the resulting toner, the core resin (b2) is preferably a styrene-(meth)acrylic acid ester copolymer or a (meth) acrylic acid ester copolymer, with a styrene-(meth)acrylic acid ester copolymer being more preferable.

The viscoelastic loss modulus G" of the shell resin (b1) at 100° C. and a frequency of 1 Hz is preferably 1.5 MPa or higher and 100 MPa or lower, more preferably 1.7 MPa or higher and 30 MPa or lower, and still more preferably 2.0 MPa or higher and 10 MPa or lower.

The viscoelastic loss modulus G" of the core resin (b2) at 100° C. and a frequency of 1 Hz is preferably 0.01 MPa or higher and 1.0 MPa or lower, more preferably 0.02 MPa or higher and 0.5 MPa or lower, and still more preferably 0.05 MPa or higher and 0.3 MPa or lower.

When the viscoelastic loss modulus G" is one of the above ranges, it is easier to form a toner particle including, on the surface thereof, resin particles each including the shell resin (b1) and the core resin (b2) as constituting components thereof.

The viscoelastic loss modulus G" of the shell resin (b1) and the core resin (b2) at 100° C. and d frequency of 1 Hz can be adjusted by varying monomers for use and a blending ratio thereof, and adjusting polymerization conditions (e.g., an initiator for use and an amount thereof, a chain-transfer agent for use and an amount thereof, and a reaction temperature).

Specifically, for example, the G" of each of the resins can be adjusted to the above range by adjusting the composition of each resin as follows.

(1) Tg1 is adjusted to preferably 0° C. or higher and 150° C. or lower and more preferably 50° C. or higher and 100° C. or lower, where Tg1 is a glass transition temperature calculated from the monomers for the shell resin (b1). Tg2 is adjusted to preferably −30° C. or higher and 100° C. or lower, more preferably 0° C. or higher and 80° C. or lower, and still more preferably 30° C. or higher and 60° C. or lower, where Tg2 is a glass transition temperature calculated from the monomers for the core resin (b2).

The glass transition temperature (Tg) calculated from the constituting monomers is a value calculated according to the Fox method.

The Fox method [T. G. Fox, Phys. Rev., 86, 652 (1952)] is a method for estimating Tg of a copolymer from Tg of each homopolymer as presented by the following formula.

$$1/Tg = W1/Tg1 + W2/Tg2 + \dots + Wn/Tgn$$

[In the formula above, Tg is a glass transition temperature (as an absolute temperature) of a copolymer, Tg1, Tg2 . . . Tgn are each a glass transition temperature (as an absolute temperature) of a homopolymer of each monomer component, and W1, W2 . . . Wn are each a weight fraction of each monomer component.]

(2) (AV1) is adjusted to preferably 75 mgKOH/g or higher and 400 mgKOH/g or lower and more preferably 150 mgKOH/g or higher and 300 mgKOH/g or lower, where (AV1) is a calculated acid value of the shell resin (b1). Moreover, (AV2) is adjusted to preferably 0 mgKOH/g or higher and 50 mgKOH/g or lower, more preferably 0 mgKOH/g or higher and 20 mgKOH/g or lower, and still more preferably 0 mgKOH/g, where (AV2) is a calculated acid value of the core resin (b2).

Note that, the calculated acid value is a theoretical acid value calculated from the amount by mole of acidic groups contained in the constituting monomers and the total weight of the constituting monomers.

In order to satisfy the conditions of the above (1) and (2), the shell resin (b1) is, for example, a resin including: styrene, as constituting monomers thereof, preferably in an amount of 10% by mass or more and 80% by mass or less and more preferably 30% by mass or more and 60% by mass or less relative to the total mass of the shell resin (b1); and methacrylic acid and/or acrylic acid preferably in the combined amount of 10% by mass or more and 60% by mass or less and more preferably 30% by mass or more and 50% by mass or less relative to the total mass of the shell resin (b1).

Meanwhile, the core resin (b2) is, for example, a resin including: styrene, as constituting monomers thereof, preferably in an amount of 10% by mass or more and 100% by mass or less and more preferably 30% by mass or more and 90% by mass or less relative to the total mass of the core resin (b2); and methacrylic acid and/or acrylic acid preferably in the combined amount of 0% by mass or more and 7.5% by mass or less and more preferably 0% by mass or more and 2.5% by mass or less relative to the total mass of the core resin (b2).

(3) Polymerization conditions (e.g., an initiator for use and an amount thereof, a chain-transfer agent for use and an amount thereof, and a reaction temperature) are adjusted. Specifically, the number average molecular weight (Mn1) of the shell resin (b1) is adjusted to preferably 2,000 or higher and 2,000,000 or lower and more preferably 20,000 or higher and 200,000 or lower, and the number average molecular weight (Mn2) of the core resin (b2) is adjusted to preferably 1,000 or higher and 1,000,000 or lower and more preferably 10,000 or higher and 100,000 or lower.

The viscoelastic loss modulus G" in the present disclosure is measured with, for example, the following rheometer.

Device: ARES-24A (obtained from Rheometric Scientific)
Jig: 25 mm parallel plate
Frequency: 1 Hz
Distortion factor: 10%
Heating rate: 5° C./min The acid value (AVb1) of the shell resin (b1) is preferably 75 mgKOH/g or higher and 400 mgKOH/g or lower and more preferably 150 mgKOH/g or higher and 300 mgKOH/g or lower.

When the acid value (AVb1) of the shell resin (b1) is within one of the above ranges, it is easier to form a toner particle including, on the surface thereof, resin particles each including the vinyl units of the shell resin (b1) and the core resin (b2) as constituting components thereof. The shell resin (b1) having the acid value in the above range is a resin including methacrylic acid and/or acrylic preferably in the combined amount of 10% by mass or more and 60% by mass or less and more preferably 30% by mass or more and 50% by mass or less relative to the total mass of the shell resin (b1).

The acid value (AVb2) of the core resin (b2) is preferably 0 mgKOH/g or higher and 50 mgKOH/g or lower, more preferably 0 mgKOH/g or higher and 20 mgKOH/g or lower, and still more preferably 0 mgKOH/g, from the viewpoint of improving the low-temperature fixability of the resulting toner.

The core resin (b2) having the acid value (Avb2) in the above range is a resin including methacrylic acid and/or acrylic acid preferably in the combined amount of 0% by mass or more and 7.5% by mass or less and more preferably 0% by mass or more and 2.5% by mass or less relative to the total mass of the core resin (b2).

The acid value in the present disclosure is measured by the method according to JIS K0070:1992.

The glass transition temperature of the shell resin (b1) is preferably higher than the glass transition temperature of the core resin (b2), more preferably higher by 10° C. or higher, and more preferably higher by 20° C. or higher.

When the glass transition temperature of the shell resin (b1) is within one of the above ranges, it is possible to strike a good balance between easiness to form a toner particle including resin particles (B) on the surface of the toner particle and the low-temperature fixability of the toner particle of the present disclosure.

The glass transition temperature (hereinafter may be abbreviated as "Tg") of the shell resin (b1) is preferably 0° C. or higher and 150° C. or lower and more preferably 50° C. or higher and 100° C. or lower.

When the glass transition temperature of the shell resin (b1) is 0° C. or higher, the heat-resistant storage stability of the resulting toner can be improved. When the glass transition temperature of the shell resin (b1) is 150° C. or lower, the low-temperature fixability of the resulting toner is not degraded very much.

The Tg of the core resin (b2) is preferably −30° C. or higher and 100° C. or lower, more preferably 0° C. or higher and 80° C. or lower, and still more preferably 30° C. or higher and 60° C. or lower. When the glass transition temperature of the core resin (b2) is −30° C. or higher, the heat-resistant storage stability of the resulting toner can be improved. When the glass transition temperature of the core resin (b2) is 100° C. or lower, the low-temperature fixability of the resulting toner is not degraded very much.

The Tg in the present disclosure is measured with "DSC20, SSC/580" (obtained from Seiko Instruments Inc.) by the method (DSC) stipulated in ASTM D3418-82.

The solubility parameter (hereinafter may be abbreviated as "SP value") of the shell resin (b1) is, from the viewpoint of readily forming toner particles, preferably 9 $(cal/cm^3)^{1/2}$ or higher and 13 $(cal/cm^3)^{1/2}$ or lower, more preferably 9.5 $(cal/cm^3)^{1/2}$ or higher and 12.5 $(cal/cm^3)^{1/2}$ or lower, and still more preferably 10.5 $(cal/cm^3)^{1/2}$ or higher and 11.5 $(cal/cm^3)^{1/2}$ or lower.

The SP value of the shell resin (b1) can be adjusted by changing monomers used to constitute the shell resin (b1) and a compositional ratio thereof.

The SP value of the core resin (b2) is, from the viewpoint of readily forming toner particles, preferably 8.5 $(cal/cm^3)^{1/2}$ or higher and 12.5 $(cal/cm^3)^{1/2}$ or lower, more preferably 9 $(cal/cm^3)^{1/2}$ or higher and 12 $(cal/cm^3)^{1/2}$ or lower, and still more preferably 10 $(cal/cm^3)^{1/2}$ or higher and 11 $(cal/cm^3)^{1/2}$ or lower.

The SP value of the core resin (b2) can be adjusted by changing monomers used to constitute core resin (b2) and a compositional ratio thereof.

The SP value in the present disclosure is calculated by the method of Fedors [Polym. Eng. Sci. 14(2)152, (1974)].

From the viewpoints of the Tg of the shell resin (b1) and copolymerizability with other monomers, the shell resin (b1) contains styrene, as a constituting monomer thereof, preferably in an amount of 10% by mass or more and 80% by mass or less and more preferably 30% by mass or more and 60% by mass or less relative to the total mass of the shell resin (b1).

From the viewpoints of the Tg of the core resin (b2) and copolymerizability with other monomers, the core resin (b2) contains styrene, as a constituting monomer thereof, preferably in an amount of 10% by mass or more and 100% by mass or less and more preferably 30% by mass or more and 90% by mass or less relative to the total mass of the core resin (b2).

The number average molecular weight (Mn) of the shell resin (b1) is preferably 2,000 or higher and 2,000,000 or lower and more preferably 20,000 or higher and 200,000 or lower. When the number average molecular weight (Mn) of the shell resin (b1) is 2,000 or higher, the heat-resistant storage stability of the resulting toner is improved. When the number average molecular weight (Mn) of the shell resin (b1) is 2,000,000 or lower, the low-temperature fixability of the resulting toner is not degraded very much.

The weight average molecular weight of the shell resin (b1) is preferably higher than the weight average molecular weight of the core resin (b2), more preferably 1.5 times or greater as high as the weight average molecular weight of the core resin (b2), and still more preferably 2.0 times or greater as high as the weight average molecular weight of the core resin (b2). When the weight average molecular weight of the shell resin (b1) is within one of the above ranges, it is possible to strike a good balance between easiness to form a toner particle and the low-temperature fixability of the toner particle.

The weight average molecular weight (Mw) of the shell resin (b1) is preferably 20,000 or higher and 20,000,000 or lower and more preferably 200,000 or higher and 2,000,000 or lower. When the weight average molecular weight (Mw) of the shell resin (b1) is 20,000 or higher, the heat-resistant storage stability of the resulting toner is improved. When the weight average molecular weight (Mw) of the shell resin (b1) is 20,000,000 or lower, the low-temperature fixability of the resulting toner is not degraded very much.

The Mn of the core resin (b2) is preferably 1,000 or higher and 1,000,000 or lower and more preferably 10,000 or higher and 100,000 or lower. When the Mn of the core resin (b2) is 1,000 or higher, the heat-resistant storage stability of the resulting toner is improved. When the Mn of the core resin (b2) is 1,000,000 or lower, the low-temperature fixability of the resulting toner is not degraded very much.

The Mw of the core resin (b2) is preferably 10,000 or higher and 10,000,000 or lower and more preferably 100,000 or higher and 1,000,000 or lower. When the Mw of the core resin (b2) is 10,000 or higher, the heat-resistant storage stability of the resulting toner is improved. When the Mw of the core resin (b2) is 10,000,000 or lower, the low-temperature fixability of the resulting toner is not degraded very much.

Particularly preferably, the Mw of the shell resin (b1) is 200,000 or higher and 2,000,000 or lower, the Mw of the core resin (b2) is 100,000 or higher and 500,000 or lower, and the relationship of [Mw of (b1)]>[Mw of (b2)] is true.

The Mn and Mw in the present disclosure can be measured through gel permeation chromatography (GPC) under the following conditions.

Device (as one example): "HLC-8120", [obtained from Tosoh Corporation]

Columns (as one example): 2 columns of "TSK GEL GMH6", [obtained from Tosoh Corporation]

Measuring temperature: 40° C.

Sample solution: 0.25% by mass tetrahydrofuran solution (from which an insoluble component is separated through filtration with a glass filter)

Amount of solution injected: 100 μL

Detection device: refractive index detector

Reference materials: 12 samples of standard polystyrene (TSKstandard POLYSTYRENE) (molecular weights: 500, 1,050, 2,800, 5,970, 9,100, 18,100, 37,900, 96,400, 190,000, 355,000, 1,090,000, and 2,890,000) [obtained from Tosoh Corporation]

A weight ratio (the shell resin (b1)/the core resin (b2)) of the shell resin (b1) to the core resin (b2) in the resin particles (B) is preferably 5/95 or higher and 95/5 or lower, more preferably 25/75 or higher and 75/25 or lower, and still more preferably 40/60 or higher and 60/40 or lower. When the weight ratio of the shell resin (b1) to the core resin (b2) is 5/95 or higher, the resulting toner has excellent heat-resistant storage stability. When the weight ratio of the shell resin (b1) to the core resin (b2) is 95/5 or lower, it is easier to form a toner particle including the resin particles (B) on the surface of a toner resin particle.

Although the resin particles B may be used alone, the toner of the present disclosure is also obtained by using resin particles B formed of two styrene-acrylic resins (resins b1 and b2) and resin particles B' formed of one styrene-acrylic resin in combination.

The resin particles B and the resin particles B' mixed in advance are uniformly deposited on the toner surface during emulsification. All or part of the resin b1 in the resin particles B' and the resin particles B on the toner surface is removed in the below-described washing step. Thereby, it is possible to uniformly deposit the resin particles with gaps therebetween.

As a method for producing the resin particles (B), any publicly known production method may be exemplified. Examples of the publicly known production method include the following production methods (I) to (V):

(I) a method in which constituting monomers of the core resin (b2) are polymerized through seed polymerization using, as seeds, particles of the shell resin (b1) in an aqueous dispersion liquid;

(II) a method in which constituting monomers of the shell resin (b1) are polymerized through seed polymerization using, as seeds, particles of the core resin (b2) in an aqueous dispersion liquid;

(III) a method in which a mixture of the shell resin (b1) and the core resin (b2) is emulsified in an aqueous medium to produce an aqueous dispersion liquid of resin particles;

(IV) a method in which a mixture of the shell resin (b1) and constituting monomers of the core resin (b2) is emulsified in an aqueous medium, followed by polymerization of the constituting monomers of the core resin (b2), to produce an aqueous dispersion liquid of resin particles; and (V) a method in which a mixture of the core resin (b2) and constituting monomers of the shell resin (b1) is emulsified in an aqueous medium, followed by polymerization of the constituting monomers of the shell resin (b1), to produce an aqueous dispersion liquid of resin particles.

Whether the resin particles (B) each include the shell resin (b1) and the core resin (b2) as constituting components thereof can be confirmed by observing an element mapping image of a cross-sectional surface of each of the resin particles (B) under a publicly known surface elemental analyzer (e.g., TOF-SIMSEDX-SEM) or by observing an electron microscope image of a cross-sectional surface of each of the resin particles (B) that are dyed with a dyeing agent selected depending on the functional groups contained the shell resin (b1) and the core resin (b2).

The resin particles obtained by the above method may be a mixture of resin particles each including only the shell resin (b1) as a constituting resin component thereof and resin particles each including only the core resin (b2) as a constituting resin component, as well as the resin particles (B) each including the shell resin (b1) and the core resin (b2) as constituting components thereof. In the below-described composite-forming step, the resin particles may be used as the mixture obtained, or only the resin particles (B) may be separated for use.

Specific examples of the method (I) include: a method in which the constituting monomers of the (b1) are dripped and polymerized to produce an aqueous dispersion liquid of resin particles including the (b1), followed by seed polymerization of the constituting monomers of the (b2) using, as seeds, the resin particles including the (b1); and a method in which the (b1), which has been produced in advance through, for example, solution polymerization, is emulsified and dispersed in water, followed by seed polymerization of the constituting monomers of the (b2) using the (b1) as seeds.

Specific examples of the method (II) include: a method in which the constituting monomers of the (b2) are dripped and polymerized to produce an aqueous dispersion liquid of resin particles, followed by seed polymerization of the constituting monomers of the (b1) using the resin particles as seeds; and a method in which the (b2), which has been produced in advance through, for example, solution polymerization, is emulsified and dispersed in water, followed by seed polymerization of the constituting monomers of the (b1) using the (b2) as seeds.

Specific examples of the method (III) include a method in which solutions or melts of the (b1) and the (b2), which have been produced in advance through solution polymerization, are mixed together, followed by emulsifying and dispersing of the resulting mixture into an aqueous medium.

Specific examples of the method (IV) include: a method in which the (b1), which has been produced in advance through, for example, solution polymerization, is mixed with the constituting monomers of the (b2), and the resulting mixture is emulsified and dispersed in an aqueous medium, followed by polymerization of the constituting monomers of the (b2); and a method in which the (b1) is produced in the constituting monomers of the (b2), and the resulting mixture is emulsified and dispersed in an aqueous medium, followed by polymerization of the constitutional monomers of the (b2).

Specific examples of the method (V) include: a method in which the (b2), which has been produced in advance through, for example, solution polymerization, is mixed with the constituting monomers of the (b1), and the resulting mixture is emulsified and dispersed in an aqueous medium, followed by polymerization of the constituting monomers of the (b1); and a method in which the (b2) is produced in the constitutional monomers of the (b1), and the resulting mixture is emulsified and dispersed in an aqueous medium, followed by polymerization of the constituting monomers of the (b1).

In the present disclosure, any of the production methods (I) to (V) as described above is suitable.

The resin particles (B) are preferably used in the state of an aqueous dispersion liquid.

Materials used for the aqueous dispersion liquid (aqueous medium) are not particularly limited and may be appropriately selected in accordance with the intended purpose, as long as the materials can be dissolved in water. Examples of the materials include a surfactant (D), a buffer, and a protective colloid. These may be used alone or in combination.

The aqueous medium used for the aqueous dispersion liquid is not particularly limited as long as the aqueous medium is a liquid containing water. Examples of the aqueous medium include an aqueous solution containing water.

The resin particles (B') are produced in the same manner as in the resin (B) formed of one kind of a styrene acrylic resin. Similar to the resin particles B, the resin particles B' are preferably used in the state of an aqueous dispersion liquid. The aqueous medium of the dispersion liquid may be any liquid containing water. Examples of the aqueous medium include an aqueous solution containing a surfactant (D) in water.

Examples of the surfactant (D) include a nonionic surfactant (D1), an anionic surfactant (D2), a cationic surfactant (D3), an amphoteric surfactant (D4), and other emulsification dispersants (D5).

Examples of the nonionic surfactant (D1) include an alkylene oxide (AO) adduct-type nonionic surfactant and a multivalent alcohol-type nonionic surfactant.

Examples of the AO adduct-type nonionic surfactant include a C10-C20 aliphatic alcohol EO adduct, a phenol EO adduct, a nonyl phenol ethylene oxide (EO) adduct, a C8-C22 alkyl amine EO adduct, and a poly(oxypropylene) glycol EO adduct.

Examples of the multivalent alcohol-type nonionic surfactant include multivalent (from trivalent through octavalent or higher) alcohol (C2-C30) fatty acid (C8-C24) ester (e.g., glycerin monostearate, glycerin monooleate, sorbitan monolaurate, and sorbitan monooleate), and alkyl (C4-C24) poly (degree of polymerization: from 1 through 10) glucoside.

Examples of the anionic surfactant (D2) include C8-C24 hydrocarbon group-containing ether carboxylic acid or salts thereof, C8-C24 hydrocarbon group-containing sulfuric acid ester or ether sulfuric acid ester and salts thereof, C8-C24 hydrocarbon group-containing sulfonic acid salts, sulfosuccinic acid salts including one or two C8-C24 hydrocarbon groups, C8-C24 hydrocarbon group-containing phosphoric acid ester or ether phosphoric acid ester and salts thereof, C8-C24 hydrocarbon group-containing fatty acid salts, and C8-C24 hydrocarbon group-containing acylated amino acid salts.

Examples of the C8-C24 hydrocarbon group-containing ether carboxylic acid or salts thereof include sodium lauryl ether acetate and sodium (poly)oxyethylene (the number of moles added: from 1 through 100) lauryl ether acetate.

Examples of the C8-C24 hydrocarbon group-containing sulfuric acid ester or ether sulfuric acid ester and salts thereof include sodium lauryl sulfate, sodium (poly)oxyethylene (the number of moles added: from 1 through 100) lauryl sulfate, triethanolamine (poly)oxyethylene (the number of moles added: from 1 through 100) lauryl sulfate, and (poly)oxyethylene (the number of moles added: from 1 through 100) coconut fatty acid monoethanolamide sodium sulfate.

Examples of the C8-C24 hydrocarbon group-containing sulfonic acid salts include sodium dodecylbenzene sulfonate.

Examples of the C8-C24 hydrocarbon group-containing phosphoric acid ester or ether phosphoric acid ester and salts thereof include sodium lauryl phosphate and sodium (poly) oxyethylene (the number of moles added: from 1 through 100) lauryl ether phosphate.

Examples of the C8-C24 hydrocarbon group-containing fatty acid salts include sodium laurate and triethanolamine laurate.

Examples of the C8-C24 hydrocarbon group-containing acylated amino acid salts include sodium methyl cocoyl taurate, sodium cocoyl sarcosinate, triethanolamine cocoyl sarcosinate, triethanolamine N-cocoyl-L-glutamate, sodium N-cocoyl-L-glutamate, and lauroylmethyl-β-alanine sodium salt.

Examples of the cationic surfactant (D3) include a quaternary ammonium salt-type cationic surfactant and an amine salt-type cationic surfactant.

Examples of the quaternary ammonium salt-type cationic surfactant include trimethyl stearyl ammonium chloride, behenyl trimethyl ammonium chloride, distearyl dimethyl ammonium chloride, and N—(N'-lanolin fatty acid amide propyl) N-ethyl-N,N-dimethyl ammonium ethyl sulfate.

Examples of the amine salt-type cationic surfactant include stearic acid diethylaminoethylamide lactic acid salt, dilaurylamine hydrochloride, and oleylamine lactate. Examples of the amphoteric surfactant (D4) include a betaine-type amphoteric surfactant and an amino acid-type amphoteric surfactant.

Examples of the betaine-type amphoteric surfactant include coconut oil fatty acid amidepropyldimethylaminoacetic acid betaine, lauryl dimethylaminoacetic acid betaine, 2-alkyl-N-carboxymethyl-N-hydroxyethylimidazolinium betaine, and lauryl hydroxysulfobetaine.

Examples of the amino acid-type amphoteric surfactant include sodium β-laurylaminopropionate.

Examples of other emulsification dispersants (D5) include a reactive active agent.

The reaction active agent is not particularly limited and may be appropriately selected in accordance with the intended purpose, as long as the reaction active agent has radical reactivity. Examples of the reaction active agent include: ADEKA REASOAP (registered trademark) SE-10N, SR-10, SR-20, SR-30, ER-20, and ER-30 (all of which are obtained from ADEKA CORPORATION); AQUALON (registered trademark), HS-10, KH-05, KH-10, and KH-1025 (all of which are obtained from DKS Co., Ltd.); ELEMINOL (registered trademark) JS-20 (obtained from SANYO CHEMICAL, LTD.); LATEMUL (registered trademark) D-104, PD-420, and PD-430 (obtained from Kao Corporation); IONET (registered trademark) MO-200 (obtained from SANYO CHEMICAL, LTD.); polyvinyl alcohol; starch and derivatives thereof; cellulose derivatives, such as carboxymethyl cellulose, methyl cellulose, and hydroxyethyl cellulose; carboxyl group-containing (co)polymer, such as polyacrylic acid soda; and urethane group or ester group-containing emulsification dispersants (e.g., a compound obtained by linking polycaprolactone polyol and polyether diol via polyisocyanate) disclosed in U.S. Pat. No. 5,906,704.

From the viewpoint of stabilizing oil droplets to have desired shapes and making the particle size distribution sharp during emulsification and dispersion, the surfactant (D) is preferably (D1), (D2), (D5), or a combination thereof, and a combination of (D1) and (D5) or a combination of (D2) and (D5) is more preferable.

Examples of the buffer include sodium acetate, sodium citrate, and sodium bicarbonate.

Examples of the protective colloid include a water-soluble cellulose compound and an alkali metal salt of polymethacrylic acid.

The resin particles (B) may each include, in addition to the shell resin (b1) and the core resin (b2), other resin components, an initiator (and a residue thereof), a chain-transfer agent, an antioxidant, a plasticizer, a preservative, a reducing agent, an organic solvent, etc.

Examples of the other resin components include a vinyl resin excluding the resins used for the shell resin (b1) and the core resin (b2), a polyurethane resin, an epoxy resin, a polyester resin, a polyamide resin, a polyimide resin, a silicone resin, a phenol resin, a melamine resin, a urea resin, an aniline resin, an ionomer resin, and a polycarbonate resin.

Examples of the initiator (and the residue thereof) include publicly known radical polymerization initiators. Specific examples of the publicly known radical polymerization initiators include: a persulfuric acid salt initiator, such as potassium persulfate and ammonium persulfate; an azo initiator, such as azobisisobutyronitrile; organic peroxide, such as benzoyl peroxide, cumene hydroperoxide, tert-butyl hydroperoxide, tert-butyl peroxyisopropyl monocarbonate, and tert-butyl peroxybenzoate; and hydrogen peroxide.

Examples of the chain-transfer agent include n-dodecylmercaptan, tert-dodecylmercaptan, n-butylmercaptan, 2-ethylhexyl thioglycolate, 2-mercaptoethanol, β-mercaptopropionic acid, and α-methylstyrene dimer.

Examples of the antioxidant include a phenol compound, para-phenylenediamine, hydroquinone, an organic sulfur compound, and an organophosphorus compound.

Examples of the phenol compound include 2,6-di-t-butyl-p-cresol, butylated hydroxyanisole, 2,6-di-t-butyl-4-ethylphenol, stearyl-β-(3,5-di-t-butyl-4-hydroxyphenyl)propionate, 2,2'-methylene-bis-(4-methyl-6-t-butylphenol), 2,2'-methylene-bis-(4-ethyl-6-t-butylphenol), 4,4'-thiobis-(3-methyl-6-t-butylphenol), 4,4'-butylidenebis-(3-methyl-6-t-butylphenol), 1,1,3-tris-(2-methyl-4-hydroxy-5-t-butylphenyl)butane, 1,3,5-trimethyl-2,4,6-tris-(3,5-di-t-butyl-4-hydroxybenzyl)benzene, tetrakis-[methylene-3-(3',5'-di-t-butyl-4'-hydroxyphenyl)propionate]methane, bis[3,3'-bis(4'-hydroxy-3'-t-butylphenyl)butyric acid]glycol ester, and tocopherol.

Examples of the para-phenylenediamine include N-phenyl-N'-isopropyl-p-phenylenediamine, N,N'-di-sec-butyl-p-phenylenediamine, N-phenyl-N-sec-butyl-p-phenylenediamine, N,N'-di-isopropyl-p-phenylenediamine, and N,N'-dimethyl-N,N'-di-t-butyl-p-phenylenediamine.

Examples of the hydroquinone include 2,5-di-t-octylhydroquinone, 2,6-didodecylhydroquinone, 2-dodecylhydroquinone, 2-dodecyl-5-chlorohydroquinone, 2-t-octyl-5-methylhydroquinone, and 2-(2-octadecenyl)-5-methylhydroquinone.

Examples of the organic sulfur compound include dilauryl-3,3'-thiodipropionate, distearyl-3,3'-thiodipropionate, and ditetradecyl-3,3'-thiodipropionate.

Examples of the organophosphorus compound include triphenylphosphine, tri(nonylphenyl)phosphine, tri(dinonylphenyl)phosphine, tricresyl phosphate, and tri(2,4-dibutylphenoxy)phosphine.

Examples of the plasticizer include phthalic acid ester, aliphatic diprotic acid ester, trimellitic acid ester, phosphoric acid ester, and fatty acid ester.

Examples of the phthalic acid ester include dibutyl phthalate, dioctyl phthalate, butylbenzyl phthalate, and isodecyl phthalate.

Examples of the aliphatic diprotic acid ester include di-2-ethylhexyl adipate and 2-ethylhexyl sebacate.

Examples of the trimellitic acid ester include tri-2-ethylhexyl trimellitate and trioctyl trimellitate.

Examples of the phosphoric acid ester include triethyl phosphate, tri-2-ethylhexyl phosphate, and tricresyl phosphate.

Examples of the fatly acid ester include butyl oleate.

Examples of the preservative include an organic nitrogen sulfur compound preservative and an organic sulfur halogenated compound preservative.

Examples of the reducing agent include: a reducing organic compound, such as ascorbic acid, tartaric acid, citric acid, glucose, and formaldehyde sulfoxylate metal salt; and a reducing inorganic compound, such as sodium thiosulfate, sodium sulfite, sodium bisulfite, and sodium metabisulfite.

Examples of the organic solvent include: a ketone solvent, such as acetone and methyl ethyl ketone (hereinafter may be abbreviated as MEK); an ester solvent, such as ethyl acetate and γ-butyrolactone; an ether solvent, such as tetrahydrofuran (THF); an amide solvent, such as N,N-dimethylformamide, N,N-dimethylacetamide, N-methyl-2-pyrrolidone, and N-methylcaprolactam; an alcohol solvent, such as isopropyl alcohol; and an aromatic hydrocarbon solvent, such as toluene and xylene.

The amount of the resin particles is preferably 0.2% by mass or more and 5% by mass or less relative to the toner. When the sum of the amount of the shell resin (b1) and the amount of the core resin (b2) is within one of the above ranges, the resulting toner is improved in low-temperature fixability and heat-resistant storage stability. When the amount of the resin particles is 0.2% by mass or more relative to the toner, it is possible to prevent degradation of the heat-resistant storage stability of the resulting toner, which would otherwise occur. When the amount of the resin particles is 5% by mass or less, it is possible to prevent degradation of the low-temperature fixability of the resulting toner, which would otherwise occur.

(Toner Producing Method)

A toner producing method of the present disclosure is a method for producing the above-described toner.

The toner producing method of the present disclosure includes a composite particle-forming step and a removing step. If necessary, the toner producing method may further include other steps.

<Composite Particle-Forming Step>

The composite particle-forming step is a step of depositing resin particles on a surface of each of the toner base particles, to form composite particles.

Examples of a method for forming the composite particles include a publicly known dissolution suspension method in which an oil phase containing components of the toner base particles, such as the binder resin, the colorant, and the wax, is dispersed in an aqueous medium containing the resin particles, to form the composite particles.

As one example of the dissolution suspension method, a method for forming composite particles while producing a polyester resin through elongation reaction and/or crosslinking reaction between the prepolymer and the curing agent will be described.

This method includes preparation of an aqueous medium, preparation of an oil phase containing materials of the toner base particles, emulsification and/or dispersion of the materials of the toner base particles, and removal of an organic solvent.

—Preparation of Aqueous Medium (Aqueous Phase)—

The preparation of the aqueous medium can be performed by dispersing the resin particles in an aqueous medium. The amount of the resin particles added to the aqueous medium is not particularly limited and may be appropriately selected in accordance with the intended purpose. The amount of the resin particles is preferably 0.5 parts by mass or more and 10 parts by mass or less relative to 100 parts by mass of the aqueous medium.

The aqueous medium is not particularly limited and may be appropriately selected in accordance with the intended purpose. Examples of the aqueous medium include water, a solvent miscible with water, and a mixture thereof. These may be used alone or in combination. Of these, water is preferable.

The solvent miscible with water is not particularly limited and may be appropriately selected in accordance with the intended purpose. Examples of the solvent miscible with water include alcohol, dimethyl formamide, tetrahydrofuran, cellosolves, and lower ketones. Examples of the alcohol include methanol, isopropanol, and ethylene glycol. Examples of the lower ketones include acetone and methyl ethyl ketone.

—Preparation of Oil Phase—

The preparation of the oil phase is performed by dissolving or dispersing, in an organic solvent, the materials of the toner base particles including a binder resin, a colorant, wax, an optionally-added curing agent, etc.

The organic solvent is not particularly limited and may be appropriately selected in accordance with the intended purpose. The organic solvent preferably has a boiling point of lower than 150° C. because such an organic solvent can be readily removed.

Examples of the organic solvent having a boiling point of lower than 150° C. include toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone.

These may be used alone or in combination.

Of these, ethyl acetate, toluene, xylene, benzene, methylene chloride, 1,2-dichloroethane, chloroform, and carbon tetrachloride are preferable, with ethyl acetate being more preferable.

—Emulsifying and/or Dispersing—

The emulsifying and/or dispersing the toner materials can be performed by dispersing the oil phase including the toner materials in the aqueous medium. When the toner materials are emulsified and/or dispersed, the curing agent and the prepolymer can be allowed to undergo elongation reaction and/or crosslinking reaction.

The reaction conditions for producing the prepolymer (e.g., a reaction time and a reaction temperature) are not particularly limited and may be appropriately selected depending on a combination of the curing agent and the prepolymer. The reaction time is preferably 10 minutes or longer and 40 hours or shorter and more preferably 2 hours or longer and 24 hours or shorter. The reaction temperature is preferably 0° C. or higher and 150° C. or lower and more preferably 40° C. or higher and 98° C. or lower.

A method for stably forming a dispersion liquid containing the prepolymer in the aqueous medium is not particularly limited and may be appropriately selected in accordance with the intended purpose. Examples of the method include a method in which the oil phase prepared by dissolving or dispersing the toner materials is added to the aqueous medium phase and the resulting mixture is dispersed by application of a shearing force.

A disperser used for the dispersing is not particularly limited and may be appropriately selected in accordance with the intended purpose. Examples of the disperser include a low-speed shearing disperser, a high-speed shearing disperser, a friction disperser, a high-pressure jet disperser, and an ultrasonic disperser. Of these, a high-speed shearing disperser is preferable because the particle diameter of the dispersoids (oil droplets) can be adjusted to be 2 μm or greater and 20 μm or smaller.

In the case where the high-speed shearing disperser is used, conditions in use thereof, such as a rotational speed, a dispersion time, and a dispersion temperature, are appropriately selected in accordance with the intended purpose. The rotational speed is preferably 1,000 rpm or higher and 30,000 rpm or lower and more preferably 5,000 rpm or higher and 20,000 rpm or lower. In the case of a batch system, the dispersion time is preferably 0.1 minutes or longer and 5 minutes or shorter. The dispersion temperature under pressure is preferably 0° C. or higher and 150° C. or lower and more preferably 40° C. or higher and 98° C. or lower. In general, the higher the temperature, the easier liquid disperses.

The amount of the aqueous medium used for emulsifying and/or dispersing the toner materials is not particularly limited and may be appropriately selected in accordance with the intended purpose. The amount of the aqueous medium used is preferably 50 parts by mass or more and 2,000 parts by mass or less and more preferably 100 parts by mass or more and 1,000 parts by mass or less relative to 100 parts by mass of the toner materials. When the amount of the aqueous medium used is less than 50 parts by mass, the dispersion state of the toner materials becomes degraded, and the toner base particles having the predetermined particle diameters cannot be obtained in some cases. When the amount of the aqueous medium used is more than 2,000 parts by mass, the production cost may become higher.

When the oil phase containing the toner materials is emulsified and/or dispersed, a dispersant is preferably used from the viewpoint of stabilizing dispersoids, such as oil droplets, to achieve desired shapes and make the particle size distribution sharp.

The dispersant is not particularly limited and may be appropriately selected in accordance with the intended purpose. Examples of the dispersant include a surfactant, a poorly water-soluble inorganic compound dispersant, and a polymeric protective colloid. These may be used alone or in combination. Of these, a surfactant is preferable.

The surfactant is not particularly limited and may be appropriately selected in accordance with the intended purpose. For example, an anionic surfactant, a cationic surfactant, a nonionic surfactant, or an amphoteric surfactant may be used. Examples of the anionic surfactant include alkyl benzene sulfonic acid salt, α-olefin sulfonic acid salt, and phosphoric acid ester. Of these, a surfactant containing a fluoroalkyl group is preferable.

—Removal of Organic Solvent—

A method for removing the organic solvent from the dispersion liquid, such as the emulsified slurry, is not particularly limited and may be appropriately selected in accordance with the intended purpose. Examples of the method include: a method in which the entire reaction system is gradually heated to evaporate the organic solvent in the oil droplets; and a method in which the dispersion liquid is sprayed to a dry atmosphere to remove the organic solvent in the oil droplets.

Once the organic solvent has been removed, composite particles are formed.

<Removing Step>

The removing step is a step of removing at least part of the resin particles from the composite particles and preferably removing part or all of the shell resin (resin (b1)) of the resin particles.

Examples of the step of removing at least part of the resin particles include a washing step of washing the composite particles. For this reason, the removing step can be also referred to as a washing step.

Examples of a method for removing part or all of the shell resin (b1) in the washing step include a method in which part or all of the shell resin (b1) is removed by a chemical method.

Examples of the chemical method include a step of washing the composite particles with a basic aqueous solution. Part or all of the shell resin (b1) can be dissolved by washing the composite particles with the basic aqueous solution.

By performing the washing step, the toner of the present disclosure is obtained.

The basic aqueous solution is not particularly limited and may be appropriately selected in accordance with the intended purpose, as long as it is basic. Examples of the basic aqueous solution include aqueous solutions of hydroxides of alkali metals (e.g., potassium hydroxide and sodium hydroxide) and ammonia. These may be used alone or in combination.

Of these, potassium hydroxide and sodium hydroxide are preferable from the viewpoint of readily dissolving the shell resin (b1).

The pH of the basic aqueous solution is preferably 8 or higher and 14 or lower and more preferably 10 or higher and 12 or lower.

Mixing the composite particles and the alkaline aqueous solution in the washing step can be performed by a method in which the basic aqueous solution is dripped to a composite slurry under stirring. After dripping of the basic aqueous solution, an acid aqueous solution may be dripped for neutralization.

<Other Steps>

The other steps are not particularly limited and may be appropriately selected in accordance with the intended purpose. Examples of the other steps include a drying step and a classifying step.

The drying step is not particularly limited and may be appropriately selected in accordance with the intended purpose, as long as the solvent can be removed from the composite particles.

The classifying step can be performed by removing microparticles with, for example, a hydrocyclone, a decanter, or a centrifuge. Alternatively, the classification may be performed after drying.

The obtained composite particles may be mixed with particles of, for example, the external additive and the charge controlling agent. By application of a mechanical impact, the particles of, for example, the external additive can be prevented from being detached from the surfaces of the toner base particles.

A method for applying the mechanical impact is not particularly limited and may be appropriately selected in accordance with the intended purpose. Examples of the method include: a method in which an impact force is applied to the mixture using a blade rotating at a high speed; and a method in which the mixture is added to a high-speed air flow to accelerate the particles to make the particles crush to each other or make the particles crush into an appropriate impact board.

A device used for the above method is not particularly limited and may be appropriately selected in accordance with the intended purpose. Examples of the device include an ANGMILL (obtained from HOSOKAWA MICRON CORPORATION), a device obtained by modifying an I-type mill (obtained from Nippon Pneumatic Mfg. Co., Ltd.) so as to reduce the pulverization air pressure thereof, a hybridization system (obtained from NARA MACHINERY CO., LTD.), Kryptron System (obtained from Kawasaki Heavy Industries, Ltd.), and an automatic mortar.

(Developer)

A developer of the present disclosure includes the toner of the present disclosure. If necessary, the developer may further include appropriately selected other components, such as a carrier. The developer may be a one-component developer or two-component developer. In the case where the developer is used for high-speed printers in response to the information processing speed increased in recent years, the developer is preferably a two-component developer because the service life thereof is extended.

<Carrier>

The carrier is not particularly limited and may be appropriately selected in accordance with the intended purpose. The carrier preferably includes a core and a resin layer covering the core.

—Core—

A material of the core is not particularly limited and may be appropriately selected in accordance with the intended purpose. Examples of the material include a manganese-strontium material of 50 emu/g or higher and 90 emu/g or lower and a manganese-magnesium material of 50 emu/g or higher and 90 emu/g or lower. In order to ensure sufficient image density, moreover, a hard magnetic material, such as iron powder of 100 emu/g or higher and magnetite of 75 emu/g or higher and 120 emu/g or lower, is preferably used. A soft magnetic material, such as a copper-zinc material of 30 emu/g or higher and 80 emu/g or lower, is preferably used because an impact of the developer held in the form of a brush against the photoconductor can be reduced, and a high image quality can be achieved.

These may be used alone or in combination.

The volume average particle diameter of the core is not particularly limited and may be appropriately selected in accordance with the intended purpose. The volume average particle diameter of the core is preferably 10 μm or more and 150 μm or less and more preferably 40 μm or more and 100 μm or less. When the volume average particle diameter of the core is less than 10 μm, a larger amount of fine powder is contained in the carrier, leading to a drop in the magnetization per particle and consequently may cause scattering of the carrier. When the volume average particle diameter of the core is more than 150 μm, the specific surface area of the core may be reduced thereby causing scattering of the toner. Also, in a full-color image with a large area of a solid portion, especially, reproducibility of the solid portion may be degraded.

The toner of the present disclosure may be mixed with the carrier, to be used as a two-component developer.

The amount of the carrier in the two-component developer is not particularly limited and may be appropriately selected in accordance with the intended purpose. The amount of the carrier is preferably 90 parts by mass or more and 98 parts by mass or less and more preferably 93 parts by mass or more and 97 parts by mass or less relative to 100 parts by mass of the two-component developer.

The developer of the present disclosure can be suitably used for image formation according to various publicly known electrophotographic methods, such as a magnetic one-component developing method, a non-magnetic one-component developing method, and a two-component developing method.

(Toner Storing Unit)

A toner storing unit of the present disclosure includes: a unit configured to store a toner; and the toner stored in the unit. Examples of the form of the toner storing unit include a toner storing container, a developing device, and a process cartridge.

The toner storing container is a container in which the toner of the present disclosure is stored.

The developing device is a device including a unit configured to store a toner and perform development with the toner.

The process cartridge includes an image bearer and a developing unit as an integrated body, stores the toner, and is detachably mounted in an image forming apparatus. The process cartridge may further include at least one unit selected from the group consisting of a charging unit, an exposing unit, and a cleaning unit.

Image formation with the toner storing unit of the present disclosure mounted in an image forming apparatus is image formation performed using the toner of the present disclosure. Thus, it is possible to achieve high levels of low-temperature fixability, heat-resistant storage stability, and image gloss, and good cleanability.

Figure 2:
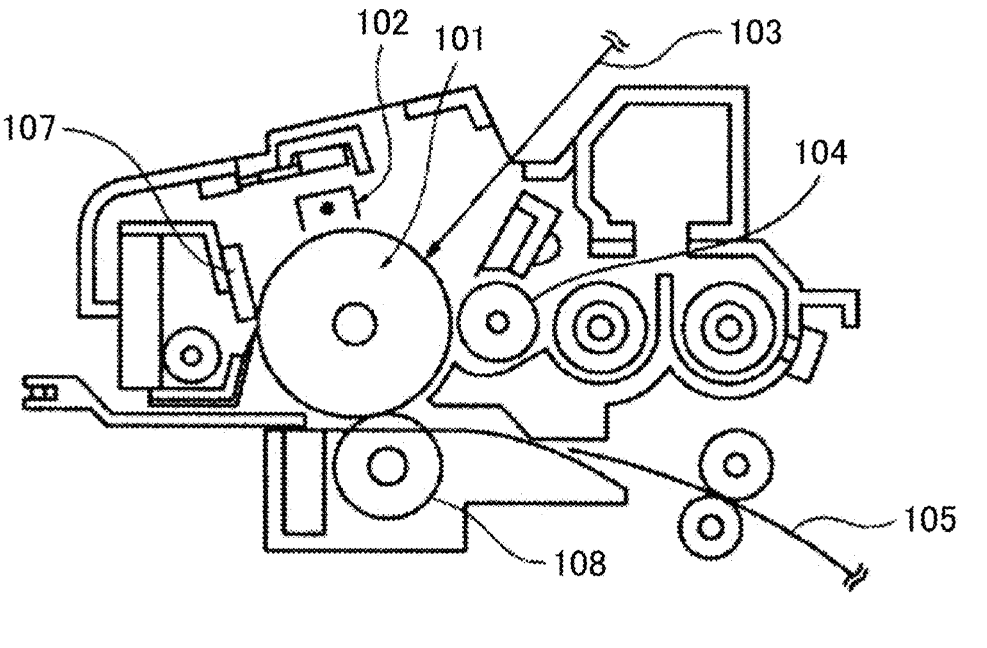
FIG. 2 is a schematic view illustrating one example of a process cartridge of the present disclosure.

Next, one embodiment of the process cartridge is illustrated in FIG. 2. As illustrated in FIG. 2, the process cartridge of the present embodiment includes a latent image bearer 101, a charging device 102, a developing device 104, and a cleaning unit 107. If necessary, the process cartridge of the present embodiment may further include other units.

The latent image bearer 101 may be a latent image bearer similar to an electrostatic latent image bearer in the below-described image forming apparatus. The charging device 102 is any charging member.

In the image forming process using the process cartridge illustrated in FIG. 2, while rotating clockwise, the latent image bearer 101 is charged with the charging device 102 and exposed to light 103 from an exposing unit (not illustrated) to form an electrostatic latent image corresponding to the exposed image on the surface of the latent image bearer.

The electrostatic latent image is developed with the toner at the developing device 104, and the developed toner image is transferred to a recording paper sheet 105 with a transfer roller 108, and then output. Subsequently, the surface of the latent image bearer after the image transfer is cleaned with the cleaning unit 107, and the charge thereon is eliminated with a charge-eliminating unit (not illustrated). The above series of operations is repeated.

(Image Forming Apparatus and Image Forming Method)

An image forming apparatus of the present disclosure includes the above toner storing unit. Preferably, the image forming apparatus includes an electrostatic latent image bearer, an electrostatic latent image forming unit, and a developing unit, and if necessary, may further include other units.

An image forming method relating to the present disclosure includes an electrostatic latent image forming step and a developing step. If necessary, the image forming method may further include other steps.

<Electrostatic Latent Image Bearer>

A material, structure, and size of the electrostatic latent image bearer are not particularly limited and may be appropriately selected from those publicly known. Examples of the material of the electrostatic latent image bearer include: inorganic materials, such as amorphous silicon and selenium; and organic materials, such as polysilane and phthalopolymethine. Of these, amorphous silicon is preferable from the viewpoint of long service life.

The linear speed of the electrostatic latent image bearer is preferably 300 mm/s or higher.

<Electrostatic Latent Image Forming Unit and Electrostatic Latent Image Forming Step>

The electrostatic latent image forming unit is not particularly limited and may be appropriately selected in accordance with the intended purpose, as long as the electrostatic latent image forming unit is a unit configured to form an electrostatic latent image on the electrostatic latent image bearer. Examples of the electrostatic latent image forming unit include a unit including a charging member configured to charge a surface of the electrostatic latent image bearer and an exposing member configured to expose the surface of the electrostatic latent image bearer to light imagewise.

The electrostatic latent image forming step is not particularly limited and may be appropriately selected in accordance with the intended purpose, as long as the electrostatic latent image forming step is a step of forming an electrostatic latent image on the electrostatic latent image bearer. For example, the electrostatic latent image forming step can be performed by charging a surface of the electrostatic latent image bearer, followed by exposure of the charged surface of the electrostatic latent image bearer to light imagewise. The electrostatic latent image forming step can be performed with the electrostatic latent image forming unit.

<<Charging Member and Charging>>

The charging member is not particularly limited and may be appropriately selected in accordance with the intended purpose. Examples of the charging member include: a contact charger known per se, which is equipped with a conductive or semi-conductive roller, brush, film, or rubber blade; and a contactless charger utilizing corona discharge, such as corotron or scorotron.

For example, the charging can be performed by applying voltage to the surface of the electrostatic latent image bearer using the charging member.

The shape of the charging member may be any shape, such as a magnetic brush or a fur brush, in addition to a roller. The shape of the charging member may be selected depending on specifications or forms of the image forming apparatus.

The charging member is not limited to the contact charger, but the contact charger is preferable because the resulting image forming apparatus is reduced in the amount of ozone generated from the charging member.

<<Exposing Member and Exposure>>

The exposing member is not particularly limited and may be appropriately selected in accordance with the intended purpose, as long as the exposing member can imagewise expose the surface of the electrostatic latent image bearer, which has been charged with the charging member, to light corresponding to an image to be formed. Examples of the exposing member include various exposing members, such as a copy optical exposing member, a rod lens array exposing member, a laser optical exposing member, and a liquid crystal shutter optical exposing member.

A light source used for the exposing member is not particularly limited and may be appropriately selected in accordance with the intended purpose. Examples of the light source include most of light, emitters, such as a fluorescent lamp, a tungsten lamp, a halogen lamp, a mercury lamp, a sodium vapor lamp, a light emitting diode (LED), a semiconductor laser (LD), and an electroluminescent light (EL).

In order to apply only the light in a desired wavelength range, various filters, such as a sharp-cut filter, a band-pass filter, a near infrared ray-cut filter, a dichroic filter, an interference filter, and a color temperature conversion filter, may also be used.

For example, the exposure may be performed by imagewise exposing the surface of the electrostatic latent image bearer to light using the exposing member.

In the present disclosure, a back-exposure system may be employed. The back-exposure system is a system in which imagewise exposure is performed from the back side of the electrostatic latent image bearer.

<Developing Unit and Developing Step>

The developing unit is not particularly limited and may be appropriately selected in accordance with the intended purpose, as long as the developing unit includes a toner and is configured to form a toner image that is a visible image obtained by developing the electrostatic latent image formed on the electrostatic latent image bearer.

The developing step is not particularly limited and may be appropriately selected in accordance with the intended purpose, as long as the developing step is a step of developing the electrostatic latent image formed on the electrostatic latent image bearer with a toner to form a toner image that is a visible image. For example, the developing step can be performed with the developing unit.

The developing unit is preferably a developing device including: a stirrer configured to stir the toner to frictionally charge the toner; and a developer bearer in which a magnetic field generating unit is fixed, where the developer bearer is configured to bear a developer including the toner on a surface thereof, and is rotatable.

<Other Units and Other Steps>

Examples of the other units include a transferring unit, a fixing unit, a cleaning unit, a charge-eliminating unit, a recycling unit, and a controlling unit.

Examples of the other steps include a transferring step, a fixing step, a cleaning step, a charge-eliminating step, a recycling step, and a controlling step.

<<Transferring Unit and Transferring Step>>

The transferring unit is not particularly limited and may be appropriately selected in accordance with the intended purpose, as long as the transferring unit is configured to transfer a visible image to a recording medium. A preferable transferring unit includes: a primary transferring unit configured to transfer visible images to an intermediate transfer member to form a composite transfer image; and a secondary transferring unit configured to transfer the composite transfer image to a recording medium.

The transferring step is not particularly limited and may be appropriately selected in accordance with the intended purpose, as long as the transferring step is a step of transferring a visible image to a recording medium. A preferable transferring step uses an intermediate transfer member, and includes primarily transferring visible images to the intermediate transfer member and then secondarily transferring the visible images to the recording medium.

For example, the transferring step can be performed by charging the photoconductor with a transfer charger to charge the visible images. The transferring step can be performed with the transferring unit.

When an image to be secondarily transferred to the recording medium is a color image formed of two or more different color toners, images of respective color toners are sequentially superimposed onto the intermediate transfer member with the transferring unit to form a composite image on the intermediate transfer member, and the composite image on the intermediate transfer member is secondarily transferred to the recording medium with the intermediate transferring unit.

The intermediate transfer member is not particularly limited and may be appropriately selected from publicly known transfer members in accordance with the intended purpose. Preferable examples of the intermediate transfer member include a transfer belt.

The transferring unit (the primary transferring unit and the secondary transferring unit) preferably includes a transferring device configured to charge the visible image formed on the photoconductor to release the visible image to the recording medium. Examples of the transferring device include a corona transferring device using corona discharge, a transfer belt, a transfer roller, a pressure transfer roller, and an adhesion transferring device.

The recording medium is typically a plane paper sheet. The recording medium is, however, not particularly limited and may be appropriately selected in accordance with the intended purpose, as long as the recording medium is a medium to which an unfixed image after development can be transferred. A PET base for OHP may also be used as the recording medium.

<<Fixing Unit and Fixing Step>>

The fixing unit is not particularly limited and may be appropriately selected in accordance with the intended purpose, as long as the fixing unit is configured to fix the transfer image transferred to the recording medium. For example, the fixing unit is preferably a publicly known heat press member. Examples of the heat press member include a combination of a heating roller and a pressing roller and a combination of a heating roller, a pressing roller, and an endless belt.

The fixing step is not particularly limited and may be appropriately selected in accordance with the intended purpose, as long as the fixing step is a step of fixing the visible image transferred to the recording medium. For example, the fixing step may be performed every time an image of each color toner is transferred to the recording medium, or may be performed once after having laminated images of respective colors toners onto the recording medium.

The fixing step may be performed with the fixing unit.

Heating with the heat press member is preferably performed at a temperature of 80° C. or higher and 200° C. or lower.

In the present disclosure, for example, a publicly known optical fixing device may be used in combination with or instead of the fixing unit in accordance with the intended purpose.

The surface pressure in the fixing step is not particularly limited and may be appropriately selected in accordance with the intended purpose. The surface pressure is preferably 10 N/cm$^2$ or higher and 80 N/cm$^2$ or lower.

<<Cleaning Unit and Cleaning Step>>

The cleaning unit is not particularly limited and may be appropriately selected in accordance with the intended purpose, as long as the cleaning unit can remove the toner remaining on the photoconductor. Examples of the cleaning unit include a magnetic brush cleaner, an electrostatic brush cleaner, a magnetic roller cleaner, a blade cleaner, a brush cleaner, and a web cleaner.

The cleaning step is not particularly limited and may be appropriately selected in accordance with the intended purpose, as long as the cleaning step is a step in which the toner remaining on the photoconductor can be removed. For example, the cleaning step can be performed with the cleaning unit.

<<Charge-Eliminating Unit and Charge-Eliminating Step>>

The charge-eliminating unit is not particularly limited and may be appropriately selected in accordance with the intended purpose, as long as the charge-eliminating unit is configured to apply charge-eliminating bias to the photoconductor to eliminate the charge of the photoconductor. Examples of the charge-eliminating unit include a charge-eliminating lamp.

The charge-eliminating step is not particularly limited and may be appropriately selected in accordance with the intended purpose, as long as the charge-eliminating step is a step of applying charge-eliminating bias to the photoconductor to eliminate the charge of the photoconductor. For example, the charge-eliminating step can be performed with the charge-eliminating unit.

<<Recycling Unit and Recycling Step>>

The recycling unit is not particularly limited and may be appropriately selected in accordance with the intended purpose, as long as the recycling unit is configured to recycle the toner removed in the cleaning step to the developing device. Examples of the recycling unit include a publicly known conveying unit.

The recycling step is not particularly limited and may be appropriately selected in accordance with the intended purpose, as long as the recycling step is a step of recycling the toner removed in the cleaning step to the developing device. For example, the recycling step may be performed with the recycling unit.

Next, one embodiment for carrying out a method for forming an image with the image forming apparatus of the present disclosure will be described with reference to FIG. 3. A printer is illustrated as an example of the image forming apparatus of the present embodiment, but the image forming apparatus is not particularly limited as long as the image forming apparatus is an apparatus capable of forming an image with a toner, such as a photocopier, a facsimile, and a multifunction peripheral.

The image forming apparatus includes a paper sheet feeding unit 210, a conveying unit 220, an image forming unit 230, a transferring unit 240, and a fixing unit 250.

The paper sheet feeding unit 210 includes: a paper sheet feeding cassette 211 loaded with paper sheets P to be fed; and a paper sheet feeding roller 212 configured to feed the paper sheets P in the paper sheet feeding cassette 211 one by one.

The conveying unit 220 includes: a roller 221 configured to feed the paper sheet P, fed with the paper sheet feeding roller 212, towards the transferring unit 240; a pair of timing rollers 222 configured to nip the leading edge of the paper sheet P, fed with the roller 221, to stand-by and send the paper sheet to the transferring unit 240 at a predetermined timing; and a paper sheet ejection roller 223 configured to eject the paper sheet P including a color toner image fixed, to the paper sheet ejection tray 224.

Figure 3:
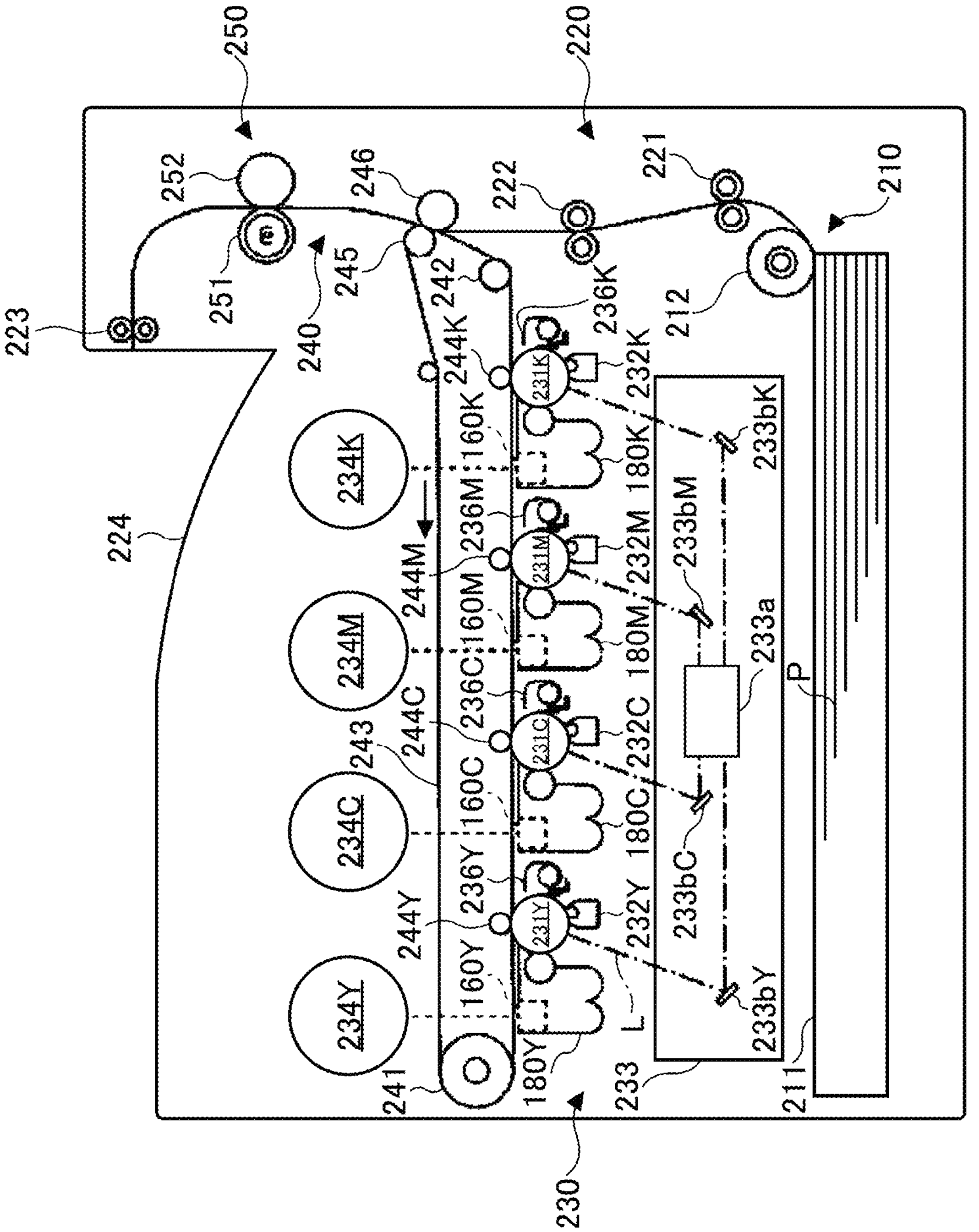
FIG. 3 is a schematic view illustrating one example of an image forming apparatus according to the present disclosure.

The image forming unit 230 includes: an image forming unit Y configured to form an image using a developer containing a yellow toner, an image forming unit C using a developer containing a cyan toner, an image forming unit M using a developer containing a magenta toner, and an image forming unit K using a developer containing a black toner, which are disposed in the order mentioned from left to right in FIG. 3 with predetermined gaps therebetween; and an exposing device 233.

When any image forming unit of the image forming units (Y, C, M, K) is described, it is simply referred to as an image forming unit.

The developer contains a toner and a carrier. The four image forming units (Y, C, M, K) have identical mechanical structures expect that the developer for use is different.

The transferring unit 240 includes: a driving roller 241 and a driven roller 242; an intermediate transfer belt 243 rotatable counterclockwise in FIG. 3 by the movement of the driving roller 241; primary transfer rollers (244Y, 244C, 244M, 244K) disposed to face the photoconductor drum 231 via the intermediate transfer belt 243; and a secondary counter roller 245 and a secondary transfer roller 246 that are disposed to face each other via the intermediate transfer belt 243 at the transfer position of the toner image to a paper sheet.

The fixing unit 250 includes a pressing roller 252 that includes a heater therein and is configured to rotatably press a fixing belt 251 to form a nip, where the fixing belt 251 is configured to heat the paper sheet P. The fixing unit applies heat and pressure to the color toner image on the paper sheet P to fix the color toner image. The paper sheet P on which the color toner image has been fixed is ejected to the paper sheet ejection tray 224 with the paper sheet ejection roller 223, to complete a series of image forming operations.

EXAMPLES

The present disclosure will be described below by way of Examples. The present disclosure should not be construed as being limited to the Examples. In the following, unless otherwise specified, the unit "part" denotes "part by mass" and the unit "%" denotes "% by mass".

Example 1

<Synthesis of Non-Crystalline Polyester>

A four-necked flask equipped with a nitrogen-introducing tube, a water-removing tube, a stirrer, and a thermocouple was charged with a bisphenol A ethylene oxide 2 mol adduct, a bisphenol A propylene oxide 3 mol adduct, terephthalic acid, adipic acid, and trimethylolpropane so that a molar ratio of the bisphenol A ethylene oxide 2 mol adduct to the bisphenol A propylene oxide 3 mol adduct (the bisphenol A ethylene oxide 2 mol adduct/the bisphenol A propylene oxide 3 mol adduct) was to be 85/15, a molar ratio of the terephthalic acid to the adipic acid (the terephthalic acid/the adipic acid) was to be 75/25, the amount of the trimethylolpropane in all of the monomers was to be 1 mol %, and a molar ratio OH/COOH of a hydroxyl group to a carboxyl group was to be 1.2. In the presence of titanium tetraisopropoxide (500 ppm relative to the resin component), the resulting mixture was allowed to react under normal pressure at 230° C. for 8 hours, and the reaction mixture was further allowed to react at a reduced pressure of from 10 mmHg through 15 mmHg for 4 hours. After that, trimellitic anhydride was added to the flask so that the amount of the trimellitic anhydride was to be 1 mol % relative to all of the resin components, followed by reaction under normal pressure at 180° C. for 3 hours, to produce [Non-crystalline polyester resin 1].

<Synthesis of Crystalline Polyester>

A 5 L four-necked flask equipped with a nitrogen-introducing tube, a water-removing tube, a stirrer, and a thermocouple was charged with sebacic acid and 1,6-hexanediol so that a molar ratio OH/COOH of a hydroxyl groups to a carboxyl group was to be 0.9. In the presence of titanium tetraisopropoxide (500 ppm relative to the resin components), the resulting mixture was allowed to react at 180° C. for 10 hours, then react at 200° C. for 3 hours, and then react at a pressure of 8.3 kPa for 2 hours, to produce [Crystalline polyester resin 1].

<Preparation of Crystalline Polyester Dispersion Liquid>

A vessel equipped with a stirring rod and a thermometer was charged with 60 parts by mass of [Crystalline polyester resin 1] and 400 parts by mass of ethyl acetate. The resulting mixture was heated to 80° C. under stirring and kept at 80° C. for 5 hours, followed by cooling to 30° C. for 1 hour. The [Crystalline polyester resin 1] was dispersed in a bead mill (ULTRA VISCOMILL, obtained from AIMEX CO., Ltd.) under conditions in which the feeding rate was 1 kg/hr, the disc circumferential speed was 6 m/sec, zirconia beads each having a diameter of 0.5 mm were packed in an amount of 80% by volume, and the number of passes was 3, to produce [Crystalline polyester resin dispersion liquid 1].

<Synthesis of Prepolymer>

A reaction vessel equipped with a condenser, a stirrer, and a nitrogen-introducing tube was charged with 3-methyl-1,5-pentanediol, isophthalic acid, adipic acid, trimellitic anhydride, and titanium tetraisopropoxide (1,000 ppm relative to the resin components) so that a molar ratio OH/COOH of a hydroxyl groups to a carboxyl group was to be 1.5, the diol component was to be formed of 100 mol % of 3-methyl-1,5-pentanediol, the dicarboxylic acid component was to be formed of 40 mol % of isophthalic acid and 60 mol % of adipic acid, and the amount of the trimellitic anhydride in all of the monomers was to be 1 mol %.

After that, the resulting mixture was heated to 200° C. for about 4 hours, then was heated to 230° C. for 2 hours, and was allowed to react until no flowing water was observed.

Moreover, the reaction mixture was allowed to react at a reduced pressure of from 10 mmHg through 15 mmHg for 5 hours, to produce [Intermediate polyester 1].

Next, a reaction vessel equipped with a condenser, a stirrer, and a nitrogen-introducing tube was charged with the [Intermediate polyester 1] and isophorone diisocyanate (IPDI) at a molar ratio (the isocyanate group of IPDI/the hydroxyl group of the intermediate polyester) of 2.0. The resulting mixture was diluted with ethyl acetate to be a 50% ethyl acetate solution, followed by reaction at 100° C. for 5 hours, to produce [Prepolymer 1].

<Synthesis of Hybrid Resin>

A 5 L four-necked flask equipped with a nitrogen-introducing tube, a water-removing tube, a stirrer, and a thermocouple was charged with 7.2 g of 2,3-butanediol, 6.08 g of 1,2-propanediol, 18.59 g of terephthalic acid, and 0.18 g of tin(II) 2-ethylhexanoate. While the flask was being purged with nitrogen gas to maintain an inert atmosphere, the resulting mixture was heated and kept at 180° C. for 1 hour, followed by heating from 180° C. to 230° C. at a heating rate of 10° C./hr. The resulting mixture was allowed to undergo polycondensation reaction at 230° C. for 10 hours, and was further allowed to react at 230° C. and 8.0 kPa for 1 hour. After cooling of the reaction mixture to 160° C., 0.6 g of acrylic acid, 7.79 g of styrene, 1.48 g of 2-ethylhexyl acrylate, and dibutyl peroxide were dripped to the reaction mixture for 1 hour using a dripping funnel. After completion of dripping, while the reaction mixture being kept at 160° C., addition polymerization reaction was sufficiently performed for 1 hour. The reaction mixture was heated to 210° C., followed by addition of 4.61 g of trimellitic anhydride. The resulting mixture was allowed to react at 210° C. for 2 hours, and was further allowed to react at 210° C. and 10 kPa until a desired softening point was reached, to produce [Non-crystalline hybrid resin 1].

The SP value of the Non-crystalline hybrid resin 1 was found to be 10.8.

The Non-crystalline hybrid resin 1 was found to have a weight average molecular weight of 55,000, a number average molecular weight of 2,800, a Tg of 55° C., and an acid value of 9.4 mgKOH/g.

<Synthesis of Resin Particles>

Production Example 1: Production of Resin Particle (B) Aqueous Dispersion Liquid (W0-1))

A reaction vessel equipped with a stirrer, a heating and cooling device, and a thermometer was charged with 3,760 parts by mass of water and 150 parts by mass of polyoxyethylene-1-(allyloxymethyl)alkyl ether ammonium sulfate (AQUALON KH-1025, obtained from DKS Co., Ltd.). The mixture was stirred at 200 rpm to be uniform.

The resulting mixture was heated until the temperature in the system was increased to 75° C. After addition of 90 parts by mass of a 10% by weight ammonium persulfate aqueous solution, a mixture of 430 parts by mass of styrene, 270 parts by mass of butyl acrylate, and 300 parts by mass of methacrylic acid was dripped to the resulting mixture for 4 hours.

After completion of dripping, the resulting mixture was aged at 75° C. for 4 hours, to produce a resin particle dispersion liquid (W0-1) containing resin (b1-1), which was a polymer obtained through copolymerization between the monomers and the polyoxyethylene-1-(allyloxymethyl)alkyl ether ammonium sulfate.

The particles in the resin particle dispersion liquid (W0-1) were found to have a volume average particle diameter of 30 nm.

Also, the resin (b1-1) was isolated by drying part of the resin particle dispersion liquid (W0-1).

The resin (b1-1) was found to have a Tg of 53° C. and an acid value of 195 mgKOH/g.

Production Example 2: Production of Resin Particle (B-1) Aqueous Dispersion Liquid (W-1)

A reaction vessel equipped with a stirrer, a heating and cooling device, and a thermometer was charged with 667 parts by mass of the particle dispersion liquid (W0-1) and 248 parts by mass of water. After addition of 0.267 parts by mass of tert-butyl hydroperoxide (PERBUTYL H, obtained from NOF CORPORATION), the resulting mixture was heated until the temperature in the system was increased to 70° C. After that, 43.3 parts by mass of styrene, 23.3 parts by mass of butyl acrylate, and 18.0 parts by mass of a 1% by mass ascorbic acid aqueous solution were dripped to the resulting mixture for 2 hours.

After completion of dripping, the resulting mixture was aged at 70° C. for 4 hours, to produce a particle dispersion liquid of resin particles (B-1) each containing resin (b2-1) and the resin (b1-1) as constituting components thereof, where the resin (b2-1) was a polymer obtained through copolymerization of the monomers by using the particles in the (W0-1) as seeds. Water was added to the obtained particle dispersion liquid so that the solid content concentration of the resulting mixture was to be to produce a particle dispersion liquid (W-1).

The resin particles (B-1) were found to have a volume average particle diameter of 34.3 nm.

The particle dispersion liquid (W-1) was neutralized with a 10% by weight aqueous ammonia solution to pH 9.0, followed by centrifugation. The separated precipitate was dried and solidified, to isolate the resin (b2-1).

The resin (b2-1) was found to have a Tg of 53° C.

It was confirmed by the same method as in Production Example 1 that the particle dispersion liquid (W-1) contained the resin particles (B-1) each containing the resin (b1-1) and the resin (b2-1) as constituting components thereof.

<Production of Modified Wax (Release Agent)>

A pressure-resistant reaction vessel equipped with a stirrer, a heating and cooling device, a thermometer, and a dripping cylinder was charged with 454 parts by mass of xylene and 150 parts by mass of low-molecular-weight polyethylene (SANWAX LEL-400, obtained from Sanyo Chemical Industries, Ltd.). The reaction vessel was purged with nitrogen, and then the resulting mixture was heated to 170° C. under stirring. At the same temperature, a mixture of 595 parts by mass of styrene, 255 parts by mass of methyl methacrylate, 34 parts by mass of di-t-butylperoxyhexahydro terephthalate, and 119 parts by mass of xylene was dripped to the resulting mixture for 3 hours, and the resulting mixture was further kept at the same temperature for 30 minutes.

Then, the xylene was evaporated at a reduced pressure of 0.039 MPa to produce [Modified wax 1].

The graft chain of [Modified wax 1] was found to have a sp value of 10.35 $(cal/cm^3)^{1/2}$, a Mn of 1900, a Mw of 5200, and a Tg of 57° C.

<Preparation of Wax Dispersion Liquid>

A vessel equipped with a stirring rod and a thermometer was charged with 50 parts by mass of paraffin wax (hydrocarbon wax HNP-9, obtained from Nippon Seiro Co., Ltd., with a melting point of 75° C. and a SP value of 8.8) as a release agent 1, 5 parts by mass of [Modified wax 1], and 165 parts by mass of ethyl acetate. The resulting mixture was heated to 80° C. under stirring and kept at 80° C. for 5 hours, followed by cooling to 30° C. for 1 hour. The materials were dispersed in a bead mill (ULTRA VISCOMILL, obtained from AIMEX CO., Ltd.) under conditions in which the feeding rate was 1 kg/hr, the disc circumferential speed was 6 m/sec, zirconia beads each having a diameter of 0.5 mm were packed in an amount of 80% by volume, and the number of passes was 3, to prepare [WAX dispersion liquid 1].

<Preparation of Colorant Masterbatch>

1,200 parts by mass of water, 500 parts by mass of carbon black (product name: Printex35, obtained from Degussa) [DBP oil absorption: 42 mL/100 mg, pH: 9.5], and 500 parts by mass of [Non-crystalline polyester resin 1] were mixed with HENSCHEL MIXER (obtained from NIPPON COKE & ENGINEERING. CO., LTD.).

After kneading of the mixture for 30 minutes at 150° C. using a twin-roller kneader, the resulting product was rolled and cooled, followed by pulverization with a pulverizer, to prepare [Masterbatch 1].

<Preparation of Oil Phase>

A vessel was charged with 21 parts by mass of [WAX dispersion liquid 1], 47 parts by mass of [Crystalline polyester resin dispersion liquid 1], 50 parts by mass of [Non-crystalline polyester resin 1], 4 parts by mass of [Non-crystalline hybrid resin 1], 17 parts by mass of [Masterbatch 1], and 30 parts by mass of ethyl acetate. The resulting mixture was mixed with TK HOMOMIXER (obtained from PRIMIX Corporation) at 5,000 rpm for 60 minutes, to prepare [Oil phase 1].

<Preparation of Aqueous Phase>

256 parts by mass of water, 10 parts by mass of [Particle dispersion liquid (W-1)], 5 parts by mass of [Particle dispersion liquid (W0-1)], 26 parts by mass of a 48.5% sodium dodecyldiphenyl ether disulfonate aqueous solution (ELEMINOL MON-7, obtained from SANYO CHEMICAL, LTD.), and 24 parts by mass of ethyl acetate were mixed and stirred, to prepare an opaque white liquid, which was used as [Aqueous phase 1].

<Emulsification and Removal of Solvent>

A vessel containing [Oil phase] was charged with 14 parts by mass of [Prepolymer 1] and 0.2 parts by mass of isophorone diamine as a curing agent, followed by stirring and mixing, to prepare a mixture. [Aqueous phase 1] was added to the obtained mixture. The resulting mixture was mixed with TK HOMOMIXER at 13,000 rpm for 20 minutes, to prepare [Emulsified slurry 1]. A vessel equipped with a stirrer and a thermometer was charged with [Emulsified slurry 1]. The solvent was removed at 30° C. for 8 hours, followed by aging at 45° C. for 4 hours, to prepare [Dispersion slurry 1]; i.e., a slurry containing composite particles each including a toner base particle and resin particles on the toner base particle (composite particle-forming step).

<Washing and Drying>

After filtration of 100 parts by mass of [Dispersion slurry 1] under reduced pressure, the following steps were performed.

(1): To the filtration cake, 100 parts by mass of ion-exchanged water was added. The resulting mixture was mixed with TK HOMOMIXER (at 12,000 rpm for 10 minutes), followed by filtration.

(2): To the filtration cake obtained in the above (1), a 10% sodium hydroxide aqueous solution was added until a pH of 11. The resulting mixture was mixed with TK HOMOMIXER (at 12,000 rpm for 30 minutes), followed by filtration under reduced pressure.

(3): To the filtration cake obtained in the above (2), 10% hydrochloric acid was added until a pH of from 4 through 5. The resulting mixture was mixed with TK HOMOMIXER (at 12,000 rpm for 10 minutes), followed by filtration.

(4): To the filtration cake obtained in the above (3), 300 parts by mass of ion-exchanged water was added. The resulting mixture was mixed with TK HOMOMIXER (at 12,000 rpm for 10 minutes), followed by filtration. The above steps (1) to (4) were repeated twice, to produce [Filtration cake].

[Filtration Cake] was dried with an air-circulating drier at 45° C. for 18 hours. The resulting mixture was passed through a sieve with a mesh size of 75 μm, to prepare [Toner base particles 1]; i.e., the composite particles obtained after removal of some of the resin particles.

The above steps (1) to (4) correspond to the removing step in the method of the present disclosure for producing a toner.

<External Additive Treatment>

0.6 parts by mass of hydrophobic silica having an average particle diameter of 100 nm, 1.0 part by mass of titanium oxide having an average particle diameter of 20 nm, and 0.8 parts by mass of hydrophobic silica powder having an average particle diameter of 15 nm were mixed with 100 parts by mass of [Toner base particles 1] with HENSCHEL MIXER, to produce [Toner 1].

<Production of Carrier>

100 parts by mass of a straight silicone resin formed only of organosiloxane bond, 5 parts by mass of γ-(2-aminoethyl) aminopropyltrimethoxysilane, and 10 parts by mass of carbon black were added to 100 parts by mass of toluene, followed by dispersing with HOMOMIXER for 20 minutes, to prepare a resin layer-coating liquid. Using a fluidized bed coating machine, the resin layer-coating liquid was coated on the surface of 1,000 parts by mass of spherical magnetite having an average particle diameter of 50 Tim, to produce [Carrier].

<Production of Developer>

Using a ball mill, 5 parts by mass of [Toner 1] and 95 parts by mass of [Carrier] were mixed together, to produce a developer.

Example 2

[Toner 2] was produced in the same manner as in Example 1 except that in <Preparation of oil phase> of Example 1, the amount of [Non-crystalline hybrid resin 1] was changed to 2 parts by mass and the amount of [Non-crystalline polyester resin 1] was changed to 52 parts by mass.

Example 3

[Toner 3] was produced in the same manner as in Example 1 except that in <Preparation of oil phase> of Example 1, the amount of [Non-crystalline hybrid resin 1] was changed to 0 parts by mass and the amount of [Non-crystalline polyester resin 1] was changed to 54 parts by mass.

Example 4

[Toner 4] was produced in the same manner as in Example 1 except that in <Preparation of aqueous phase> of Example 1, the amount of [Particle dispersion liquid (W-1)] was changed to 5 parts by mass and the amount of [Particle dispersion liquid (W0-1)] was changed to 10 parts by mass.

Example 5

[Toner 5] was produced in the same manner as in Example 1 except that in <Preparation of aqueous phase> of Example 1, the amount of [Particle dispersion liquid (W-1)] was changed to 2.5 parts by mass and the amount of [Particle dispersion liquid (W0-1)] was changed to 12.5 parts by mass.

Example 6

[Toner 6] was produced in the same manner as in Example 1 except that in <Preparation of aqueous phase> of Example 1, the amount of [Particle dispersion liquid (W-1)] was changed to 4 parts by mass and the amount of [Particle dispersion liquid (W0-1)] was changed to 15 parts by mass.

Example 7

[Toner 7] was produced in the same manner as in Example 1 except that in <Preparation of oil phase> of Example 1, the amount of [Non-crystalline hybrid resin 1] was changed to 0 parts by mass and the amount of [Non-crystalline polyester resin 1] was changed to 54 parts by mass and that in <Preparation of wax dispersion liquid> of Example 1, the amount of [Modified wax 1] was changed to 3 parts by mass.

Example 8

[Toner 8] was produced in the same manner as in Example 1 except that in <Preparation of aqueous phase> of Example 1, the amount of [Particle dispersion liquid (W-1)] was changed to 10.8 parts by mass and the amount of [Particle dispersion liquid (W0-1)] was changed to 4.2 parts by mass.

Example 9

[Toner 9] was produced in the same manner as in Example 1 except that in <Preparation of aqueous phase> of Example 1, the amount of [Particle dispersion liquid (W-1)] was changed to 3.5 parts by mass and the amount of [Particle dispersion liquid (W0-1)] was changed to 15.5 parts by mass.

Comparative Example 1

[Comparative toner 1] was produced in the same manner as in Example 1 except that in <Preparation of oil phase> of Example 1, the amount of [Non-crystalline hybrid resin 1] was changed to 10 parts by mass and the amount of [Non-crystalline polyester resin 1] was changed to 44 parts by mass.

Comparative Example 2

[Comparative toner 2] was produced in the same manner as in Example 1 except that in <Preparation of aqueous phase> of Example 1, the amount of [Particle dispersion liquid (W-1)] was changed to 2 parts by mass and the amount of [Particle dispersion liquid (W0-1)] was changed to 20 parts by mass and that in <Preparation of oil phase> of Example 1, the amount of [Non-crystalline hybrid resin 1] was changed to 10 parts by mass and the amount of [Modified polyester 1] was changed to 44 parts by mass.

Comparative Example 3

[Comparative toner 3] was produced in the same manner as in Example 1 except that in <Preparation of aqueous phase> of Example 1, the amount of [Particle dispersion liquid (W-1)] was changed to 4 parts by mass and the amount of [Particle dispersion liquid (W0-1)] was changed to 15 parts by mass.

Comparative Example 4

[Comparative toner 4] was produced in the same manner as in Example 1 except that in <Preparation of aqueous phase> of Example 1, the amount of [Particle dispersion liquid (W-1)] was changed to 2 parts by mass and the amount of [Particle dispersion liquid (W0-1)] was changed to 20 parts by mass.

Comparative Example 5

[Comparative toner 5] was produced in the same manner as in Example 1 except that in <Preparation of aqueous phase> of Example 1, the amount of [Particle dispersion liquid (W-1)] was changed to 15 parts by mass and the amount of [Particle dispersion liquid (W0-1)] was changed to 0 parts by mass.

Comparative Example 6

[Comparative toner 6] was produced in the same manner as in Example 1 except that in <Preparation of oil phase> of Example 1, the amount of [Non-crystalline hybrid resin 1] was changed to 6 parts by mass and the amount of [Non-crystalline polyester resin 1] was changed to 48 parts by mass.

Comparative Example 7

[Comparative toner 7] was produced in the same manner as in Example 1 except that in <Preparation of oil phase> of Example 1, the amount of [Non-crystalline hybrid resin 1] was changed to 0 parts by mass and the amount of [Non-crystalline polyester resin 1] was changed to 54 parts by mass and that in <Preparation of wax dispersion>, the amount of [Modified wax 1] was changed to 2 parts by mass.

Comparative Example 8

[Comparative toner 8] was produced in the same manner as in Example 1 except that in <Preparation of aqueous phase> of Example 1, the amount of [Particle dispersion liquid (W-1)] was changed to 11 parts by mass and the amount of [Particle dispersion liquid (W0-1)] was changed to 4 parts by mass.

Comparative Example 9

[Comparative toner 9] was produced in the same manner as in Example 1 except that in <Preparation of aqueous phase> of Example 1, the amount of [Particle dispersion liquid (W-1)] was changed to 3 parts by mass and the amount of [Particle dispersion liquid (W0-1)] was changed to 16 parts by mass.

The obtained toners and developer were evaluated in the following manner. Results are given in Table 1 and Table 2.

[Measurement of Peak Height Ir of the Binder Resin and Peak Height Iw of the Release Agent Through Attenuated Total Reflection (ATR), and Calculation of Ratio (Iw/Ir)]

First, 3 g of the toner was weighed, and was pressed with a pelletizer (obtained from Maekawa Testing Machine MFG. Co., LTD., device name: Type M No. 50 BRP-E) at a load of 6 t for one minute, to prepare a pellet having a diameter of 40 mm (thickness: about 2 mm).

The prepared pellet was measured under the following measurement conditions with a Fourier transform infrared (FT-IR) spectrometer (device name: Avatar370, obtained from Thermo Fisher Scientific Inc.).

—Measurement Conditions—

Incidence angle of infrared rays: 41.5°

Resolution: 4 $cm^{-1}$

Cumulative number: 20 times

Next, in an IR spectrum of the toner obtained by the measurement, the height of a peak unique to the binder resin only was read as the peak height Ir of the binder resin. The peak unique to the binder resin only was determined based on a peak position of 828 $cm^{-1}$ attributed to an amorphous polyester resin.

Similarly, the height of a peak unique to the release agent (wax resin) only in an IR spectrum of the toner obtained by the measurement was read as the peak height Iw of the release agent. The peak unique to the release agent (wax resin) only was determined based on a peak position of 2580 $cm^{-1}$.

The obtained values, Ir and Iw, were used to calculate the ratio (Iw/Ir).

The above measurement was performed a total of four times according to the same procedure at different measurement sites in the same sample, and an average value of the ratios (Iw/Ir) was calculated.

The intensity ratio (Iw/Ir) of the obtained intensity (Iw) at the peak (2850 $cm^{-1}$) attributed to the release agent to the obtained intensity (Ir) at the peak (828 $cm^{-1}$) attributed to the binder resin (amorphous polyester resin) was defined as the relative release agent amount near the surface of the toner particle.

The peak (2850 $cm^{-1}$) attributed to the release agent is absorption based on symmetric stretching of the C—H of a methylene group. The peak (828 $cm^{-1}$) attributed to the binder resin (amorphous polyester resin) is absorption based on out-of-plane bending of the C—H of a benzene structure.

In relation to the ratio (Iw/Ir) measured by the above method, the depth for analysis is about 0.3 μm determined on the measurement principle of FTIR-ATR (attenuated total reflection). Accordingly, the ratio (Iw/Ir) measured by the above method has the same meaning as representing the relative release agent amount in a region 0.3 μm in depth from the toner surface. Therefore, the ratio (Iw/Ir) represents the relative amount of the release agent present in the toner surface.

<Measurement of Distances Between Resin Particles>

The distances (L) between the resin particles and the volume average primary particle diameter (M) of each of the obtained toners were measured in the following manner.

—Method for Liberating External Additive—

[1] A 100 mL screw vial was charged with 50 mL of a 5% by mass aqueous surfactant solution (product name: NOIGEN ET-165, obtained from DKS Co., Ltd.). The solution in the vial was mixed with 3 g of the toner. The vial was gently moved in up-to-down and left-to-right motions. After that, the resulting mixture was stirred in a ball mill for 30 min to uniformly disperse the toner in the dispersion liquid.

[2] Then, ultrasonic energy was applied to the resulting mixture for 60 minutes with an ultrasonic homogenizer (product name: homogenizer, model: VCX750, CV33, obtained from SONICS & MATERIALS, Inc.) with the output being set to 40 W.

—Conditions of Ultrasonic Waves—

Vibration duration: continuous 60 minutes

Amplitude: 40 W

Vibration onset temperature: 23±1.5° C.

Temperature during vibration: 23±1.5° C.

[3]

(1) The dispersion liquid was subjected to vacuum filtration with filter paper (product name: Qualitative filter paper (No. 2, 110 mm), obtained from Advantec Toyo Kaisha, Ltd.). The resulting mixture was washed twice with ion-exchanged water, followed by filtration. The additive that had been liberated was removed, followed by drying, to produce the toner particles.

(2) The toner obtained in the above (1) was observed under a scanning electron microscope (SEM). First, a backscattered electron image was observed to detect the external additive and filler containing Si.

(3) The image obtained in the above (2) was binarized using image processing software (ImageJ), to eliminate the external additive and filler.

Next, the toner at the same position as in the above (2) was observed to produce a secondary electron image. The resin particles are not observed in the backscattered electron image, but are observed only in the secondary electron image. In comparison to the image obtained in the above (3), therefore, the particles present in the region other than the residual external additive and filler (i.e., the other region than the region excluded in the above (3)) were determined as the resin particles. The above image processing software was used to measure a volume average primary particle diameter (M) of the resin particles and the distance (L) between the resin particles (i.e., the distance from the center of one particle to the center of another particle adjacent to the one particle).

[Image Capturing Conditions]

Scanning election microscope: SU-8230

Image capturing magnification: ×35,000

Captured image: secondary electron (SE(L)) image, backscattered electron (BSE) image Acceleration voltage: 2.0 kV Acceleration current: 1.0 ρA Probe current: Normal Focus mode: UHR WD: 8.0 mm The above measurement was performed on 100 binarized images (one toner particle per image). The average value of the measurements was determined as an average value of the distances between the resin particles.

A standard deviation of the distances between the resin particles was calculated from the following mathematical formula, with x denoting the distances between the resin particles.

$$\sqrt{\frac{l}{n-l}\sum_{k=l}^{n}(x_i-\bar{x})}$$

<Measurement of Melting Point of Release Agent>

The melting point (° C.) of the release agent was measured with, for example, a differential scanning calorimeter (e.g., DSC-6220R, obtained from Seiko Instruments Inc.).

Specifically, the melting point was defined as the peak top temperature when a sample of the release agent was heated from room temperature to 150° C. at a heating rate of 10° C./min, then left to stand at 150° C. for 10 min, then cooled to room temperature, then left to stand for 10 min, and then heated to 150° C. again at a heating rate of 10° C./min.

[Surface Coverage (%) of the Crystalline Polyester Resin on the Toner Particle Surface]

Measurement of the surface coverage (%) of the crystalline polyester resin on the toner particle surface was performed according to the following procedure.

[Preparation of Sample]

(1) Toner particles were sufficiently dispersed in an epoxy resin that was curable at normal temperature. Then, the resulting dispersion was left to stand for one day or longer to allow the epoxy resin to undergo curing reaction, to produce a cured product in which the toner particles were embedded.

(2) The cured product, in which the toner particles were embedded, was cut into a thin-film section under the following cutting conditions. The obtained thin-film section was stained with ruthenium tetroxide.

—Cutting Conditions—

Cutting thickness: 75 nm

Cutting speed: from 0.05 through 0.2 mm/sec

Diamond knife used (Ultra Sonic 35°)

A transmission electron microscope (TEM) was used to capture an image of the cross-sectional surfaces of the toner particles so as to cover one toner particle in as large a state as possible in the field of view.

Because ruthenium tetroxide stains toner particle's components having different crystallinities at different contrasts, it is possible to identify domains of the crystalline resin contained in the toner particles. In the cross-sectional surface of the toner particle observed, the component stained in bars or lines to have a lamella structure derived from crystallinity can be regarded as the crystalline polyester resin.

FIG. 4 is a view illustrating one example of an image obtained by observing toner particles under a transmission electron microscope after the toner particles are cut into a section followed by staining with a 0.5 aqueous solution of ruthenium tetroxide.

As illustrated in FIG. 4, in the image observed under a transmission electron microscope (TEM), for example, linear or lamella-structured objects scattered in the toner particle (crystals, dot-line enclosed portions in FIG. 4) were determined as the crystalline polyester resin. In FIG. 4, the release agent is the object in the form of a white mass observed near the center of the region enclosed by a solid line and a dot line.

First, a captured image was binarized to measure the length $L_T$ of the outline of the uppermost surface of an individual particle (the length of the outer periphery of the toner particle in the cross-sectional surface thereof).

Then, a length $L_{Open}$ was measured, which was a length of the total of the regions determined as the crystalline polyester resin in the binarized image relative to the uppermost surface of the toner particle.

The measured lengths, $L_T$ and $L_{Open}$, were used to calculate a ratio of ($L_{Open}/L_T$).

An average value of the ratios for 10 toner particles or an average value of the ratios for 10 different cross-sectional images was calculated and expressed in percentage, and was defined as "coverage (%) of the crystalline polyester resin on the toner particle surface" in the present disclosure.

When it is difficult to distinguish the crystalline polyester resin and the release agent from each other, the following treatment (3) may be performed between the above (1) and the above (2). After extraction of the release agent from the toner particles, the crystalline polyester resin was observed more clearly.

(3) A microtome with a diamond cutter was used to expose the cross-sectional surface of the cured product. The cured product having the exposed cross-sectional surface was immersed, for 3 hours, in an organic solvent (hexane) in which only the release agent dissolved, to dissolve only the domains of the release agent.

Observation under a transmission electron microscope was performed under the following conditions.

[Conditions for Observation]

Device used: transmission electron microscope JEM-2100F, obtained from JEOL Ltd.

Acceleration voltage: 200 kV

Observation of forms: bright field observation

Set conditions: spot size: 3, CLAP: 1, OLAP: 3, Alpha: 3

The coverage of the crystalline polyester resin was measured based on the above TEM image. Specifically, the cross-sectional surfaces of 50 toner particles were observed. The toner particles to be observed for the cross-sectional surfaces thereof are toner particles each having a cross-sectional surface with a longer diameter within ±20% of the number average particle diameter of the toner particles. The number average particle diameter of the toner particles was measured with a particle size distribution analyzer (MULTISIZER III, obtained from Beckman Coulter, Inc.).

<Low-Temperature Fixability>

Using a color multifunction peripheral (IMAGIO MP C4500, obtained from Ricoh Company, Ltd.) from which a thermal fixing device had been removed, the toner was uniformly placed on a paper sheet (Recycled PPC Paper 100, obtained from Oji Paper Co., Ltd.) so as to have a weight density of 0.8 mg/cm$^2$.

A cold-offset onset temperature (MFT) when the above paper sheet was passed through a nip with the pressing roller at a fixing speed (a circumferential speed of the heating roller) of 213 mm/sec and a fixing pressure (a pressing roller pressure) of 10 kg/cm$^2$.

A lower cold-offset onset temperature means more excellent low-temperature fixability.

[Evaluation Criteria for Cold Offset]

A: The minimum fixable temperature was 130° C. or lower.

B: The minimum fixable temperature was higher than 130° C. and equal to or lower than 135° C.

C: The minimum fixable temperature was higher than 135° C. and equal to or lower than 140° C.

D: The minimum fixable temperature was higher than 140° C.

<Heat-Resistant Storage Stability>

A 50 mL glass container was charged with the toner. After stored at 50° C. for 8 hours, the toner was passed through a 42-mesh sieve for 2 minutes, and the mass of the toner remaining on the wire mesh (sieve) was measured. The residual rate of the toner was measured from the ratio of the mass of the remaining toner to the mass of the toner put into the sieve; i.e., [(the mass of the toner remaining on the wire mesh/the mass of the toner put into the sieve)×100]. A toner having better heat-resistant storage stability has lower residual rate.

—Evaluation Criteria—

A: The residual rate was lower than 5%.

B: The residual rate was or higher and lower than 15%.

C: The residual rate was 15% or higher and lower than 30%.

D: The residual rate was 30% or higher.

<Variation in Gloss>

Multifunction peripheral IMAGIO MP C5002 (obtained from Ricoh Company, Ltd.), in which the fixing portion had been modified, was used for a test of copy on paper sheets of POD gloss coat of 128 g/m$^2$ (obtained from Oji Paper Co., Ltd.).

Specifically, the paper sheets were fed with the fixing temperature being increased from 140° C. to 160° C. in increments of 4° C. The glossiness at each of the temperatures was measured to determine the difference the highest glossiness and the lowest glossiness in the above range of the fixing temperature.

The image after the test of copy was measured for 60° gloss with glossmeter VG-7000 (obtained from NIPPON DENSHOKU INDUSTRIES Co., Ltd.).

Conditions for evaluation of fixation were as follows: the linear speed of the paper sheet feeding was 100 mm/sec, the surface pressure was 1.0 kgf/cm$^2$, and the nip width was 7 mm.

—Evaluation Criteria—

A: Lower than 1

B: 1 or higher and lower than 2

C: 2 or higher and lower than 4

D: 4 or higher

<Cleanability (Contamination on Photoconductor)>

In a laboratory environment of 21° C. and 65% RH, the above image forming apparatus was used to output 50,000 charts (A4 size, landscape orientation) each having an image area ratio of at 3 prints/job.

After that, in a laboratory environment of 32° C. and 54% RH, 100 charts (A4 size, landscape orientation) each having a 43 mm-wide longitudinal band pattern (relative to the paper sheet feeding direction) as an evaluation image were output. The obtained images were visually observed to evaluate cleanability of the toner based on the presence or absence of abnormal images due to cleaning failure.

—Evaluation Criteria—

A: Any toner particles that passed through due to cleaning failure were not visually observed on the printed paper sheet nor the photoconductor, and even when the photoconductor was microscopically observed in the longer direction thereof, any streaks of the toner particles that passed through were not observed.

B: Toner particles that passed through due to cleaning failure were not visually observed on the printed paper sheet nor the photoconductor.

D: Toner particles that passed through due to cleaning failure were visually observed both on the printed paper sheet and the photoconductor.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| Volume average primary particle diameter of resin particles (nm) | | 17.3 | 17.3 | 17.3 | 17.3 | 17.3 | 17 . 3 | 17.3 | 17.3 | 17.3 |
| Iw/Ir | | 0.13 | 0.18 | 0.23 | 0.13 | 0.13 | 0.13 | 0.29 | 0.13 | 0.13 |
| Standard deviation of distances between resin particles (nm) | | 177 | 177 | 177 | 329 | 406 | 482 | 177 | 153 | 497 |
| Melting point of release agent (° C.) | | 75 | 75 | 75 | 75 | 75 | 75 | 75 | 75 | 75 |
| Surface coverage of crystalline polyester (%) | | 13 | 14 | 16 | 13 | 13 | 13 | 19 | 13 | 13 |
| Tg1st of toner (° C.) | | 47 | 47 | 47 | 45 | 44 | 43 | 47 | 48 | 43 |
| Tg1st of THF-insoluble component of toner (° C.) | | −37 | −37 | −37 | −37 | −37 | −37 | −37 | −37 | −37 |
| Tg2nd of THF-soluble component of toner (° C.) | | 57 | 57 | 57 | 57 | 57 | 57 | 57 | 57 | 57 |
| Evaluation results | Low-temperature fixability | B | B | B | A | A | A | B | B | A |
| | Heat-resistant storage stability | A | A | A | B | B | B | A | A | B |
| | Variation in gloss | B | B | A | B | B | B | A | B | B |
| | Cleanability | A | A | A | A | B | B | B | A | A |

TABLE 2

| | | Comparative Examples | | | | | | | | |
|---|---|---|---|---|---|---|---|---|---|---|
| | | 1 | 2 | 3 | 4 | 5 | 6 | 7 | 8 | 9 |
| Volume average primary particle diameter of resin particles (nm) | | 17.3 | 17.3 | 17.3 | 17.3 | 17.3 | 17.3 | 17.3 | 17.3 | 17.3 |
| Iw/Ir | | 0.03 | 0.03 | 0.13 | 0.13 | 0.13 | 0.09 | 0.32 | 0.13 | 0.13 |
| Standard deviation of distances between resin particles (nm) | | 177 | 634 | 101 | 634 | 25 | 177 | 177 | 147 | 512 |
| Melting point of release agent (° C.) | | 75 | 75 | 75 | 75 | 75 | 75 | 75 | 75 | 75 |
| Surface coverage of crystalline polyester (%) | | 8 | 8 | 13 | 13 | 13 | 11 | 22 | 13 | 1 3 |
| Tg1st of toner (° C.) | | 47 | 41 | 48 | 41 | 49 | 47 | 47 | 48 | 43 |
| Tg1st of THF-insoluble component of toner (° C.) | | −37 | −37 | −37 | −37 | −37 | −37 | −37 | −37 | −37 |
| Tg2nd of THF-soluble component of toner (° C.) | | 57 | 57 | 57 | 57 | 57 | 57 | 57 | 57 | 57 |
| Evaluation results | Low-temperature fixability | B | A | B | A | C | B | B | C | A |
| | Heat-resistant storage stability | D | D | C | B | A | A | A | A | D |
| | Variation in gloss | B | D | B | B | C | D | A | B | B |
| | Cleanability | A | D | A | D | A | A | D | A | A |

All of the toners of Examples 1 to 9 exhibited excellent performances in all of the low-temperature fixability, the heat-resistant storage stability, the variation in gloss, and the cleanability. Meanwhile, the toners of Comparative Examples 1 to 9 were excellent in some of the properties, but involved unacceptable degradation of quality and could not satisfy all of the properties required.

Aspects and embodiments of the present disclosure are as follows, for example.

<1> A toner, including:

toner base particles each containing a binder resin and a release agent; and resin particles on a surface of each of the toner base particles, wherein:

a ratio (Iw/Ir) is 0.10 or more and 0.30 or less, where Ir is a peak height of the binder resin and Iw is a peak height of the release agent, as measured through attenuated total reflection (ATR); and a standard deviation σ (nm) of distances L (nm) between the resin particles that are adjacent to each other on the surface of each of the toner base particles is 150 nm or more and 500 nm or less.

<2> The toner according to <1> above, wherein the standard deviation a (nm) is 150 nm or more and 400 nm or less.

<3> The toner according to <1> or <2> above, wherein a melting point of the release agent is 65° C. or higher and 75° C. or lower.

<4> The toner according to any one of <1> to <3> above, wherein the resin particles each include a resin including a vinyl unit, and the resin including the vinyl unit includes methacrylic acid.

<5> The toner according to any one of <1> to <4> above, wherein the resin particles each include a core resin and a shell resin covering at least part of a surface of the core resin.

<6> The toner according to <5> above, wherein the shell resin includes a styrene-(meth)acrylic acid ester copolymer.

<7> The toner according to any one of <1> to <6> above, wherein the binder resin includes non-crystalline polyester.

<8> The toner according to any one of <1> to <7> above, wherein the binder resin includes crystalline polyester.

<9> The toner according to any one of <1> to <8> above, wherein a surface coverage of the crystalline polyester on a surface of the toner is 10% or higher and 20% or lower.

<10> A toner storing unit, including:

a unit configured to store a toner; and the toner according to any one of <1> to <9> above, the toner being stored in the unit.

<11> An image forming apparatus, including:

the toner storing unit according to <10> above.

<12> An image forming method, including:

forming an electrostatic latent image on an electrostatic latent image bearer;

developing the electrostatic latent image with the toner according to any one of <1> to <9> above, to form a toner image on the electrostatic latent image bearer;

transferring the toner image to a medium; and fixing the toner image on the medium.

<13> A toner producing method, including:

depositing resin particles on a surface of each of toner base particles, to form composite particles; and removing at least part of the resin particles from the composite particles, to produce the toner according to any one of <1> to <9> above.

<14> The method according to <13> above, wherein the removing is washing the composite particles with a basic aqueous solution.

The toner according to any one of <1> to <9> above, the toner storing unit according to <10> above, the image forming apparatus according to <11> above, the image forming method according to <12> above, and the method according to <13> or <14> above can solve the various problems pertinent in the art and achieve the object of the present disclosure.

Further, the present invention is not limited to these embodiments, but various variations and modifications may be made without departing from the scope of the present invention.

What is claimed is:

1. A toner, comprising:

toner base particles each containing a binder resin and a release agent; and resin particles on a surface of each of the toner base particles, wherein:

a ratio (Iw/Ir) is 0.10 or more and 0.30 or less, where Ir is a peak height of the binder resin and Iw is a peak height of the release agent, as measured through attenuated total reflection (ATR), a standard deviation σ (nm) of distances L (nm) between the resin particles that are adjacent to each other on the surface of each of the toner base particles is 150 nm or more and 500 nm or less, the resin particles each include a resin including a vinyl unit, and the resin including the vinyl unit includes methacrylic acid.

2. The toner according to claim 1, wherein:

the standard deviation σ (nm) is 150 nm or more and 400 nm or less.

3. The toner according to claim 1, wherein:

a melting point of the release agent is 65° C. or higher and 75° C. or lower.

4. The toner according to claim 1, wherein:

the resin particles include a core resin and a shell resin covering at least part of a surface of the core resin.

5. The toner according to claim 4, wherein:

the shell resin includes a styrene-(meth)acrylic acid ester copolymer.

6. The toner according to claim 1, wherein:

the binder resin includes non-crystalline polyester.

7. The toner according to claim 1, wherein:

the binder resin includes crystalline polyester.

8. The toner according to claim 7, wherein:

a surface coverage of the crystalline polyester on a surface of the toner is 10% or higher and 20% or lower.

9. A toner storage, comprising:

a storage to store a toner; and the toner according to claim 1 stored in the storage.

10. An image forming apparatus, comprising:

the toner storing unit according to claim 9.

11. An image forming method, comprising:

forming an electrostatic latent image on an electrostatic latent image bearer;

developing the electrostatic latent image with the toner according to claim 1, to form a toner image on the electrostatic latent image bearer;

transferring the toner image to a medium; and fixing the toner image on the medium.

12. A toner production method, comprising:

depositing resin particles on the surface of each of toner base particles, to form composite particles; and removing at least part of the resin particles from the composite particles, to produce the toner according to claim 1.

13. The method according to claim 12, wherein:

the removing is washing the composite particles with a basic aqueous solution.

14. The toner according to claim 1, wherein:

a glass transition temperature of a tetrahydrofuran (THF) insoluble component of the toner measured from first heating of differential scanning calorimetry is from −45° C. through 5° C.

15. The toner according to claim 7, wherein the crystalline polyester resin comprises:

straight-chain saturated aliphatic dicarboxylic acid, as an acid component, having 4 or more and 12 or less carbon atoms and straight-chain saturated aliphatic diol, as an alcohol component, having 2 or more and 12 or less carbon atoms.

16. The toner according to claim 1, wherein:

a weight average molecular weight (Mw) of a shell resin of the resin particles is from 200,000 or higher and 2,000,000 or lower.

17. The toner according to claim 1, wherein:

a volume average primary particle diameter M (nm) of the resin particles is more than 5 nm and equal to or less than 60 nm.

18. The toner according to claim 1, wherein:

a ratio of a volume average primary particle diameter M (nm) to the distance L (nm) between the resin particles that are adjacent to each other [M (nm)/L (nm)] is 0.40 or more and less than 0.90.

19. The toner according to claim 1, wherein:

the toner base particles each further include a non-crystalline hybrid resin.

20. The toner according to claim 1, wherein:

the shell resin has a glass transition temperature that is higher than a glass transition temperature of the core resin by 10° C. or higher.

* * * * *